(12) United States Patent
Matsuura et al.

(10) Patent No.: US 10,890,252 B2
(45) Date of Patent: Jan. 12, 2021

(54) CONTROL MECHANISM FOR STEPLESS TRANSMISSION

(71) Applicant: Kanzaki Kokyukoki Mfg. Co., Ltd., Amagasaki (JP)

(72) Inventors: Jun Matsuura, Amagasaki (JP); Nobuhisa Kamikawa, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 16/560,214

(22) Filed: Sep. 4, 2019

(65) Prior Publication Data

US 2019/0390767 A1 Dec. 26, 2019

Related U.S. Application Data

(63) Continuation-in-part of application No. 15/920,167, filed on Mar. 13, 2018, now Pat. No. 10,794,480, (Continued)

(30) Foreign Application Priority Data

Aug. 7, 2014 (JP) .................. 2014-161495
Aug. 8, 2014 (JP) .................. 2014-162729

(51) Int. Cl.
*F16H 61/4069* (2010.01)
*F04B 1/00* (2020.01)
(Continued)

(52) U.S. Cl.
CPC ........... *F16H 61/4069* (2013.01); *F04B 1/00* (2013.01); *F04B 1/146* (2013.01); *F04B 1/182* (2013.01)

(58) Field of Classification Search
USPC ......................................................... 60/443
See application file for complete search history.

(56) References Cited

U.S. PATENT DOCUMENTS 3,157,998 A 11/1964 Harris
3,340,450 A 9/1967 Stilley et al.
(Continued)

FOREIGN PATENT DOCUMENTS

GB 688114 A 2/1953
JP S 56-151509 U 11/1981
(Continued)

OTHER PUBLICATIONS

Notification of Reason for Refusal issued in Japanese Patent Application No. 2014-161495 dated Jan. 30, 2018.
(Continued)

*Primary Examiner* — Thomas E Lazo
*Assistant Examiner* — Daniel S Collins
(74) *Attorney, Agent, or Firm* — Sterne, Kessler, Goldstein & Fox P.L.L.C.

(57) ABSTRACT

A control mechanism for a hydrostatic transmission includes a piston rod, a neutral biasing spring, a piston, a cylinder case provided with a first fluid chamber and a second fluid chamber, a solenoid valve capable of selectively supplying pressurized fluid to the first fluid chamber and the second fluid chamber, a pivot shaft configured to swingably support the cylinder case, and a first relief valve configured to flow the hydraulic fluid from the first fluid chamber to the second fluid chamber when a hydraulic pressure in the first fluid chamber exceeds a set pressure, and a second relief valve configured to flow the hydraulic fluid from the second fluid chamber to the first fluid chamber when a hydraulic pressure in the second fluid chamber exceeds a set pressure.

5 Claims, 43 Drawing Sheets

Related U.S. Application Data which is a continuation-in-part of application No. 15/650,358, filed on Jul. 14, 2017, now Pat. No. 10,641,389, which is a continuation of application No. 14/817,922, filed on Aug. 4, 2015, now abandoned.

(51) Int. Cl.
 *F04B 1/146* (2020.01)
 *F04B 1/182* (2020.01)

(56) References Cited

U.S. PATENT DOCUMENTS

| | | | |
|---|---|---|---|
| 3,508,401 A | 4/1970 | Aplin | |
| 3,700,356 A * | 10/1972 | Kubik | F16H 61/42 417/222.1 |
| 4,977,760 A | 12/1990 | Ishimori et al. | |
| 5,233,880 A | 8/1993 | Sato et al. | |
| 6,755,703 B1 | 6/2004 | Erickson | |
| 7,003,950 B1 | 2/2006 | Holder et al. | |
| 7,533,753 B2 | 5/2009 | Tsukamoto et al. | |
| 8,024,925 B2 * | 9/2011 | Cronin | F16H 61/433 60/451 |
| 8,469,164 B2 | 6/2013 | Kondo et al. | |
| 9,549,504 B2 | 1/2017 | Iida et al. | |
| 2011/0277459 A1 * | 11/2011 | Loritz | F16H 61/431 60/464 |
| 2012/0198994 A1 | 8/2012 | Choi | |

FOREIGN PATENT DOCUMENTS

| | | |
|---|---|---|
| JP | S 61-278654 A | 12/1986 |
| JP | H 01-156138 A | 6/1989 |
| JP | H 01-289722 A | 11/1989 |
| JP | H 04-041148 U | 4/1992 |
| JP | H 06-100278 B | 12/1994 |
| JP | 2001-227641 A | 8/2001 |
| JP | 2002-031037 A | 1/2002 |
| JP | 2002-250437 A | 9/2002 |
| JP | 2009-236186 A | 10/2009 |
| JP | 2009-287657 A | 12/2009 |
| JP | 2013-096449 A | 5/2013 |

OTHER PUBLICATIONS

Notification of Reason for Refusal issued in Japanese Patent Application No. 2014-162729 dated Feb. 6, 2018.

* cited by examiner

CONTROL MECHANISM FOR STEPLESS TRANSMISSION

CROSS-REFERENCE TO RELATED APPLICATIONS

The present application claims priority to Japanese Patent Applications No. 2014-161495, filed on Aug. 7, 2014, and No. 2014-162729, filed on Aug. 8, 2014. Further, the present application is a continuation-in-part of U.S. application Ser. No. 15/920,167, filed on Mar. 13, 2018, which is a continuation-in-part of U.S. application Ser. No. 15/650,358, filed on Jul. 14, 2017, which is a continuation of U.S. application Ser. No. 14/817,922, filed on Aug. 4, 2015.

BACKGROUND OF THE INVENTION

Field of the Invention

The present invention relates to a control mechanism for controlling the output rotary speed and direction of a hydrostatic transmission (hereinafter, "HST"). Especially, the control mechanism is a servomechanism including a servo unit that combines a telescopic (linearly movable) actuator and a valve.

Related Art

As disclosed by JP 2002-250437 A (hereinafter, "D1"), JP H06-100278 B (hereinafter, "D2"), and JP 2013-096449 A (hereinafter, "D3"), an HST used as a transmission for a tractor is usually disposed in a casing that also serves as a vehicle body frame (chassis) of the tractor. Also, as disclosed by D1, D2 and D3, it is well-known that a piston in a hydraulic cylinder serves as the actuator for controlling a position of a movable swash plate of the HST. In this regard, a trunnion shaft serving as a pivot of the movable swash plate is connected to the piston. Especially, each of the hydraulic cylinders disclosed by D2 and D3 is configured as a servomechanism.

With regard to connection of the actuator to the trunnion shaft, in D1, the trunnion shaft has a tip projecting outward from the casing, and an arm is fixed on the tip of the trunnion shaft, and is connected via a link to a tip of a piston rod extended from the hydraulic cylinder disposed outside of the casing. Similarly, in D2, an arm is fixed on a tip of the trunnion shaft projecting outward from the casing. However, a tip of the arm is directly connected to the piston in the hydraulic cylinder without a link. In D3, a part of the casing serves as a housing of the hydraulic cylinder. The piston in the hydraulic cylinder formed in the casing is directly connected to the movable swash plate of the HST in the casing so that the HST and the hydraulic cylinder are assembled together in the casing.

To achieve a simple and compact vehicle body frame, some tractor makers desire the HST to be minimized for its arrangement in the casing serving as the vehicle body frame, and the actuator to be separated from the HST so as to enable its external attachment on the outside of the casing. From this viewpoint, the structure disclosed by D3 does not meet these desires.

If it is premised that the HST is disposed inside of the casing, and the actuator outside of the casing, it is desirable in assembly, maintenanceability, and reduction of parts count and costs that the actuator can be easily connected or disconnected to and from the tip of the trunnion shaft projecting outward from the casing. A space under the step of the tractor on a right or left side of the casing is suggested as one of appropriate spaces for arrangement of such an actuator. However, if the actuator is to be disposed under the step, the actuator must be disposed at a considerably low position so that a sufficient vertical gap between the actuator and the step above the actuator is ensured to facilitate works for connecting or disconnecting the actuator to and from the trunnion shaft, and to prevent the attached actuator from interfering with the step. Such a low position becomes considerably lower than the trunnion shaft. Therefore, as taught or suggested by D1 and D2, a link or an arm is needed to connect the trunnion shaft to the actuator.

If the actuator is a telescopic actuator, such as a piston rod of a hydraulic cylinder, the movement of the actuator is linear while the movement of the arm that rotates centered on the trunnion shaft or the like is circular. Therefore, such a differential movement between the arm and the actuator should be considered when they are connected to each other. This differential movement becomes larger as the distance between the trunnion shaft and the actuator becomes larger. In other words, if a large vertical gap between the actuator and the trunnion shaft is desired to ensure the facility in work for connecting and disconnecting the actuator to and from the trunnion shaft, there should be any configuration for absorbing the differential movement between the arm and the actuator that may become large because of the large vertical gap.

In this regard, D1 discloses a structure that the cylinder serving as the actuator is pivotally connected at the tip of the piston rod thereof to the arm, and at a cylinder bottom thereof to a part of the vehicle (e.g., a frame). During the telescopic movement of the piston rod, the entire cylinder rotates centered on the pivot at the cylinder bottom according to rotation of the arm. D2 discloses a structure that a groove or a slot is provided in a portion of the piston of the servomechanism to the tip of the arm so as to absorb the rotation of the tip of the arm during the sliding movement of the piston.

However, in the case of D1, the part of the vehicle pivotally supporting the cylinder bottom is weighed on or loaded eccentrically because it cantilevers the cylinder, so that it is liable to a twisting stress due to the rotation of the cylinder. If the actuator is assembled with a valve so as to constitute a servo unit, especially, if the valve is a large and heavy solenoid valve, the part pivoting the cylinder bottom further tends to be twisted. In the case of D2, the portion of the piston engaged with the tip of the arm is complicated in structure. It needs accurate dimensions to surely absorb the differential movement between the piston and the arm while ensuring a stable telescopic movement of the piston and a stable rotation of the arm. Further, the slot or groove has to be formed. As a result, the cost of the configuration of D2 becomes great. Moreover, in the case of D2, the actuator is a twin rod piston. While the piston engages with the tip of the arm, the actuator unit including the valve and the piston has to be supported by attaching both tips of the piston rods to the casing of the HST, thereby increasing the number of positions and processes for attaching or detaching the actuator unit.

Furthermore, when the reverse driving force from the wheel (ground) is excessive, for example, at the time of traveling downhill, the hydraulic pressure of the closed circuit is received, and the displacement regulator (movable swash plate) of the hydraulic pump may be moved further from a position set by the actuator. In the actuator in the above related art, when the proportional pressure control valve or the electrical system fails and the hydraulic fluid in the cylinder cannot move back and forth, in a case where the above phenomenon occurs, the pressure in the cylinder is abnormally high, and the hydraulic fluid may leak to the outside of the cylinder and contaminate the ground.

SUMMARY OF THE INVENTION

An object of the present invention is to provide a stepless transmission whose manipulation lever can freely move when the stepless transmission receives a reverse driving force from the wheel (ground) without leaking hydraulic fluid to the outside from the cylinder when a proportional pressure control valve or an electrical system fails in the case where HST control mechanism such as a servomechanism to be provided separately from HST includes the servo unit constituted by the combination of an actuator and valves.

A control mechanism for a stepless transmission according to the present invention connected to a manipulation lever in the stepless transmission and disposed outside a housing of the stepless transmission includes a piston rod connected to the manipulation lever, a neutral biasing spring configured to bias the manipulation lever in a neutral direction, a piston provided on the piston rod wherein the piston is coaxial with the piston rod, a cylinder case provided with a cylinder configured to house the piston rod and the piston such that the piston rod and the piston are displaceable in an axial direction of the cylinder, a first fluid chamber configured to be supplied with a hydraulic fluid for withdrawing the piston rod from the cylinder and a second fluid chamber configured to be supplied with the hydraulic fluid for introducing the piston rod into the cylinder, a solenoid valve capable of selectively supplying pressurized fluid to the first fluid chamber and the second fluid chamber and supported by the cylinder case, a pivot shaft configured to swingably support the cylinder case with respect to the housing, a first relief valve configured to flow the hydraulic fluid from the first fluid chamber to the second fluid chamber when a hydraulic pressure in the first fluid chamber exceeds a set pressure, and a second relief valve configured to flow hydraulic fluid from the second fluid chamber to the first fluid chamber when a hydraulic pressure in the second fluid chamber exceeds a set pressure.

According to such a configuration, each relief valve enables the hydraulic fluid to move between the first fluid chamber and the second fluid chamber, and allows the user to manually move the manipulation lever of the stepless transmission.

These and other objects, features and advantages of the invention will appear more fully from the following detailed description of the invention with reference to the attached drawings.

DETAILED DESCRIPTION OF THE INVENTION

Figure 1:
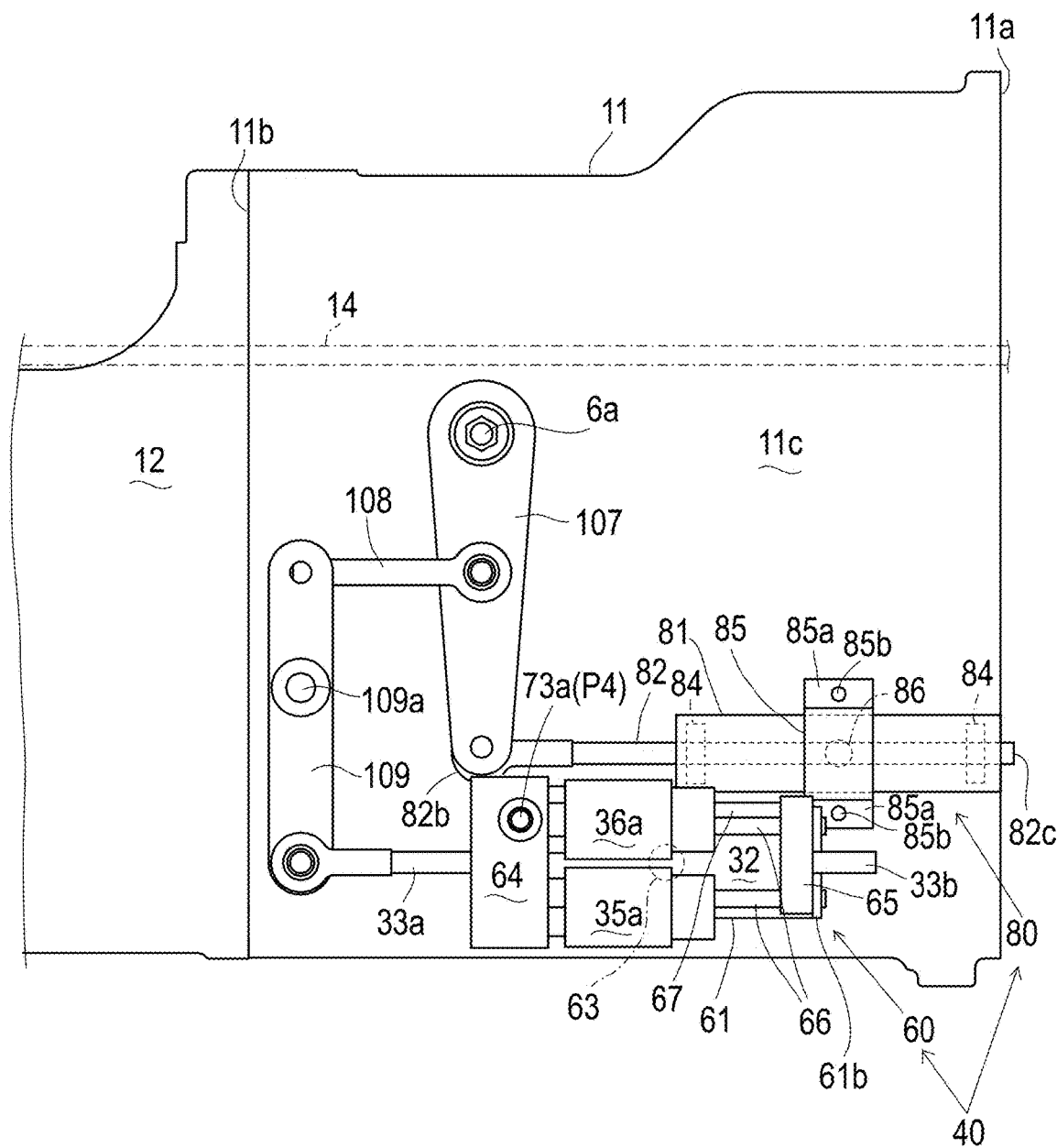
FIG. 1 is a side view of a vehicle frame casing 11 to which a servo set 40 according to a first embodiment is attached.
Figure 2:
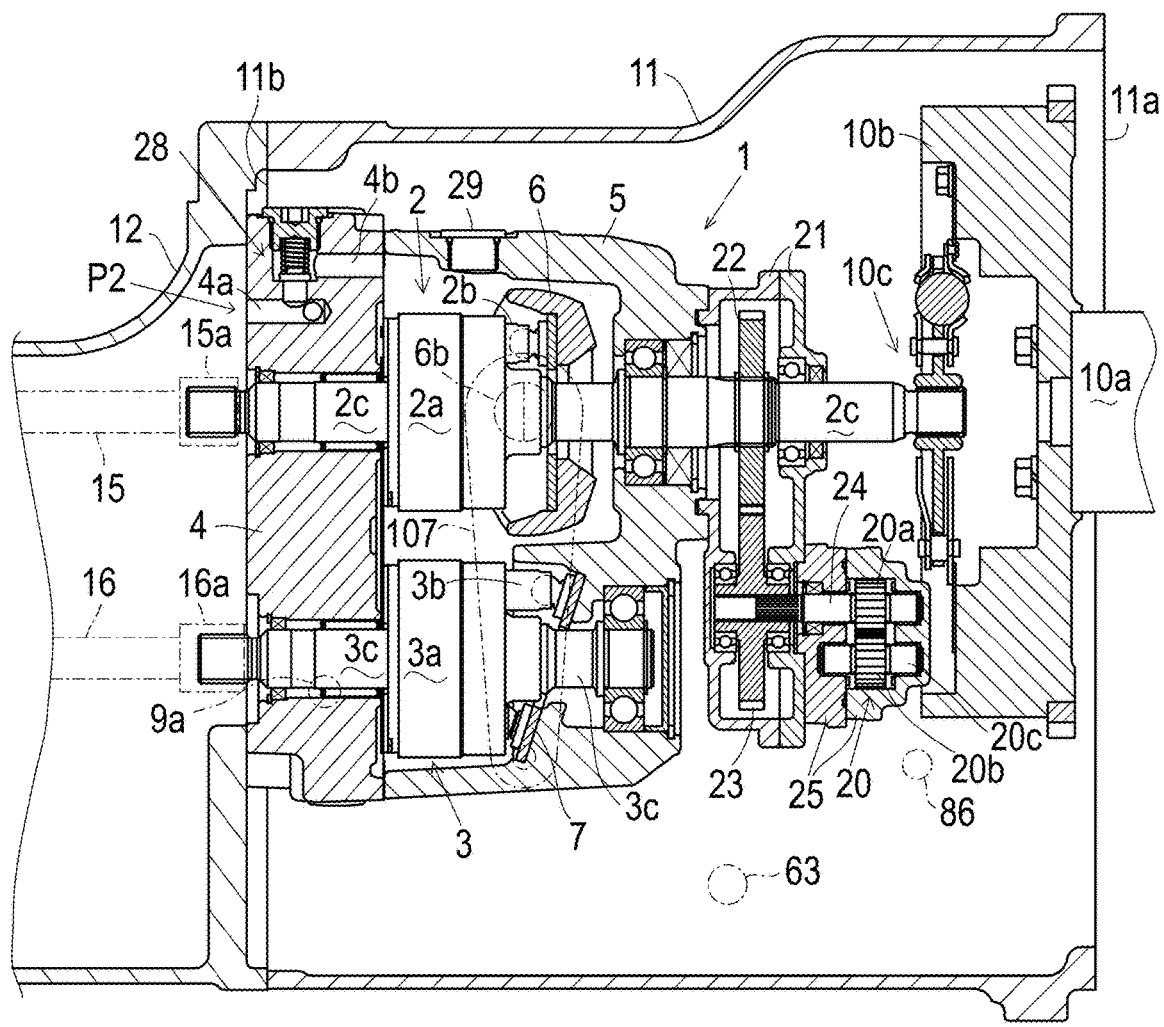
FIG. 2 is a sectional side view of vehicle frame casing 11 showing a structure of an HST 1 therein.

A first embodiment about an HST control mechanism (servomechanism) serving as an actuator device for controlling a movable swash plate of an HST (Hydro-Static-Transmission) shown as an example of a continuously variable transmission capable of switching forward and reverse will be described with reference to FIGS. 1 to 13. Referring to FIGS. 1 and 2, an HST 1, a vehicle frame casing 11 and an axle casing 12 will be described. Vehicle frame casing 11 is a casing formed to serve as a vehicle body frame (chassis). Vehicle frame casing 11 incorporates HST 1 serving as a unit for changing a speed of a vehicle such as a tractor. Vehicle frame casing 11 has front and rear open ends. One of the front and rear end open ends of HST 1 (in this embodiment, the front open end) is an open end 11a, which is joined to an end portion (in this embodiment, a rear end portion) of an engine 10 (see FIG. 13). The other of the front and rear ends of HST 1 is an open end 11b, which is joined to an end portion (in this embodiment, a front end portion) of axle casing 12. Hereinafter, positions and directions of all component elements of the first embodiment and a later-discussed second embodiment are defined on the assumption that vehicle frame casing 11 has front open end 11a and rear open end 11b.

Axle casing 12 journals an axle (not shown) and incorporates a transmission for driving the axle. This transmission transmits power outputted from HST 1 to the axles. The transmission may include a speed-changing mechanism (e.g., a gear transmission). In this case, HST 1 serves as a main speed-changing transmission, and the transmission in axle casing 12 serves as a sub speed-changing transmission.

Vehicle frame casing 11 and axle casing 12 joined to each other serve as a vehicle body frame, which is disposed at a laterally middle portion of a vehicle such as a tractor, for example. Referring to FIG. 1 (and FIG. 2 illustrating another embodiment), this vehicle body frame is fixedly provided on right and left ends thereof with left and right steps 13 and 14 made of horizontal plates, which are used for an operator's getting on and off the vehicle, and as a foot rest for an operator sitting on a seat. A servo set (servomechanism) 40 for controlling a later-discussed movable swash plate of HST 1 is disposed under one of steps 13 and 14 (in this embodiment, step 14. See FIG. 15 or others illustrating the second embodiment).

HST 1 includes a hydraulic pump 2, a hydraulic motor 3, a center section 4, an HST housing 5, a charge pump 20 and others, which are assembled together into a unit defined as HST 1. In this embodiment, center section 4 is shaped as a vertical plate, which is fixed in vehicle frame casing 11 so as to cover rear open end 11b of vehicle frame casing 11. A vertical front surface of center section 4 is formed with a pump mounting surface and a motor mounting surface, which are vertically juxtaposed so that one is above the other. In this embodiment, the pump mounting surface is disposed above the motor mounting surface. A cylinder block 2a of hydraulic pump 2 is rotatably slidably mounted onto the pump mounting surface, and a cylinder block 3a of hydraulic motor 3 onto the motor mounting surface. A valve plate may be interposed between each cylinder block 2a or 3a and the pump or motor mounting surface. HST housing 5 is extended forward from center section 4 so as to cover hydraulic pump 2 and hydraulic motor 3 at upper, lower, right, left and front sides of hydraulic pump 2 and motor 3.

Referring to FIG. 2, a front wall of HST housing 5 is disposed forward from hydraulic pump 2 and motor 3. A movable swash plate 6 of hydraulic pump 2 is disposed adjacent to an upper portion of the front wall of HST housing 5. Movable swash plate 6 is a trunnion-type movable swash plate having later-discussed lateral trunnion shafts pivoted by right and left side walls of HST housing 5, and abuts against heads (front ends) of plungers 2b projecting forward from cylinder block 2a. A later-discussed pump shaft 2c is extended forward from movable swash plate 6, is journalled by an upper portion of the front wall of HST housing 5, and is extended forward from HST housing 5 to as to be drivingly connected to a later-discussed flywheel 10b. On the other hand, a fixed swash plate 6 of hydraulic motor 3 is fixed to a lower portion of the front wall of HST housing 5 so as to abut against heads of plungers 3b projecting forward from cylinder block 3a.

Movable swash plate 6 includes right and left trunnion shafts serving as a fulcrum axis for rotation of movable swash plate 6. Right and left trunnion shafts are journalled by right and left walls of HST housing 5. Of the trunnion shafts, one trunnion shaft 6b projects outward from HST housing 5, and has an end portion projecting outward from a right or left (in this embodiment, right) outer side surface 11c of vehicle frame casing 11 just below step 14. A first arm 107 is fixed at a top portion thereof to the end portion of trunnion shaft 6b. First arm 107 is extended downward along the outer side surface of vehicle frame casing 11, and has a lower end portion to which a rear end portion 82b of a rod 82 extended rearward from a cylindrical member 81 of a neutral returning unit 80.

A second arm 109 is disposed rearward from first arm 107 outside of vehicle frame casing 11, and is extended along outer side surface 11c of vehicle frame casing 11. Second arm 109 has a pivot shaft 109a at a vertically intermediate portion thereof so as to be pivoted onto outer side surface 11c of vehicle frame casing 11 via pivot shaft 109a. Second arm 109 is pivotally connected at a top portion thereof to a vertically intermediate portion of first arm 107 via a link 108. A tip (i.e., rear end) of a piston rod 33a extended rearward from a hydraulic cylinder 32 of a servo unit 60 is pivotally connected to a lower end portion of second arm 109. Servo unit 60 and a neutral returning unit 80 are assembled together so as to constitute a servo set (i.e., servomechanism) 40 for controlling movable swash plate 6 of hydraulic pump 2. In this regard, first arm 107, link 108 and second arm 109 serve as a rotary member, to which a piston rod 33a of a piston 33 serving as a telescopic actuator of servo unit 60 and a rear end portion 82b of a rod 82 serving as a telescopic member of neutral returning unit 80 are pivotally connected. Neutral returning unit 80 includes a neutral biasing spring 83 (the neutral spring) serving as a biasing device. Neutral biasing spring 83 biases rod 82 toward its neutral position corresponding to a neutral position of movable swash plate 6.

Due to a fore-and-aft telescopic movement of piston rod 33a of servo unit 60, second arm 109 rotates centered on pivot shaft 109a. Accordingly, first arm 107 connected to second arm 109 via link 108 rotates centered on an axis of trunnion shaft 6b, thereby rotating movable swash plate 6 of hydraulic pump 2, because trunnion shaft 6b of movable swash plate 6 is fixed to first arm 107. Further, due to the telescopic movement of piston rod 33a and the rotation of second arm 109, first arm 107 rotates so as to move rod 82 telescopically against the biasing force of neutral biasing spring 83. In servo unit 60, proportional pressure control valves 35 and 36 can be controlled to apply an operation force to piston rod 33a. Once piston rod 33a is released from the operation force, rod 82 returns to the neutral position defined by the biasing force of neutral biasing spring 83, thereby returning first arm 107 and movable swash plate 6 to their neutral positions. Due to the movement of first arm 107 to its neutral position, second arm 109 is rotated via link 108 so that piston rod 33a returns to a position in the telescopic movement direction (fore-and-aft direction) of piston rod 33a corresponding to the neutral position of movable swash plate 6 with trunnion shafts 6a.

Hydraulic pump 2 includes a fore-and-aft horizontal pump shaft 2c serving as a rotary axis of cylinder block 2a. Hydraulic motor 3 includes a fore-and-aft horizontal motor shaft 3c serving as a rotary axis of cylinder block 3a. Pump shaft 2c and motor shaft 3c are journalled by center section 4. Rear end portions of pump shaft 2c and motor shaft 3c project rearward from center section 4 into axle casing 12. In axle casing 12, a front end portion of a PTO shaft or a front end portion of a PTO transmission shaft 15 interlocking with the PTO shaft is connected via a coupling 15a to the rear end portion of pump shaft 2c. On the other hand, in axle casing 12, a front end portion of an input shaft 16 of the transmission in axle casing 12 is connected via a coupling 16a to the rear end portion of motor shaft 3c serving as an output shaft of HST 1.

In vehicle frame casing 11, a gear casing 21 is fixed to a front end of HST housing 5. A front portion of pump shaft 2c projects forward from the front wall of HST housing 5 through gear casing 21. After engine 10 is joined to front open end 11a of vehicle frame casing 11, a fore-and-aft horizontal engine output shaft 10a of engine 10 is extended into vehicle frame casing 11 via front open end 11a, so that a flywheel 10b provided at a rear end portion of engine 10 is disposed in a front inside space in vehicle body frame 11. Pump shaft 2c serving as an input shaft of HST 1 projects forward from gear casing 21 as mentioned above, so that a front end portion of pump shaft 2c is connected to flywheel 10b via a damper 10c.

In gear casing 21, pump shaft 2c is journalled at a fore-and-aft intermediate portion thereof, and a charge pump driving shaft 24 is extended parallel to pump shaft 2c and is journalled. In gear casing 21, a gear 22 is fixed on the fore-and-aft intermediate portion of pump shaft 2c, and a gear 23 is fixed on charge pump driving shaft 24. Gears 22 and 23 mesh with each other so as to constitute a gear train for transmitting power from pump shaft 2c to charge pump driving shaft 24. A pump housing 26 incorporating charge pump 20 is fixed to a front end of gear casing 21 so as to extend parallel to the front portion of pump shaft 2c projecting forward from gear casing 21. Charge pump driving shaft 24 projects forward from gear casing 21 into pump housing 25. In pump housing 25, a pump driven shaft 20c parallel to charge pump driving shaft 24 is journalled. In pump housing 25, a pump gear 20a fixed on charge pump driving shaft 24 and a pump gear 20b fixed on pump driven shaft 20c mesh with each other so as to constitute a gear pump serving as charge pump 20.

Figure 13:
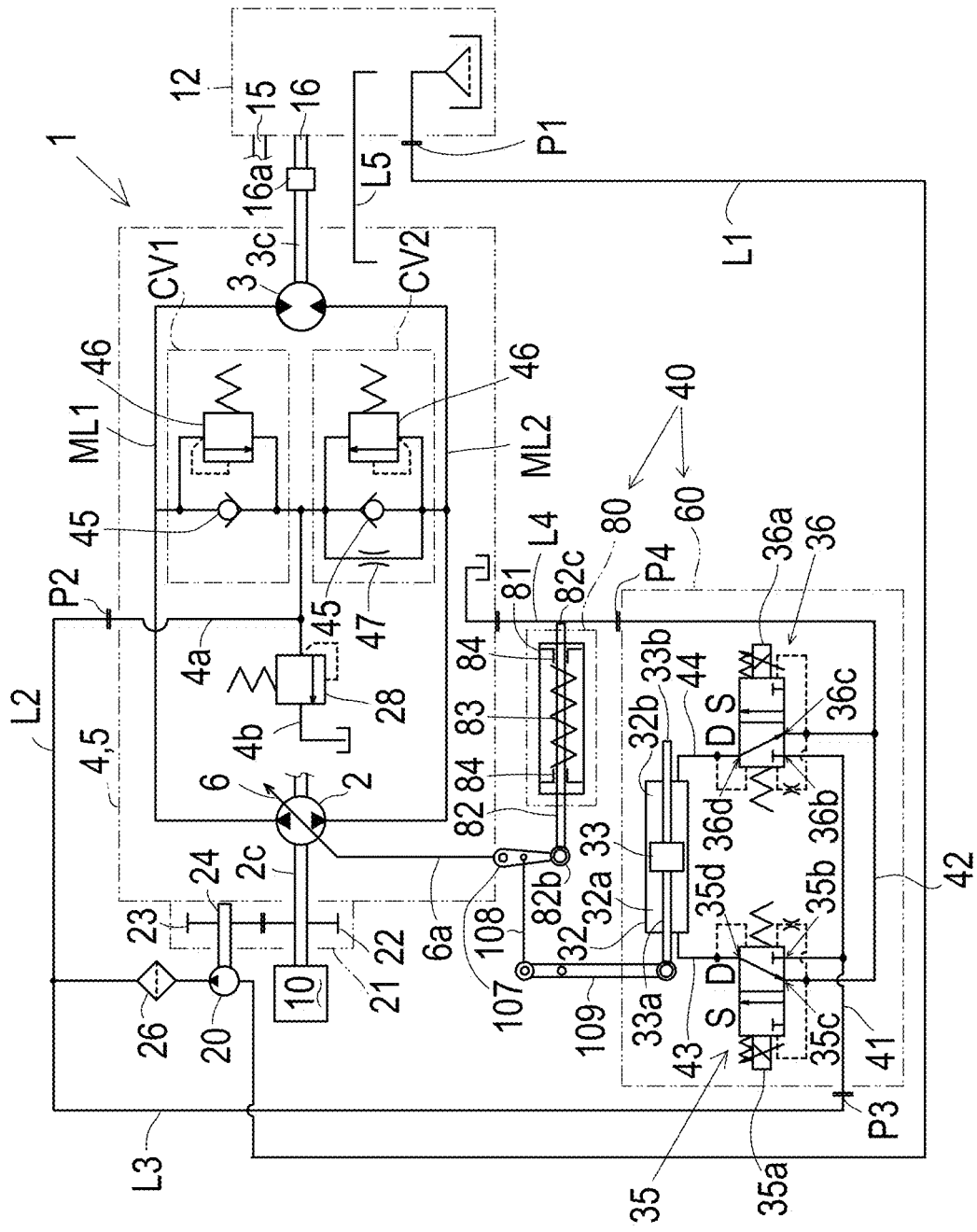
FIG. 13 is a hydraulic circuit diagram for supplying fluid to HST 1 and servo set 40.

Referring to FIGS. 2 and 13, a hydraulic fluid supply system for supplying fluid from charge pump 20 to HST 1 will be described. Charge pump 20 sucks fluid from a fluid sump in axle casing 12. In this regard, axle casing 12 has a fluid discharge port P1. Fluid of the fluid sump in axle casing 12 is taken out of axle casing 12 via fluid discharge port P1 and is sucked to a suction port of charge pump 20 disposed in vehicle frame casing 11 via a fluid passage L1. Fluid passage L1 may be formed within a wall of vehicle frame casing 11, or may be made of pipes disposed outside of casings 11 and 12, for example.

Fluid delivered from a delivery port of charge pump 20 is taken out of vehicle frame casing 11 again, and is supplied into a charge fluid passage 4a formed in center section 4 via a line filter 26, a fluid passage L2 and a charge port P2. In the embodiment shown in FIG. 2, charge fluid passage 4a has an open end serving as charge port P2 at a rear end surface of center section 4, and fluid passage L2 is connected to charge port P2.

A relief valve 28 is provided in center section 4 so as to adjust a hydraulic pressure of fluid in charge fluid passage 4a of center section 4. Fluid released from relief valve 28 is drained into a chamber in HST housing 5 forward from center section 4 via a drain fluid passage 4b formed in center section 4. Referring to FIG. 1, HST housing 5 has a drain port for draining fluid from the inside of HST housing 5. This drain port is normally plugged with a drain cap 29, as shown in FIG. 2. Fluid from the drain port is drained to the fluid sump in HST housing 5 or vehicle frame casing 11. This fluid sump may be fluidly connected to a fluid sump in axle casing 12 via a fluid passage L5, as shown in FIG. 13.

Referring to FIG. 13, center section 4 is formed therein with a pair of main fluid passages ML1 and ML2 that are interposed between hydraulic pump 2 and hydraulic motor 3. Center section 4 is provided therein with a pair of charge valve units CV1 and CV2. The fluid in charge fluid passage 4a has a hydraulic pressure regulated by relief valve 28. When main fluid passage ML1 is hydraulically depressed, a check valve 45 in charge valve unit CV1 is opened so that the fluid in charge fluid passage 4a is supplied to main fluid passage ML1 via opened check valve 45 in charge valve unit CV1. When main fluid passage ML2 is hydraulically depressed, a check valve 45 in charge valve unit CV2 is opened so that the fluid in charge fluid passage 4a is supplied to main fluid passage ML2 via opened check valve 45 in charge valve unit CV2. Each of charge valve units CV1 and CV2 includes a relief valve 46 that bypasses corresponding check valve 45 so as to regulate the hydraulic pressure in corresponding main fluid passage ML1 or ML2.

One of charge valve units CV1 and CV2 includes an orifice 47 bypassing corresponding check valve 45 so that orifice 47 functions to expand a neutral region of HST 1. If main fluid passage ML2 is designated to have a higher hydraulic pressure than that of main fluid passage ML1 during backward traveling of the vehicle, preferably, charge valve unit CV2 for supplying fluid to main fluid passage ML2 has orifice 47.

Referring to the hydraulic circuit diagram of FIG. 13, a general configuration of servo set 40 and a fluid supply system for supplying fluid from charge pump 20 to servo unit 60 of servo set 40. A delivery fluid passage from charge pump 20 passes line filter 26 and then is bifurcated into fluid passages L2 and L3. Fluid passage L2 is extended into HST 1. Fluid passage L3 is extended to servo unit 60. In this way, charge pump 20 supplies hydraulic fluid to both HST 1 and servo unit 60 for controlling movable swash plate 6 of HST 1.

Servo unit 60 includes a hydraulic cylinder 32 and proportional pressure control valves 35 and 36. Piston 33 serving as the actuator for controlling the position of movable swash plate 6 is slidably fitted in hydraulic cylinder 32. Opposite piston rods 33a and 33b are extended from piston 33 and project outward from opposite ends of hydraulic cylinder 32. The tip of piston rod 33a is pivotally connected to second arm 109 as mentioned above.

Proportional pressure control valve 35 is adapted to supply or discharge fluid to and from a fluid chamber 32a formed in hydraulic cylinder 32 on one side of piston 33. Proportional pressure control valve 36 is adapted to supply or discharge fluid to and from a fluid chamber 32b formed in hydraulic cylinder 32 on the other side of piston 33. Proportional pressure control valves 35 and 36 are proportional solenoid valves provided with respective proportional solenoids 35a and 36a. Proportional pressure control valve 35 has a valve port 35d fluidly connected to fluid chamber 32a in hydraulic cylinder 32 via a hydraulic fluid passage 43. Proportional pressure control valve 36 has a valve port 36d fluidly connected to fluid chamber 32b in hydraulic cylinder 32 via a hydraulic fluid passage 44. One of proportional pressure control valves 35 and 36 is designated so as to be excited during forward traveling of the vehicle, and the other of proportional pressure control valves 35 and 36 so as to be excited during backward traveling of the vehicle. Either proportional pressure control valve 35 or 36, which is excited, supplies fluid from its valve port 35d or 36d to corresponding fluid chamber 32a or 32b via corresponding hydraulic fluid passage 43 or 44.

Servo unit 60 has an inlet port P3 and an outlet port P4. Inlet port P3 receives fluid delivered from charge pump 20 via fluid passage L3. Outlet port P4 is fluidly connected to the fluid sump in vehicle frame casing 11 via a fluid passage L4. Proportional pressure control valves 35 and 36 have respective suction ports 35b and 36b and respective drain ports 35c and 36c. The fluid introduced into servo unit 60 from fluid passage L3 via inlet port P3 is supplied to suction ports 35b and 36b of respective proportional pressure control valves 35 and 36. A drain fluid passage 42 extended to outlet port P4 collects fluid from both drain ports 35c and 36c of proportional pressure control valves 35 and 36 so as to drain the collected fluid to the fluid sump in vehicle frame casing 11 via outlet port P4 and fluid passage L4 outside of servo unit 60.

Each of the proportional solenoid valves serving as proportional pressure control valves 35 and 36 has a movable member such as a spool. Each of proportional solenoids 35a and 36a has a driving force to drive the movable member in the direction against the spring force (i.e., the biasing force of neutral biasing spring 83 of neutral returning unit 80) and the hydraulic pressure, and controls the position of the movable member so as to balance the movable member against the spring force and the hydraulic pressure, thereby controlling the flow and pressure of fluid through corresponding proportional pressure control valve 35 or 36. The driving force of each of proportional solenoids 35a and 36a is proportional to a current (cutoff current) value applied on proportional solenoid 35a or 36a. Referring to FIG. 13, each of proportional pressure control valves 35 and 36 is vibratorily shifted between a supply position S and a drain position D in correspondence to the current value applied on its proportional solenoid 35a or 36a.

Each of proportional pressure control valves 35 and 36, when it is set at supply position S, fluidly connects its valve port 35d or 36d to its suction port 35b or 36b so that fluid introduced to suction port 35b or 36b via inlet port P3 is supplied to corresponding fluid chamber 32a or 32b. Each of proportional pressure control valves 35 and 36, when it is set at drain position D, fluidly connects its valve port 35d or 36d to its drain port 35c or 36c so that fluid introduced to valve port 35d or 36d from corresponding fluid chamber 32a or 32b is supplied to corresponding fluid chamber 32a or 32b. The vibratory shift of each of proportional pressure control valves 35 and 36 between supply position S and drain position D means a repeat of alternate supply and drain of fluid to and from corresponding fluid chamber 32a or 32b. Due to such repeated supply and drain of fluid, a hydraulic pressure in corresponding fluid chamber 32a or 32b is set so that piston 33 is stroked to a position where the hydraulic pressure is balanced against pressure in the other fluid chamber 32a or 32b and the biasing force of neutral biasing spring 83. Incidentally, a controller (not shown) creates the current value in correspondence to an operation degree of a speed control manipulator (not shown) such as a pedal or a lever.

The description of servo set 40 with reference to FIG. 13 is ended. Now, configurations of servo unit 60 and neutral returning unit 80 in servo set 40 will be described in detail with reference to FIGS. 1 to 12. As mentioned above, servo unit 60 and neutral return unit 80 are disposed outside of vehicle frame casing 11 so as to extend along outer side surface 11c of vehicle frame casings 11. Hereinafter, with regard to the lateral direction of servo unit 60 and neutral returning unit 80, a side close to outer side surface 11c is referred to a "laterally proximal" side, and a side away from (opposite) outer side surface 11c is referred to a "laterally distal" side.

Figure 3:
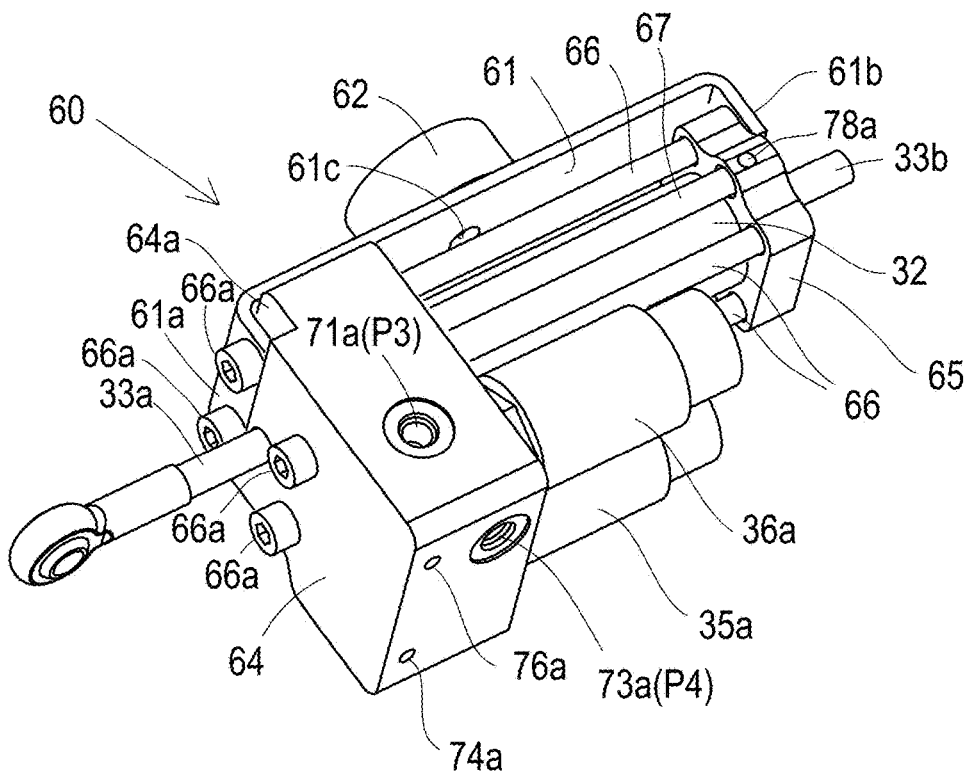
FIG. 3 is a perspective view of a servo unit 60.
Figure 4:
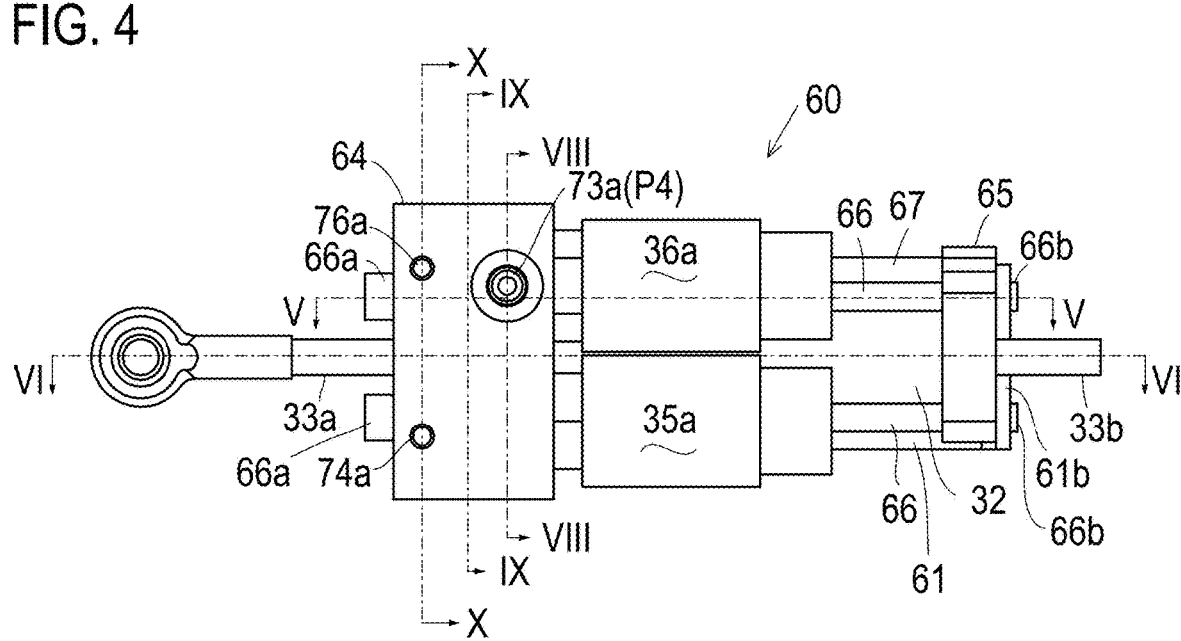
FIG. 4 is a side view of servo unit 60.
Figure 5:
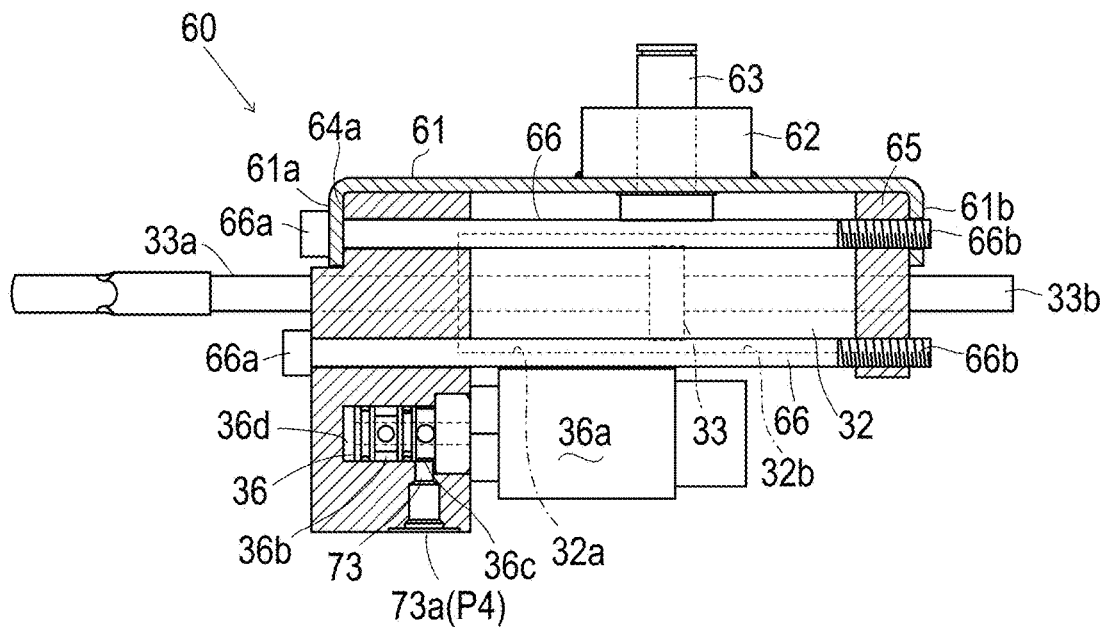
FIG. 5 is a cross sectional view taken along V-V line of FIG. 4.
Figure 6:
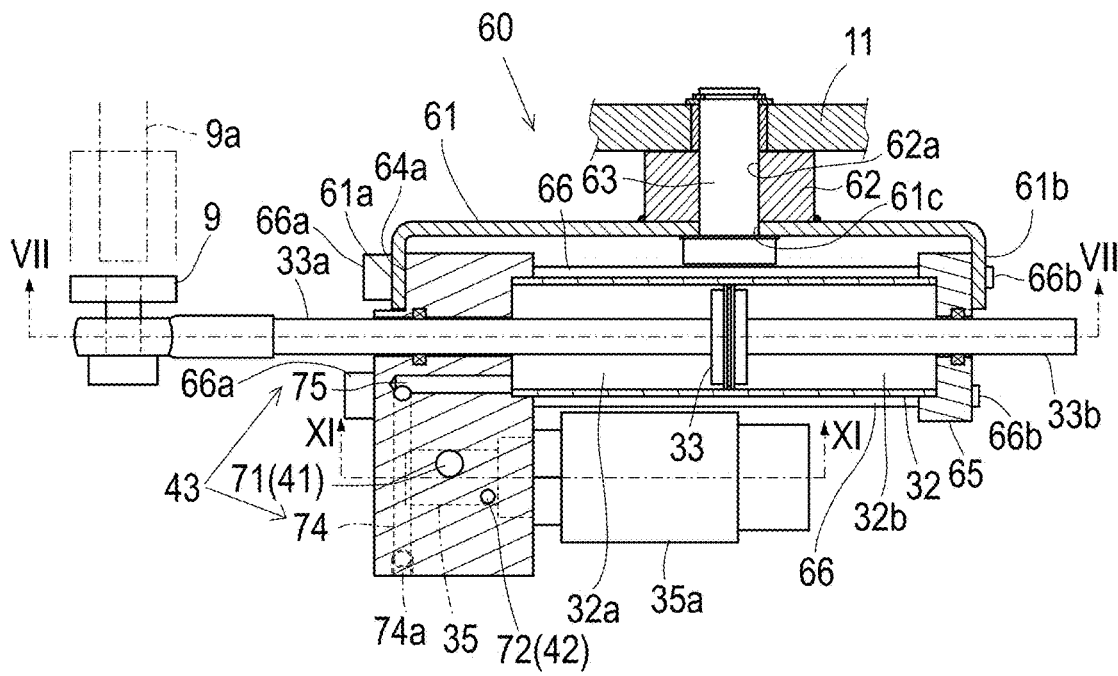
FIG. 6 is a cross sectional view taken along VI-VI line of FIG. 4.

Referring to FIGS. 1 to 11, the configuration of servo unit 60 will be described. Servo unit 60 includes a bracket 61, a valve block 64 and a fluid duct block 65. As shown in FIGS. 3 and 6, bracket 61 is a plate-shaped member, which is extended in the fore-and-aft direction along outer side surface 11c of vehicle frame casing 11. Bracket 61 has a rear end portion 61a and a front end portion 61b, which are bent to the laterally distal side. Referring to FIGS. 3, 6 and 8 to 10, a sleeve-shaped boss 62 is fixed on a fore-and-aft middle portion of bracket 61 between rear and front end portions 61a and 61b and is extended to the laterally proximal side. Referring to FIGS. 3 and 6, bracket 61 is formed therethrough with a boss hole 61c, and boss 62 is formed therethrough with a boss hole 62a.

Referring to FIG. 6, a pivot shaft 63 is passed at a laterally distal portion thereof through boss holes 61c and 62a. Pivot shaft 63 is inserted at a laterally proximal end portion thereof into vehicle frame casing 11 through outer side surface 11c so as to be retained in vehicle frame casing 11. In other words, bracket 61 is pivoted at the fore-and-aft middle portion thereof on vehicle frame casing 11 via the proximally distal portion of laterally horizontal pivot shaft 63 projecting outward from outer side surface 11c of vehicle frame casing 11. Therefore, rear end portion 61a and front end portion 61b of bracket 61 are able to vertically oscillate centered on pivot shaft 63.

Referring to FIGS. 3, 5, 6 and 10, valve block 64 is formed with a stepped surface 64a, which contacts rear end portion 61a of bracket 61. On the other hand, referring to FIGS. 1 and 3 to 7, fluid duct block 65 contacts front end portion 61b of bracket 61 at a front end surface thereof. Referring to FIGS. 1 and 3 to 10, hydraulic cylinder 32 is sandwiched between valve block 64 and fluid duct block 65. Four connection rods 66 are disposed so as to surround hydraulic cylinder 32, and are extended parallel to hydraulic cylinder 32. Four connection rods 66 consist of a pair of right and left connection rods 66 above hydraulic cylinder 32, and a pair of right and left connection rods 66 below hydraulic cylinder 32. In other words, they consist of a pair of upper and lower connection rods 66 on the laterally proximal side of hydraulic cylinder 32 (hereinafter referred to as upper and lower proximal connection rods 66), and a pair of upper and lower connect rods 66 on the laterally distal side of hydraulic cylinder 32 (hereinafter referred to as upper and lower distal connection rods 66).

Referring to FIG. 5, each connection rod 66 is a bolt having a rear end portion formed as a bolt head 66a, and a front end portion formed as a threaded shaft portion 66b. Each connection rod 66 is inserted forward into valve block 64. In this regard, upper and lower proximal connection rods 66 are inserted into valve block 64 via rear end portion 61a of bracket 61 contacting stepped surface 64a of valve block 64. Each connection rod 66 has front threaded shaft portion 66b screwed through fluid duct block 65. In this regard, upper and lower proximal connection rods 66 have respective front threaded shaft portions 66b further screwed through front end portion 61b of bracket 61 contacting the front end surface of fluid duct block 65.

As mentioned above, four connection rods 66 are passed through valve block 64 and fluid duct block 65. Upper and lower distal connection rods 66 have respective bolt heads 66a contacting a rear end surface of valve block 64. Upper and lower proximal connection rods 66 have respective bolt heads 66a contacting rear end portion 61a of bracket 61. Therefore, four connection rods 66 fasten valve block 64 and fluid duct block 65 sandwiching hydraulic cylinder 32 therebetween to each other. Further, upper and lower proximal connection rods 66 fasten valve block 64 and fluid duct block 65 to rear and front end portions 61a and 61b of bracket 61. In this way, bracket 61, boss 62, hydraulic cylinder 32, valve block 64, hydraulic block 65 and connection rods 66 are assembled together into servo unit 60, so that they are all rotatably centered on pivot shaft 63. Connection rods 66 are not limited in number, position and so on. The only thing required for connection rods 66 is to be appropriate to assembling of hydraulic cylinder 32, valve block 64 and fluid duct block 65 so that hydraulic cylinder 32, valve block 64 and fluid duct block 65 are integrally rotatable centered on pivotal shaft 63.

Moreover, referring to FIGS. 1, 3 and 4 to 7, a fluid pipe 67 is disposed above hydraulic cylinder 32 and is extended parallel to hydraulic cylinder 32 so as to be interposed between valve block 64 and fluid duct block 65, thereby ensuring a fluid flow between valve block 64 and fluid duct block 65. A configuration of fluid passages, including fluid pipe 67, will be detailed later.

Figure 7:
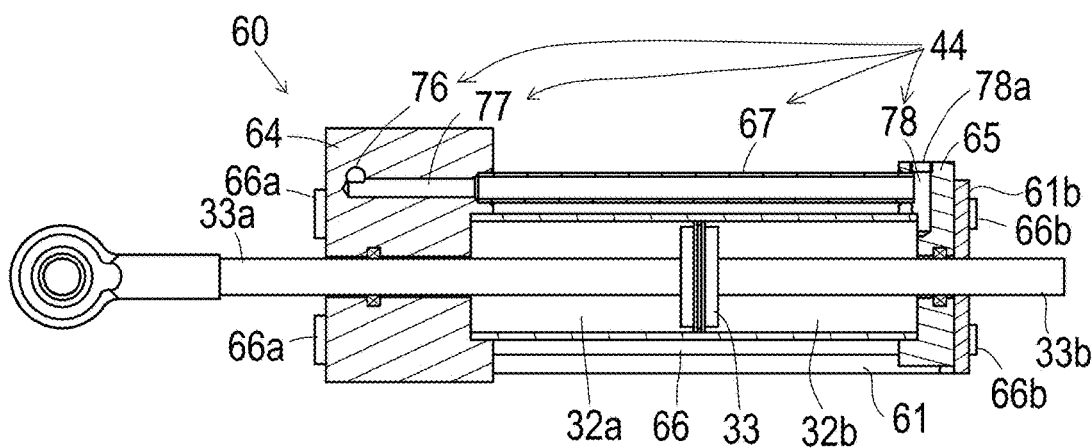
FIG. 7 is a cross sectional view taken along VII-VII line of FIG. 6.

Referring to FIGS. 6 and 7, in this embodiment, the chamber close to the rear end of hydraulic cylinder 32 fixed to valve block 64 serves as fluid chamber 32a, and the chamber close to the front end of hydraulic cylinder 32 fixed to fluid duct block 65 serves as fluid chamber 32b. Piston rod 33a is extended rearward from piston 33 in hydraulic cylinder 32 so as to pass through fluid chamber 32a of hydraulic cylinder 32. Piston rod 33a further passes through valve block 64 and projects rearward from valve block 64 so as to have the rear end portion pivotally connected to the lower end portion of second arm 109 as mentioned above. On the other hand, piston rod 33b is extended forward from piston 33 in hydraulic cylinder 32 so as to pass through fluid chamber 32b of hydraulic cylinder 32. Piston rod 33b further passes through fluid duct block 65 and projects at a front end portion thereof forward from fluid duct block 65.

According to the fore-and-aft slide of piston 33 in hydraulic cylinder 32, piston rod 33a projecting rearward from valve block 64 and piston rod 33b projecting forward from fluid duct block 65 are moved telescopically (linearly). Referring to FIGS. 1 and 13, the linear movement of piston rod 33a causes second arm 109 to rotate centered on pivot shaft 109a. During the rotation of second arm 109, the lower end portion of second arm 109 changes its position in the vertical direction, so that the rear end portion of piston rod 33a pivotally connected to the lower end portion of second arm 109 is oscillated vertically. The vertical oscillation of the rear end portion of piston rod 33a is enabled by the above-mentioned integral rotatability of hydraulic cylinder 32, valve block 64 and fluid duct block 65 centered on pivot shaft 63. In other words, according to the telescopic movement of piston rod 33a, hydraulic cylinder 32, valve block 64 and fluid duct block 56 are integrally rotated centered on pivot shaft 63 so as to prevent second arm 109 pivotally connected to piston rod 33a from being twisted, whereby second arm 109 can rotate according to the telescopic (linear) movement of piston rod 33a.

Valve block 64 further expands to the laterally distal side from the portion thereof connected to hydraulic cylinder 32 and connection rods 66. The laterally distal expanded portion of valve block 64 incorporates proportional pressure control valves 35 and 36 that are juxtaposed upper and lower. In this embodiment, proportional pressure control valve 36 fluidly connected to fluid chamber 32b is disposed above proportional pressure control valve 35 fluidly connected to fluid chamber 32a. Proportional solenoids 35a and 36a of proportional pressure control valves 35 and 36 project forward from the expanded portion of valve block 64 and are extended parallel to hydraulic cylinder 32.

Figure 9:
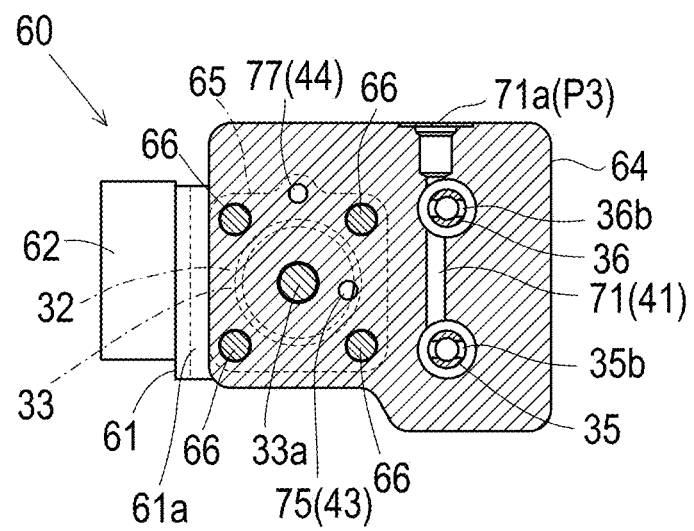
FIG. 9 is a cross sectional view taken along IX-IX line of FIG. 4.
Figure 11:
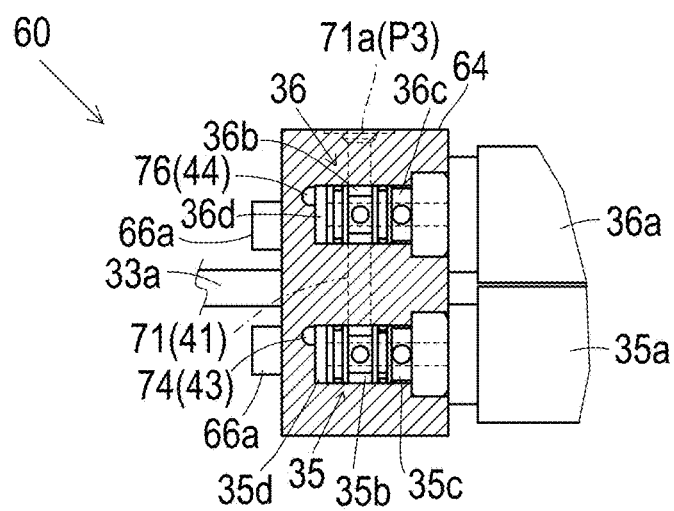
FIG. 11 is a cross sectional view taken along XI-XI line of FIGS. 6 and 7.

Referring to FIGS. 6, 9 and 11, valve block 64 is bored therein with a vertical fluid hole 71. In valve block 64, fluid hole 71 is fluidly connected at a vertically intermediate portion thereof to suction port 36b of proportional pressure control valve 36, and at a lower end portion thereof to suction port 35b of proportional pressure control valve 35. Fluid hole 71 serves as suction fluid passage 41 shown in the hydraulic circuit diagram of FIG. 13. Referring to FIGS. 3, 9 and 11, an upper end 71a of fluid hole 71 is open at a top surface of valve block 64, so that upper end 71a of fluid hole 71 serves as inlet port P3 shown in the hydraulic circuit diagram of FIG. 13.

Figure 8:
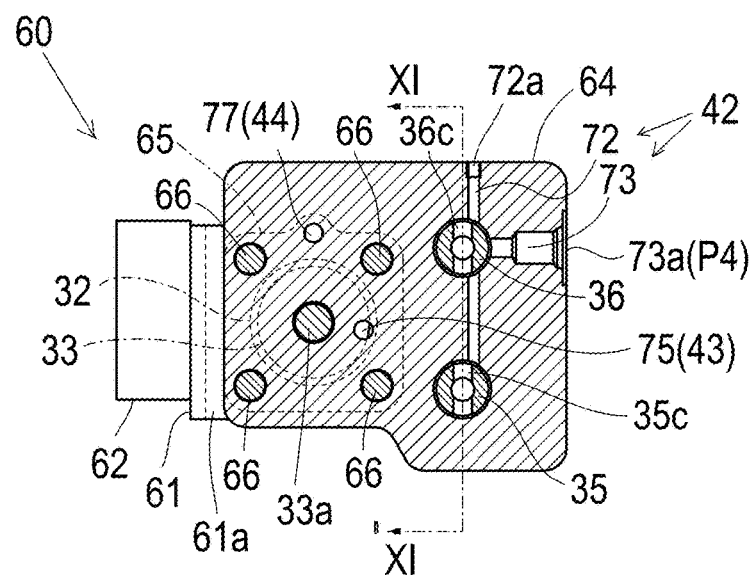
FIG. 8 is a cross sectional view taken along VIII-VIII line of FIG. 4.

Referring to FIGS. 6 and 8, valve block 64 is bored therein with a vertical fluid hole 72. An upper end 72a of fluid hole 72 is disposed at the top surface of valve block 64 and is plugged. Fluid hole 72 is fluidly connected at a vertically intermediate portion thereof to drain port 36c of proportional pressure control valve 36, and at a lower end thereof to drain port 35c of proportional pressure control valve 35. Referring to FIG. 8, valve block 64 is further bored therein with a horizontal fluid hole 73 that is extended laterally distally from a vertically intermediate portion of fluid hole 72. Fluid holes 72 and 73 formed in valve block 64 serve as drain fluid passage 42 shown in the hydraulic circuit diagram of FIG. 13. Referring to FIGS. 1, 3, 4 and 8, fluid hole 73 has a laterally distal end 73a open at a laterally distal side surface of valve block 64, so that laterally distal end 73a of fluid hole 73 serves as outlet port P4 in FIG. 13.

Referring to FIGS. 6 to 10, valve block 64 is bored in a lower half portion thereof with a vertically slant fluid hole 74 extended laterally along the rear end surface of valve block

Figure 10:
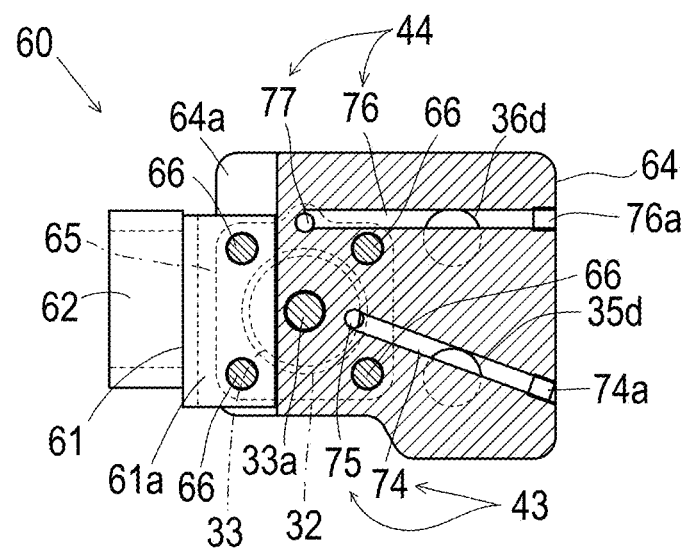
FIG. 10 is a cross sectional view taken along X-X line of FIG. 4.

64. Referring to FIGS. 3 to 6 and 10, a laterally distal end 74a of fluid hole 74 is disposed at the laterally distal side surface of valve block 64, and is plugged. Fluid hole 74 is fluidly connected at a laterally intermediate portion thereof to valve port 35d of proportional pressure control valve 35. Referring to FIGS. 6 and 8 to 10, valve block 64 is bored therein with a fore-and-aft horizontal fluid hole 75. Referring to FIGS. 6 and 10, a rear end of fluid hole 75 and a laterally proximal end of fluid hole 74 are joined to each other. Referring to FIG. 6, a front end of fluid hole 75 is open at a rear end of fluid chamber 32a in hydraulic cylinder 32. In this way, fluid holes 74 and 75 formed in valve block 64 serve as hydraulic fluid passage 43 that fluidly connects valve port 35d of proportional pressure control valve 35 to fluid chamber 32a of hydraulic cylinder 32 as shown in FIG. 13.

Referring to FIGS. 7, 10 and 11, valve block 64 is bored in an upper half portion thereof with a laterally horizontal fluid hole 76 along the rear end surface of valve block 64. Referring to FIGS. 3, 4 and 10, a laterally distal end 76a of fluid hole 76 is disposed at the laterally distal side surface of valve block 64, and is plugged. Valve hole 76 is fluidly connected at a laterally intermediate portion thereof to valve port 36d of proportional pressure control valve 36. Further, referring to FIGS. 7 to 10, valve block 64 is bored therein with a fore-and-aft horizontal fluid hole 77. Referring to FIGS. 7 and 10, a rear end of fluid hole 77 and a laterally proximal end of fluid hole 76 are joined to each other. On the other hand, as mentioned above, fluid pipe 67 is interposed between valve block 64 and fluid duct block 65. Referring to FIG. 7, a rear open end portion of fluid pipe 67 is fitted into valve block 64 and is joined to a front open end of fluid hole 77.

Referring to FIG. 7, fluid duct block 65 is bored therein with a vertical fluid hole 78. Referring to FIGS. 3 and 7, an upper end of fluid hole 74 is disposed at the top surface of fluid duct block 65, and is plugged. A front open end portion of fluid pipe 67 is fitted into fluid block 65 and is joined to a vertically intermediate portion of fluid hole 78. Fluid hole 78 is fluidly connected at a lower end thereof to fluid chamber 32b via a front end portion of hydraulic cylinder 32 fitted into fluid duct block 65. In this way, fluid holes 76 and 77 formed in valve block 64, fluid pipe 67 interposed between valve block 64 and fluid duct block 65, and fluid hole 78 formed in fluid duct block 65 serve as hydraulic fluid passage 44 that fluidly connects valve port 36d of proportional pressure control valve 36 to fluid chamber 32b of hydraulic cylinder 32 as shown in the hydraulic circuit diagram of FIG. 13.

Neutral returning unit 80 will be described in detail with reference to FIGS. 1, 12 and 13. Neutral returning unit 80 includes cylinder member 81, rod 82, a neutral biasing spring 83, spring retainers 84, a bracket 85, a pivot shaft 86, retaining rings 87, and a nut 88. As mentioned above, cylindrical member 81 is extended along outer side surface 11c of vehicle frame casing 11. Cylindrical member 81 is pivoted at a fore-and-aft middle portion thereof on vehicle frame casing 11 via pivot shaft 86, so that cylindrical member 81 can be vertically oscillated at front and rear ends thereof centered on pivot shaft 86 at the fore-and-aft intermediate portion thereof.

Referring to FIG. 1, bracket 85 surrounds the fore-and-aft intermediate portion of cylindrical member 81 pivoted on pivot shaft 86. Bracket 85 is formed at upper and lower end portions thereof with respective tabs 85a having respective bolt holes 85b. Bolts (not shown) are passed through respective bolt holes 85b so as to fasten upper and lower tabs 85a of bracket 85 to outer side surface 11c of vehicle frame casing 11, thereby fixing bracket 85 to vehicle body frame 11. Bracket 85 is spaced from upper and lower end portions of cylindrical member 81 so as to allow cylindrical member 81 to oscillate centered on pivot shaft 86. Conversely, the space between bracket 85 and cylindrical member 81 defines an oscillation range of cylindrical member 81.

Cylindrical member 81 is open at front and rear ends thereof. Rod 82 is fore-and-aft extended through cylindrical member 81. A rear end portion 82b of rod 82 is extended rearward from the rear end of cylindrical member 81 and is pivotally connected to the tip of first arm 107, as mentioned above. Rod 82 is axially (fore-and-aft) slidable so that a front end portion 82c of rod 82 is able to project forward from the front end of cylindrical member 81 when rod 82 slides forward.

In cylindrical member 81, front and rear spring retainers 84 are fitted on rod 82 so as to be axially slidable relative to rod 82. Neutral biasing spring 83 is interposed between front and rear spring retainers 84 and is coiled to surround rod 82. Front and rear retaining rings 87 are fixed on front and rear inner peripheral portions of cylindrical member 81. Front retaining ring 87 restricts a forward slide of front spring retainer 84. Rear retaining ring 87 restricts a rearward slide of rear spring retainer 84.

Figure 12:
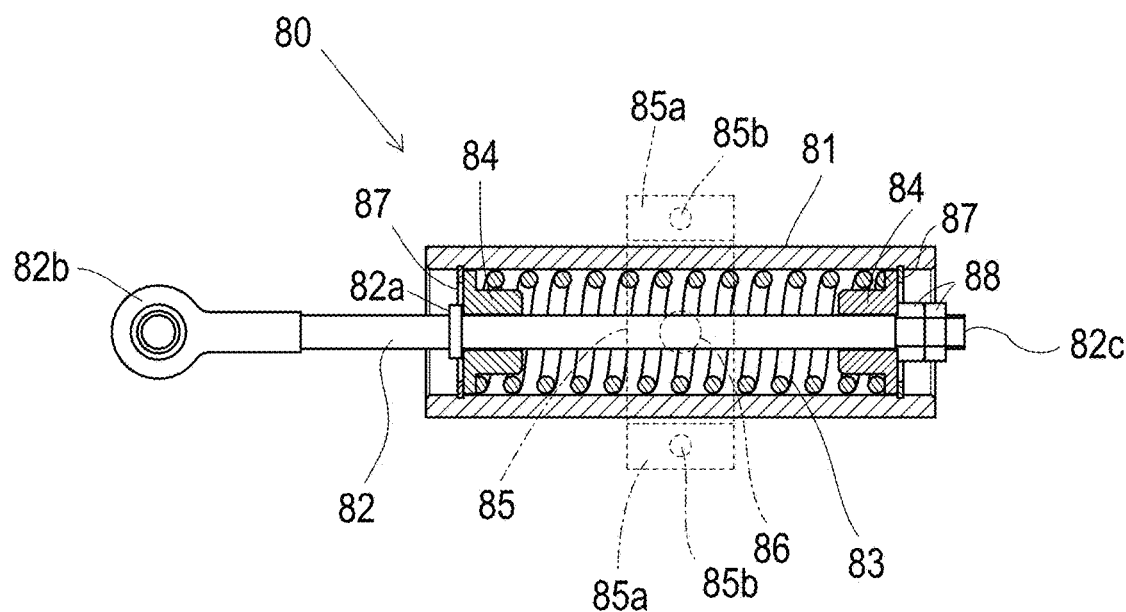
FIG. 12 is a sectional side view of a neutral returning unit 80.

FIG. 12 illustrates neutral returning unit 80 having neutral biasing spring 83 compressed in its initial state. In this state, due to the fore-and-aft expansion force of neutral biasing spring 83, both front and rear spring retainers 84 are pressed against respective retaining rings 87. A flange 82 is formed on an axially intermediate portion of rod 82 so that flange 82a contacts rear spring retainer 84 contacting rear retaining ring 87. Nut 88 is screwed on rod 82 close to front end portion 82c so that nut 88 contacts a front end of front spring retainer 84 contacting front retaining ring 87.

A position of rod 82 in its sliding direction where neutral biasing spring 83 is in the initial state as shown in FIG. 12 is defined as a neutral position of rod 82 serving as the telescopic member. The configuration to connect rod 82 to movable swash plate 6 via first arm 107 is designed so that movable swash plate 6 is set at its neutral position when rod 82 is disposed at the neutral position of rod 82. On the other hand, a position of piston 33 realized by the condition of hydraulic fluid in fluid chambers 32a and 32b in hydraulic cylinder 32 when both proportional solenoids 35a and 35b of proportional pressure control valves 35 and 36 are unexcited is defines as a neutral position of piston 33. The configuration to connect rod 82 to piston rod 33a via first arm 107, link 108 and second arm 109 is designed so that piston 33 is set at its neutral position when rod 82 is disposed at the neutral position of rod 82.

When piston 33 with piston rods 33a and 33b slides forward from its neutral position, this telescopic movement of piston 33 is transmitted to movable swash plate 6 via second arm 109, link 108 and first arm 107 so as to tilt movable swash plate 6 in one direction for either forward or backward traveling of the vehicle. At this time, the lower end portion of first arm 107 rotates rearward so that rod 82 slides rearward. Cylindrical member 81 oscillates centered on pivot shaft 86 so as to absorb the differential movement between the circular movement of first arm 107 serving as the rotary member and the linear movement of rod 82 serving as the telescopic member. According to the rearward slide of rod 82, nut 88 fixed on rod 82 pushes front spring retainer 84 rearward while rear spring retainer 84 is kept to contact rear retaining ring 87. Therefore, neutral biasing spring 83 is compressed further from the initial compression state so as to apply a forward biasing force to rod 82, thereby biasing rod 82, movable swash plate 6 and piston 33 toward the respective neutral positions.

On the other hand, when piston 33 with piston rods 33a and 33b slides rearward from its neutral position, movable swash plate 6 is tilted in the other direction for either forward or backward traveling of the vehicle. At this time, the lower end portion of first arm 107 rotates forward so that rod 82 slides forward. Cylindrical member 81 oscillates centered on pivot shaft 86 so as to absorb the differential movement between the rotation first arm 107 and the linear movement of rod 82. According to the forward slide of rod 82, flange 82a on rod 82 pushes rear spring retainer 84 forward while front spring retainer 84 is kept to contact front retaining ring 87. Therefore, neutral biasing spring 83 is compressed further from the initial compression state so as to apply a rearward biasing force to rod 82, thereby biasing rod 82, movable swash plate 6 and piston 33 toward the respective neutral positions.

As mentioned above, the neutral position of rod 82 defines the neutral positions of first arm 107 and movable swash plate 6, and defines the neutral position of piston 33 (while both proportional solenoids 35a and 36a of proportional pressure control valves 35 and 36 are unexcited) via first arm 107, link 108 and second arm 109. In other words, when rod 82 of neutral returning unit 80 is returned to its neutral position by the biasing force of neutral biasing spring 83, piston 33 of servo unit 60 also returns to its neutral position.

Referring to FIG. 6, in the fore-and-aft direction, the neutral position of piston 33 also substantially coincides to the position of pivot shaft 63 oscillatively supporting hydraulic cylinder 32, thereby balancing the action of piston 33 in hydraulic cylinder 32, and thereby reducing the oscillation of hydraulic cylinder 32 according to the telescopic movement of piston rod 33a.

A second embodiment about a hydraulic servo unit serving as an actuator device for controlling a movable swash plate of an HST will now be described with reference to FIGS. 14 to 24. Description of the members and portions designated by the reference numerals used for description of the first embodiment is omitted because they are identical or similar to the respective members and portions of the first embodiment designated by the same reference numerals.

An object of this embodiment is to provide an actuator unit that can easily be connected to a movable swash plate of the HST, which needs no link for its connection to an arm on a tip of a trunnion shaft of the movable swash plate, and which needs no work for fixing an arm to the trunnion shaft or for attaching or connecting a hydraulic cylinder or a piston rod serving as the actuator to a part of a vehicle body, such as the above-mentioned vehicle frame casing, thereby improving the HST with the actuator unit in assembly and maintenanceability.

Figure 14:
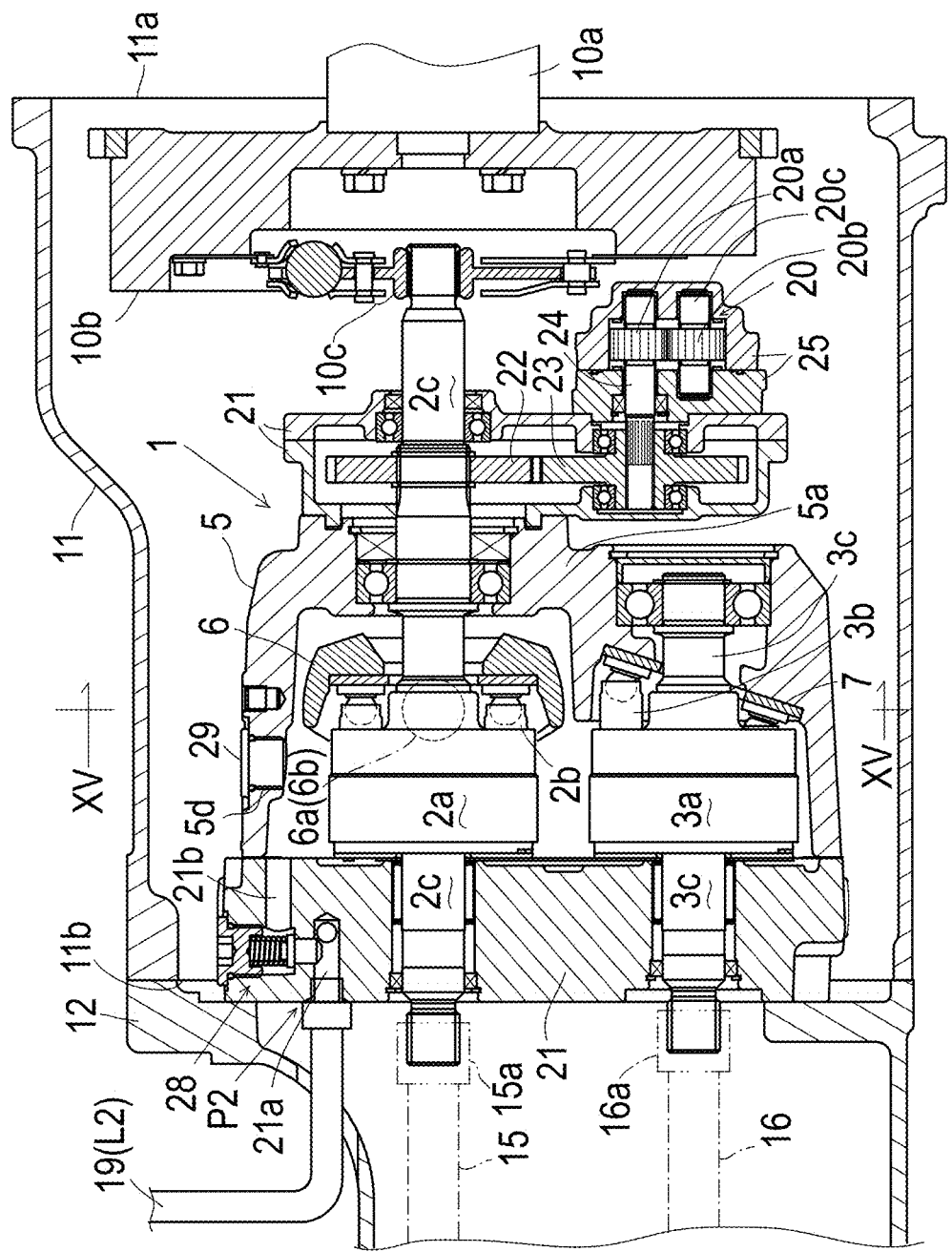
FIG. 14 is a sectional side view of HST 1 disposed in vehicle frame casing 11 to be provided with a servo unit 30 according to a second embodiment.
Figure 15:
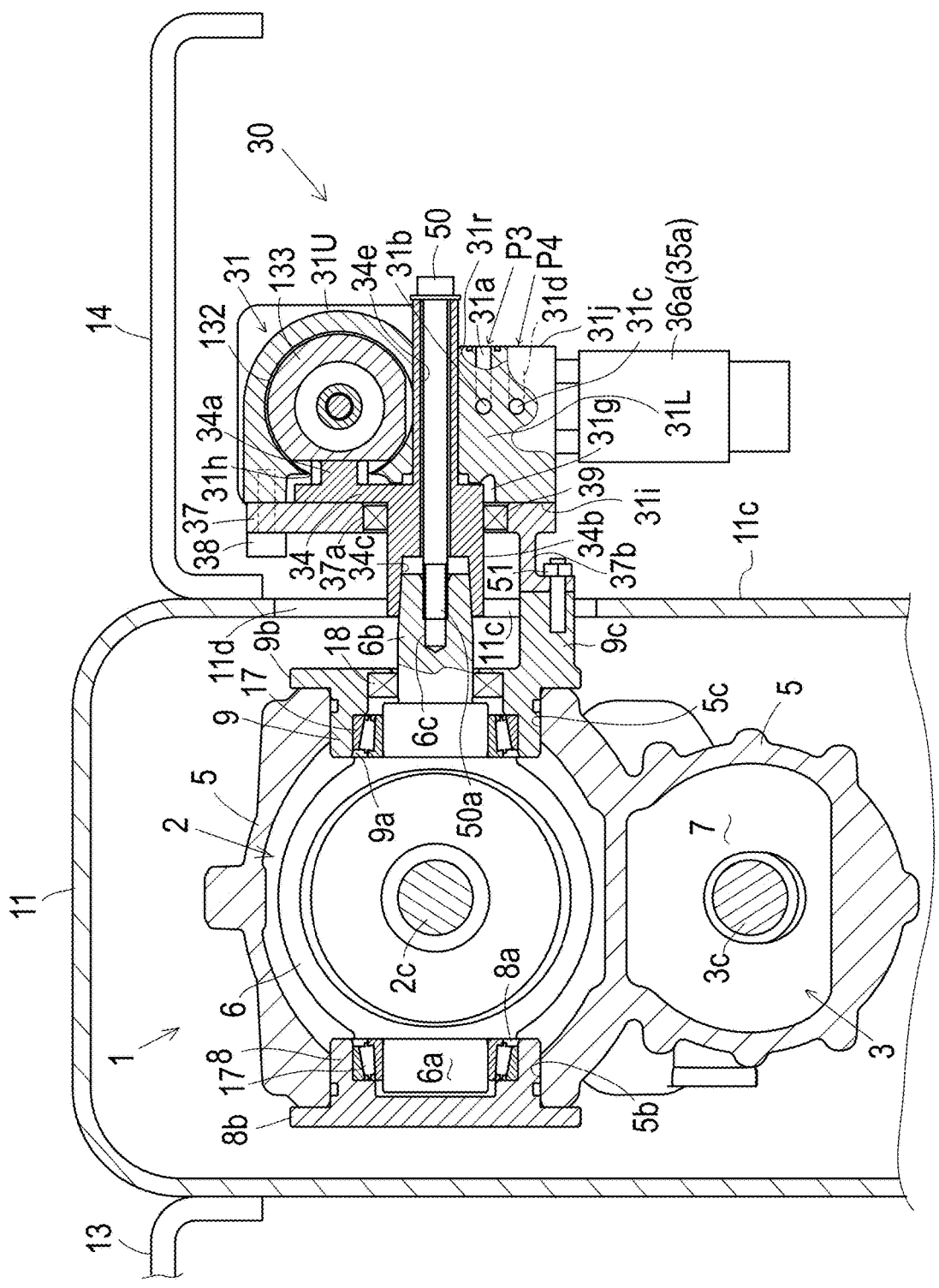
FIG. 15 is a cross sectional view taken along XV-XV line of FIG. 14 as a sectional rear view of HST 1 provided with servo unit 30 according to the second embodiment.

Referring to FIGS. 14 and 15, HST 1, vehicle frame casing 11 and axle casing 12 are configured similar to those of the first embodiment described with reference to FIGS. 1 and 2. The configurations of HST 1, vehicle frame casing 11 and axle casing 12, which have been omitted from the description of those of the first embodiment, or which are different from those of the first embodiment, will be described in detail. Referring to FIG. 15, right and left coaxial through holes 5b and 5c are formed in right and left side walls of HST housing 5 so as to communicate the inside space of HST housing 5 with the outside space of HST housing 5. A bearing cap 8 is fitted into hole 5b. A bearing bracket 9 is fitted into hole 5c. Bearing cap 8 is formed at an outer end portion thereof with a flange 8b. Flange 8b is fitted onto one of the right and left outer side surfaces of HST housing 5 so as to cover an outer open end of hole 5b. Similarly, bearing bracket 9 is formed with a flange 9b fitted onto the other of the right and left outer side surfaces of HST housing 5 so as to cover an outer open end of hole 5c.

In this embodiment, right and left trunnion shafts of movable swash plate 6 are defined as a short trunnion shaft 6a and long trunnion shaft 6b. Bearing cap 8 and bearing bracket 9 are formed therein with respective bearing holes 8a and 9a. Bearings 17 are provided in respective bearing holes 8a and 9a so as to fit respective inner peripheral surfaces of bearing cap 8 and bearing bracket 9. A fluid seal 18 is fitted in bearing hole 9a of bearing bracket 9. Trunnion shaft 6a is inserted into bearing hole 8a, and trunnion shaft 6b into bearing hole 9a, so that trunnion shafts 6a and 6b are journalled by bearing cap 8 and bearing bracket 9 via respective bearings 17. Therefore, flange 8b of bearing cap 8 covers a tip of short trunnion shaft 6a so that the tip of trunnion shaft 6a does not project outward from HST housing 5. On the other hand, lateral bearing hole 9a penetrates bearing bracket 9 so that an outer end of bearing hole 9a is open at flange 9b of bearing bracket 9. Therefore, a tip portion of long trunnion shaft 6b projects outward from flange 9b of bearing bracket 9, i.e., the outer end of bearing hole 9a, thereby projecting outward from HST housing 5. Fluid seal 18 prevents lubricating fluid from leaking from bearing 17 in bearing bracket 9 to the outside of HST housing 5. Further, a right or left side wall (in this embodiment, a right side wall) of vehicle body frame 11 having outer side surface 11c (referred to in the first embodiment) is formed therethrough with a hole 11d, and the tip portion of trunnion shaft 6b projects outward from outer side surface 11c of vehicle frame casing 11 via hole 11d.

Bearing bracket 9 is formed with a foot portion 9c projecting laterally outward from flange 9b. Foot portion 9c may be extended along an outer peripheral edge when viewed in the axial direction of trunnion shaft 6b. Alternatively, a plurality of foot portions 9c may be aligned along the outer peripheral edge of flange 9b. Foot portion 9c projects outward from outer side surface 11c of vehicle frame casing 11 via hole 11d. In this way, the tip portion of trunnion shaft 6b and foot portion 9c of bearing bracket 9 are extended via hole lid into the space below step 14 outside of vehicle frame casing 11. In this embodiment, a servo unit 30, instead of servo set 40 of the first embodiment, is disposed below step 14 and is attached to vehicle frame casing 11 by use of the tip portion of trunnion shaft 6b and foot portion 9c of bearing bracket 9 projecting outward from vehicle frame casing 11.

Due to the joint of engine 10 to front open end 11a of vehicle frame casing 11, fore-and-aft horizontal engine output shaft 10a provided with flywheel 10b at a rear end portion thereof is extended rearward into vehicle frame casing 11 via front open end 11a. Pump shaft 2c serving as the input shaft of HST 1 is extended further forward from gear casing 21 and is connected to flywheel 10b via a damper 10c. Similar to the first embodiment, pump shaft 2c is drivingly connected via gears 22 and 23 in gear casing 21 to charge pump 20 in pump housing 25 extended forward from gear casing 21.

Referring to 17, the HST hydraulic fluid supply system for supplying HST 1 with hydraulic fluid delivered from charge pump 20 is configured similar to that of the first embodiment as shown in FIG. 13. Moreover, in the second embodiment, referring to FIG. 14, a fluid hole 72 serves as fluid passage L2 for supplying fluid delivered from charge pump 20 to port P2. Fluid hole 72 is extended from the outside of axle casing 12 into the inside of axle casing 12 through a hole 12*a* bored in a wall of axle casing 12 so as to be joined to the rear open end of charge fluid passage 4*a* at the rear end surface of center section 4. Alternatively, fluid passage L2 in the second embodiment may be configured in another way. In this regard, charge fluid passage 4*a* in center section 4 may not be open to the inside of axle casing 12 as shown in FIG. 14.

Figure 16:
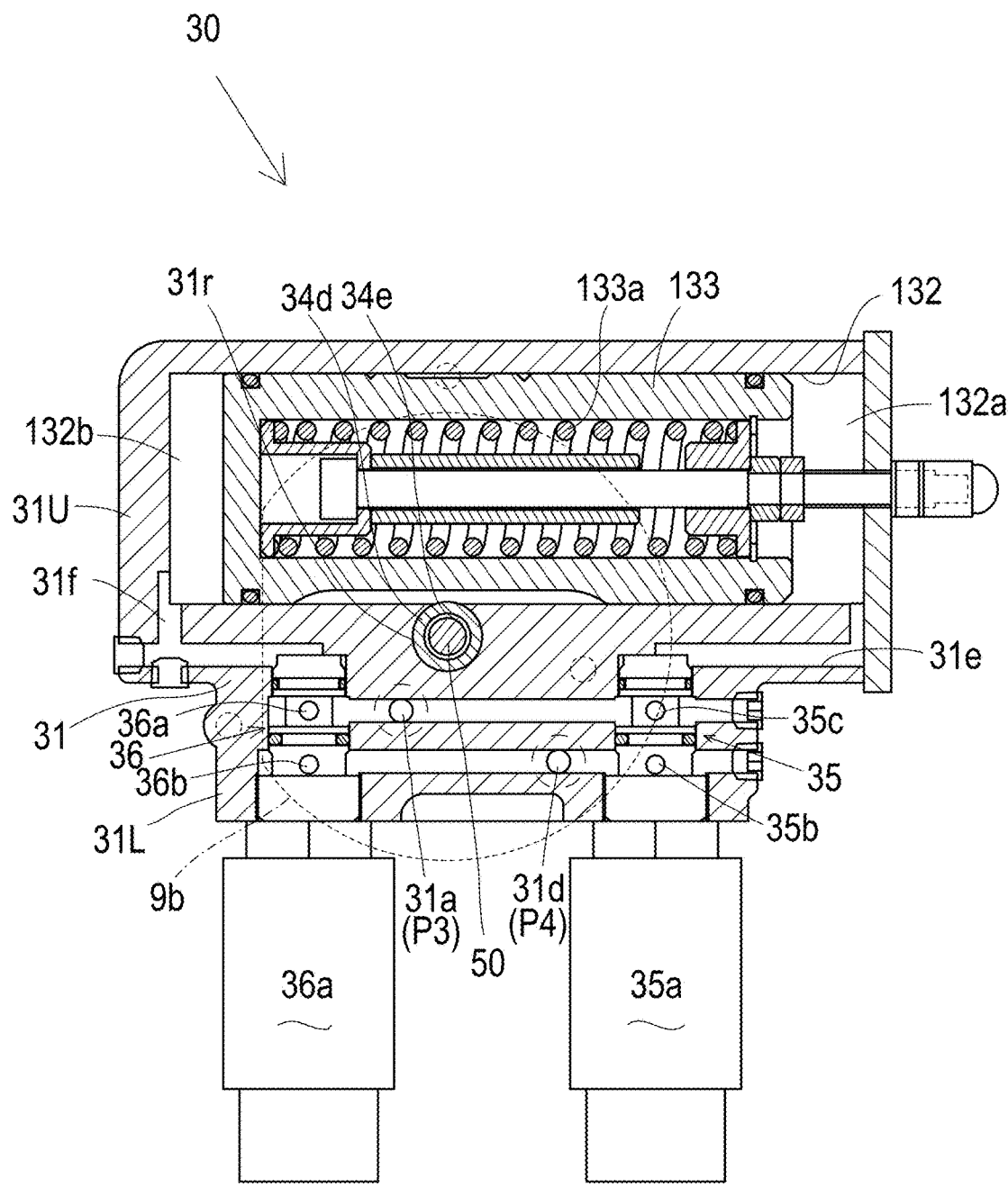
FIG. 16 is a sectional side view of a portion of servo unit 30 including a hydraulic cylinder 32.
Figure 17:
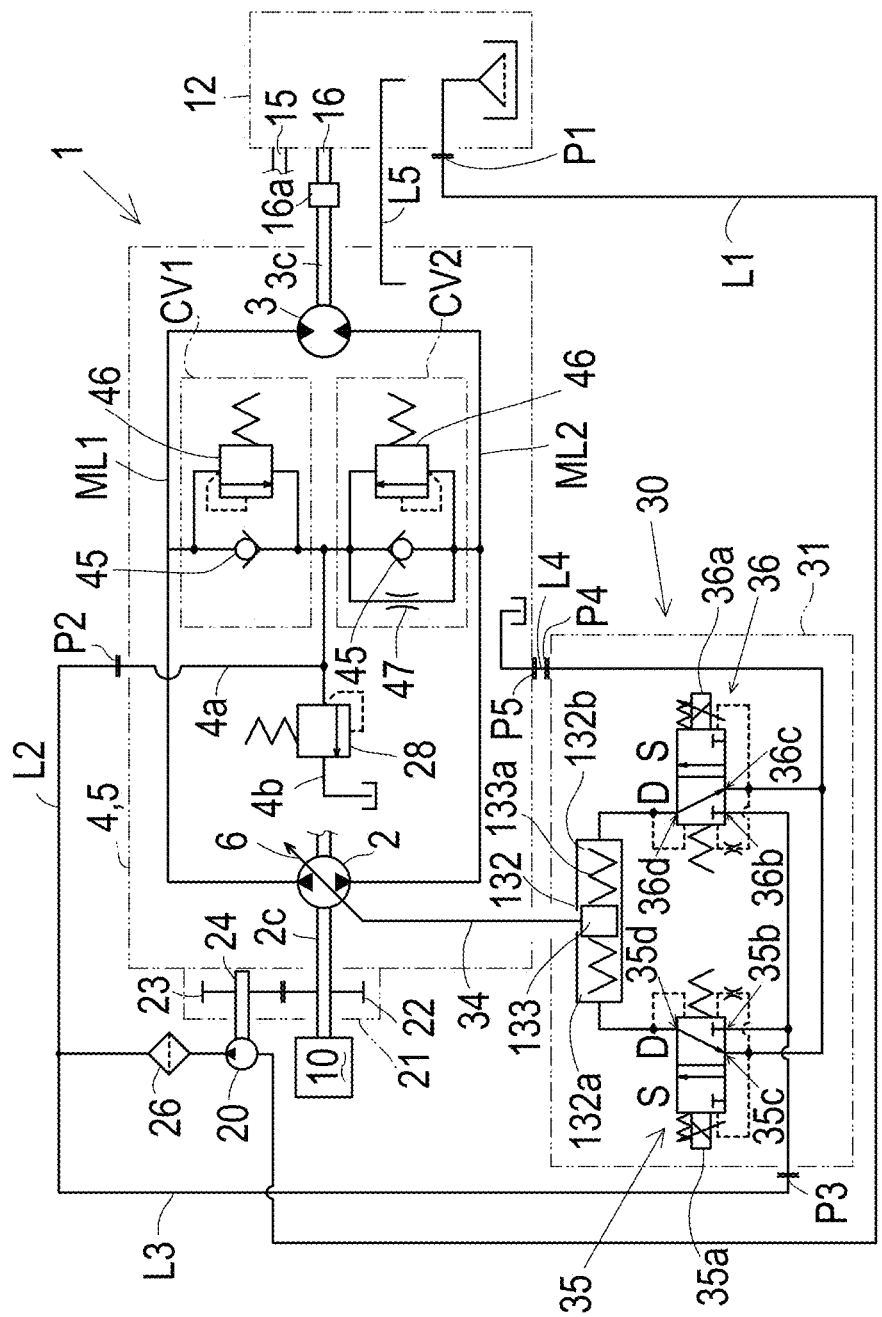
FIG. 17 is a hydraulic circuit diagram for supplying fluid to HST 1 and servo unit 30.

Referring to FIG. 17, a general configuration of servo unit 30 and a hydraulic fluid supply system for supplying servo unit 30 with hydraulic fluid delivered from charge pump 20 will be described. Servo unit 30 includes a servo housing 31 formed therein with a hydraulic cylinder 132, similar to hydraulic cylinder 32 of servo unit 60 in the first embodiment. Piston 133 and a spring 133*a* for biasing piston 133 toward a neutral position of piston 133 are disposed in hydraulic cylinder 132 formed in servo housing 31. Piston 133 divides the inside space of servo housing 31 serving as hydraulic cylinder 132 into front and rear fluid chambers 132*a* and 132*b*. In this regard, FIG. 17 (and later-discussed FIG. 24) illustrates spring 133*a* as being different in structure from spring 133*a* shown in FIG. 16. However, the only purpose of illustration of spring 133*a* in the hydraulic circuit diagram of FIG. 17 (and FIG. 24) is to indicate the function of spring 133*a* to bias piston 133 toward the neutral position. Therefore, spring 133*a* may have any configuration, such as shown in FIG. 16, only if spring 133*a* has the required function.

Referring to FIGS. 15 and 16, a concrete configuration of servo unit 30 will be described while it is generally configured as mentioned above with reference to FIG. 17. Servo unit 30 is disposed just under step 14 as mentioned above, so that step 14 is disposed immediately above a top surface of servo unit 30. Therefore, proportional pressure control valves 35 and 36 are juxtaposed front and rear, and are disposed in a lower portion 31L of servo housing 31 (hereinafter referred to as "lower housing portion 31L"). Proportional solenoids 35*a* and 36*a* of respective proportional pressure control valves 35 and 36 project downward from a bottom surface of servo housing 31. On the other hand, fore-and-aft horizontal hydraulic cylinder 132 is formed in upper portion 31U (hereinafter referred to as "upper housing portion 31U").

Proportional pressure control valves 35 and 36 provided in lower housing portion 31L are provided at upper portions thereof with respective suction ports 35*b* and 36*b*, and at lower portions thereof with respective drain ports 35*c* and 36*c*. A fore-and-aft horizontal suction fluid hole 31*b* is formed in lower housing portion 31L so as to fluidly connect suction ports 35*b* and 36*b* to each other via suction fluid hole 31*b*. A laterally horizontal suction fluid hole 31*a* is formed in lower housing portion 31L so as to extend from a fore-and-aft intermediate portion of suction fluid hole 31*b* in the direction laterally opposite outer side surface 11*c* of vehicle body frame 11 and HST 1. Hereinafter, in the description of servo unit 30 and later-discussed servo units 30A, 30B, 30C, 30D and 30E as modifications of servo unit 30, this side laterally opposite vehicle frame casing 11 and HST 1 is defined as a "distal" side, while another side toward vehicle frame casing 11 and HST 1 is defined as a "proximal" side. Suction hole 31*a* has an outer end open at a right or left "distal" side surface 31*j* of servo housing 31 (hereinafter referred to as "distal housing side surface 31*j*"). This open end of suction fluid hole 31*a* serves as inlet port P3 shown in FIG. 17 so as to be joined to a fluid pipe or the like serving as fluid passage L3.

A fore-and-aft horizontal drain fluid hole 31*c* is formed in lower housing portion 31L below suction fluid hole 31*b* so as to fluidly connect drain ports 35*c* and 36*c* to each other via drain fluid hole 31*d*. A laterally horizontal drain fluid hole 31*d* is formed in lower housing portion 31L so as to extend distally from a fore-and-aft intermediate portion of drain fluid hole 31*c*. Drain fluid hole 31*d* has an outer end open at distal housing side surface 31*j*. This open end of drain fluid hole 31*d* serves as outlet port P4 shown in FIG. 17 so as to be joined to a fluid pipe or the like serving as fluid passage L4.

Servo housing 31 has a right or left (in this embodiment, left) proximal side surface 31*i* (hereinafter referred to as "proximal housing side surface 31*i*") facing vehicle frame casing 11 and HST 1. Proximal housing side surface 31*i* is formed with a notch 31*g* (see FIG. 15) over upper and lower housing portions 31U and 31L. An arm 34 is disposed in notch 31*g* so as to serve as a connection member for connecting piston 133 to trunnion shaft 6*b* of movable swash plate 6 of HST 1. Further, a hole 31*h* is formed in upper housing portion 31U so as to connect an upper portion of notch 31*g* in upper housing portion 31U to hydraulic cylinder 132. An engagement portion 34*a* projects from a top portion of arm 34 disposed in the upper portion of notch 31*g* so as to engage with piston 133 in hydraulic cylinder 132 via hole 31*h*. In this regard, hole 31*h* is fluidly connected to neither fluid chamber 132*a* nor 132*b* regardless of the slide direction or degree of piston 133. In other words, piston 133 keeps the fluidal tightness of fluid chambers 132*a* and 132*b* from notch 31*g*.

In a lower portion of notch 31*g*, arm 34 is formed at a lower portion thereof with an trunnion boss 34*b* and a bolt boss 34*d* joined coaxially to each other. A later-discussed cover member 37 journals trunnion boss 34*b* via a bearing, i.e., a later-discussed fluid seal 39. Trunnion boss 34*b* project proximally horizontally from cover member 37. A tapered recess 34*c* is formed in an end portion of trunnion boss 34*b* projecting proximally from cover member 37. A tapered tip portion of trunnion shaft 6*b* is inserted into recess 34*c*.

Distally horizontal bolt boss 34*d* is extended laterally opposite trunnion boss 34*b*. A hole 31*r* is bored through a boundary portion of servo housing 31 between upper and lower housing portions 31U and 31L (i.e., below hydraulic cylinder 132 and above proportional pressure control valves 35 and 36) so as to extend from notch 31*g* on the proximal side of servo housing 31 to the distal end of the boundary portion of servo housing 31. Bolt boss 34*d* is passed through hole 31*r* rotatably relative to servo housing 31 so as to project at an outer end thereof distally outward from distal housing side surface 31*j*. Bolt boss 34*d* and trunnion boss 34*b* are bored through by an axial bolt hole 34*e* from the distal outer end of bolt boss 34*d* to recess 34*c* in trunnion boss 34*b*.

A cover member 37 is fixed to proximal housing side surface 31*i* of servo housing 31 so as to cover notch 31*g*. More specifically, cover member 37 is fastened to servo housing 31 by at least one bolt 38. A hole 37*a* is provided in cover member 37. Trunnion boss 34*b* of arm 34 is passed through hole 37*a*. A fluid seal 39 is provided in hole 37*a* so as to keep the fluidal tightness of trunnion boss 34*b* from cover member 37. Bot boss 34*d* is extended on the rotary axis of trunnion boss 34*b*, and is passed through servo housing 31. In this way, arm 34 is journalled at the lower portion thereof formed with laterally extended trunnion boss 34*b* and bolt boss 34*d* by cover member 37 and servo housing 31. Cover member 37 is formed with a foot portion 37b extended proximally therefrom so as to correspond to foot portion 9c of bearing bracket 9.

Servo unit 30 is a unit including arm 34 and cover member 37. The tip portion of trunnion shaft 6b projecting outward from vehicle frame casing 11 via hole 11d and foot portion 9c of bearing bracket 9, as mentioned above, are utilized to attach servo unit 30 to HST 1. In the series of works for attaching servo unit 30 to HST 1, first, the tapered tip portion of trunnion shaft 6b is fitted into tapered recess 34c formed on trunnion boss 34b of arm 34 projecting outward from cover member 37. The taper shapes of recess 34c and the tip portion of trunnion shaft 6b become narrower as they go in the distal direction. Therefore, after the tip portion of trunnion shaft 6b enters a little into recess 34c, entire servo unit 30 is further pressed proximally. Finally, the tapered tip portion of trunnion shaft 6b is completely fitted into tapered recess 34c, and servo unit 30 comes to be able to be pressed no further proximally. Then, a bolt 50 is inserted into bolt hole 34e from the distal open end of bolt boss 34d of arm 34 projecting distally from servo housing 31. In this regard, a tapped hole 6c is axially formed in trunnion shaft 6b and is open at the tip end surface of trunnion shaft 6b, and a threaded portion 50a of bolt 50 projecting proximally from bolt hole 34e into recess 34c is screwed into tapped hole 6c, thereby fixing arm 34 to trunnion shaft 6b.

Further, a proximal side surface of foot portion 37b of cover member 37 contacts a distal side surface of foot portion 9c of bearing bracket 9 projecting from vehicle frame casing 11 via hole 11d. Foot portion 37b is fastened to foot portion 9c via at least one bolt 51. In this way, cover member 37 is fixed to bearing bracket 9 so that servo housing 31 outside of vehicle frame casing 11 is fixed to HST housing 5 inside of vehicle frame casing 11, thereby completing the attachment of servo unit 30 to HST 1.

Referring to FIG. 15, step 14 disposed above servo unit 30 is a substantially horizontal plate that does not cover servo unit 30 at the distal side of servo unit 30. In other words, servo unit 30 is open at the distal portion thereof, so that an operator can easily handle servo unit 30 to bring servo unit 30 to the attachment position below step 14, and then, the operator can easily perform the above-mentioned series of works for attaching servo unit 30 to HST 1, i.e., the location of servo unit 30 relative to trunnion shaft 6b by inserting the tip portion of trunnion shaft 6b into recess 34c, the proximal pressing of servo unit 30 for engaging arm 34 to trunnion shaft 6b, and the screwing of bolts 50 and 51. On the other hand, when servo unit 30 has to be detached from HST 1 for the purpose of maintenance or the like, an operator also benefits facility in the series works, i.e., the access to servo unit 30 below step 14, the releasing of bolts 50 and 51, and the distal withdrawing of servo unit 30. Therefore, servo unit 30 needs neither its own disassembling nor its own reassembling to be attached or detached to and from HST 1.

After the attachment of servo unit 30 to HST 1 is completed, proportional pressure control valves 35 and 36 are controlled to slide piston 133 in hydraulic cylinder 132 in the fore-and-aft direction. As piston 133 slides, engagement portion 34a of arm 34 rotates in the fore-and-aft direction centered on the axis of bolt 50. Accordingly, trunnion boss 34b and bolt boss 34d of arm 34 also rotate centered on the axis of bolt 50. Therefore, trunnion shaft 6b fixed to arm 34 via bolt 50 rotates integrally with trunnion boss 34b centered on the axis of bolt 50, thereby tilting movable swash plate 6.

In this regard, the upper portion of arm 34 including engagement portion 34a moves vertically while it rotates in the fore-and-aft direction following the fore-and-aft movement of piston 133 along its fore-and-aft horizontal axis. Notch 31g and hole 31h are formed so as to allow this vertical movement of the upper portion of arm 34. Further, due to the rotatability of bolt boss 34d in through hole 31r of servo housing 31 relative to servo housing 31, the rotatability of arm 34 including bolt boss 34d centered on the axis of bolt 50 is ensured.

Referring to FIGS. 18 to 23, servo units 30A, 30B, 30C, 30D and 30E serving as modifications of servo unit 30 according to the second embodiment will be described. However, description of the component elements designated by the same reference numerals as those used for description of the embodiment shown in FIGS. 14 to 17 will be omitted except for some special cases, on the assumption that they are identical or similar to those designated by the same reference numerals in the embodiment of FIGS. 14 to 17.

Servo unit 30A will be described with reference to FIG. 18. Servo unit 30A has a servo housing 31A that is similar to servo housing 31 of servo unit 30 except that a lower portion of notch 31g formed in servo housing 31A is expanded further downward so as to serve as a gallery 31m, and drain fluid hole 31d extended distally from drain fluid hole 31c is not formed but a drain fluid hole 31k is formed in servo housing 31A so as to extend proximally from drain fluid hole 31c and so as to be open at proximal housing side surface 31i to gallery 31m.

Servo unit 30A also includes a cover member 37A that is similar to cover member 37 of servo unit 30 except that cover member 37A is not formed with foot portion 37b but is formed with a circular mount boss 37c surrounding the entire outer peripheral surface of trunnion boss 34b of arm 34. Correspondingly, HST 1 is provided with a bearing bracket 9A that is similar to bearing bracket 9 except that bearing bracket 9A is not formed with foot portion 9c but is formed with a circular mount boss 9d surrounding the entire outer peripheral surface of trunnion shaft 6b and projecting distally from flange 9b. Mount boss 37c and mount boss 9d are joined to each other (i.e., fastened to each other by bolt 51) so as to form a gallery 52 that is a closed circular space surrounding trunnion shaft 6b and trunnion boss 34b.

Cover member 37A of servo unit 30A is formed so as to have a gap 37b between cover member 37A and trunnion boss 34b. Gap 37d fluidly connects gallery 31m in servo housing 31A to gallery 42 in mount bosses 9d and 37c. Bearing bracket 9A adapted to have servo unit 30A has no fluid seal like fluid seal 18 in the outer side portion of bearing hole 9a therein.

Figure 18:
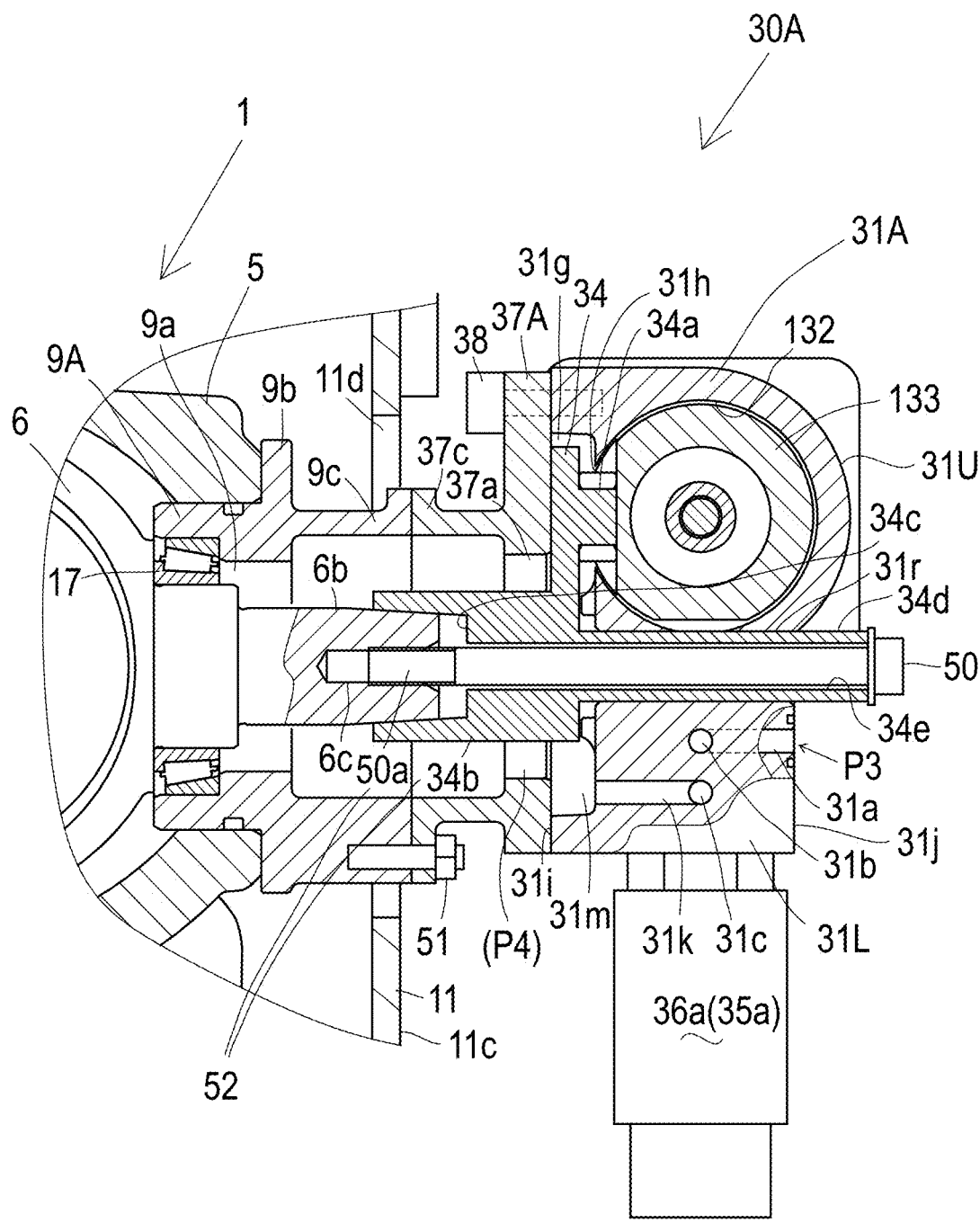
FIG. 18 is a sectional rear view of a servo unit 30A.

Due to the above-mentioned structure, servo unit 30A can drain fluid from drain fluid hole 31k in servo housing 31A to gallery 31m in a direction designated by an arrow in FIG. 18. The drained fluid in gallery 31m enters gallery 52 via gap 37d, and is supplied from gallery 52 to bearing 17 on trunnion shaft 6b as lubricating fluid for bearing 17 and trunnion shaft 6b. The fluid is further introduced into HST housing 5 so as to lubricate the various parts of HST 1 in HST housing 5. Referring to the hydraulic circuit diagram of FIG. 17, gap 37d serves as outlet port P4, notch 9e serves as inlet port P5, and gallery 52 serves as fluid passage L4.

Figure 19:
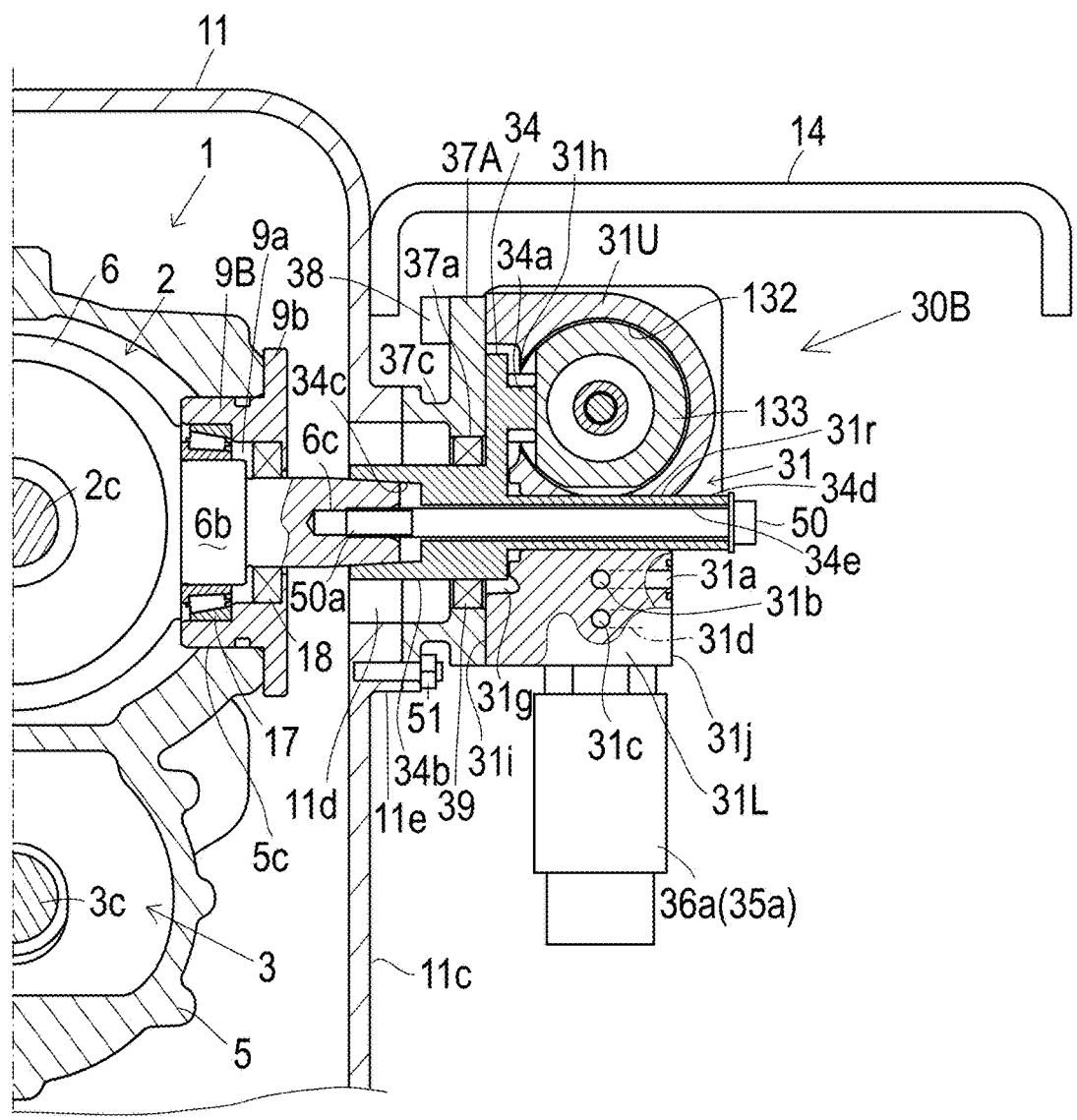
FIG. 19 is a sectional rear view of a servo unit 30B.

Servo unit 30B will be described with reference to FIG. 19. Similar to servo units 30 and 30A, servo unit 30B is fixed to trunnion shaft 6b of movable swash plate 6 of HST 1 via hole 11d of vehicle frame casing 11. However, servo housing 31 of servo unit 30B is not fixed to bearing bracket 9 but is fixed to vehicle frame casing 11, in comparison with each of servo housings 31 and 31A of servo units 30 and 30A that is fixed to bearing bracket 9 of HST 1.

Servo unit 30B employs cover member 37A including circularly cylindrical mount boss 37c, similar to servo unit 30A. Vehicle frame casing 11 is formed with a mount portion 1e around hole 11d. The proximal end surface of mount boss 37c contacts an end surface of mount portion 11e, and is fastened to mount portion 11e by bolt 51, thereby fixing cover member 37A to vehicle frame casing 11, and thereby fixing servo housing 31 to vehicle fame casing 11.

In correspondence to servo unit 30B, HST 1 is provided with a bearing bracket 9B for journaling trunnion shaft 6b. Since bearing bracket 9B does not need to have a portion like foot portion 9c or mount boss 9d for its joint to cover member 37 or 37A, bearing bracket 9B is formed at an outer end portion with a flange 9b, similar to bearing cap 8. Therefore, while bearing bracket 9B does not project distally outward from vehicle frame casing 11, trunnion shaft 6b projects outward from flange 9b of bearing bracket 9B and further projects outward from vehicle frame casing 11 via hole 11d. In this way, bearing bracket 9B is simplified in shape so as to reduce costs for its production.

Since cover member 37A of servo unit 30B is not joined to bearing bracket 9B, bearing 17 in bearing bracket 9B cannot be supplied with lubricating fluid from servo unit 30B via the fluid passage formed in cover member 37A and bearing bracket 9B joined to each other. This is because servo unit 30B employs servo housing 30 identical to servo housing 30 of servo unit 30. In this regard, servo housing 31 is formed with drain fluid hole 31d open at distal housing side surface 31j, and with notch 31g instead of downwardly expanded gallery 31m. Further, cover member 37A of servo unit 30B is provided with no gap like gap 37d around fluid seal 39, thereby ensuring its fluidal tightness.

Figure 20:
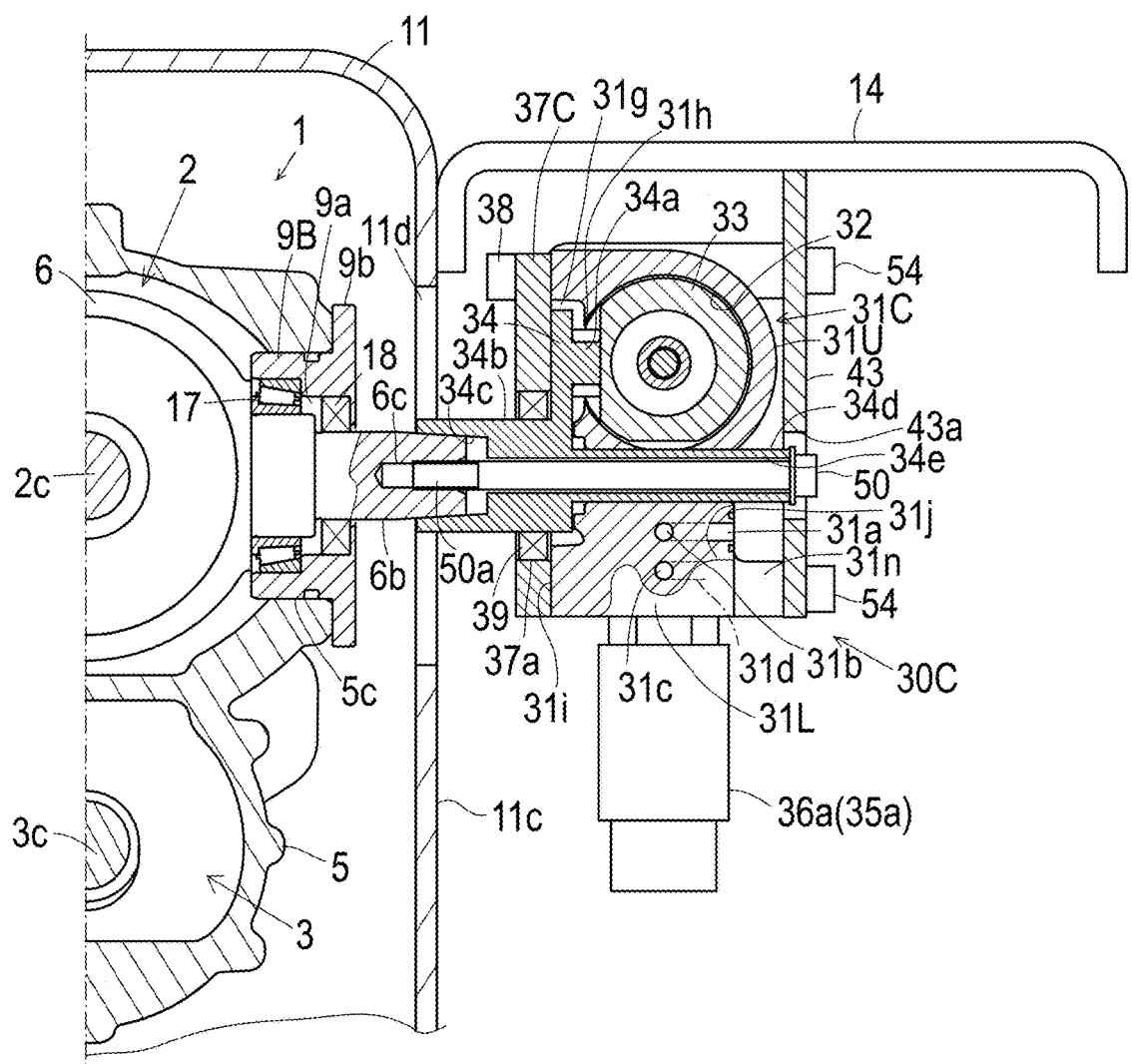
FIG. 20 is a sectional rear view of a servo unit 30C.

Servo unit 30C will be described with reference to FIG. 20. Servo unit 30C includes arm 34 fixed to trunnion shaft 6b in the above-mentioned way. On the other hand, servo unit 30C includes a servo housing 31C fixed to step 14. In this regard, a cover plate 53 is extended vertically downward from step 14 at the distal side of servo unit 30C. Servo housing 31C is formed with a bolt boss 31n that is extended distally so as to contact cover plate 53 at a distal side surface thereof. A bolt 54 is screwed into bolt boss 31n via cover plate 53 so as to fasten servo housing 31C to cover plate 53.

Servo unit 30C includes a cover member 37C. Cover member 37 is a simple flat plate-shaped member that is not formed with a portion like foot portion 37b or mount boss 37c. Therefore, simple bearing bracket 9B having no portion to which cover member 37 or 37A is attached is provided to journal trunnion shaft 6b. Such simple and economic bearing bracket 9B and cover member 37C are used to constitute HST 1 with servo unit 30C.

Cover plate 53 is provided with a hole 53a through which bolt boss 34d of arm 34 projects at an outer end portion thereof outward so that bolt 50 can easily be inserted or withdrawn into and from bolt hole 34e in bolt boss 34d outside of cover plate 53.

Figure 21:
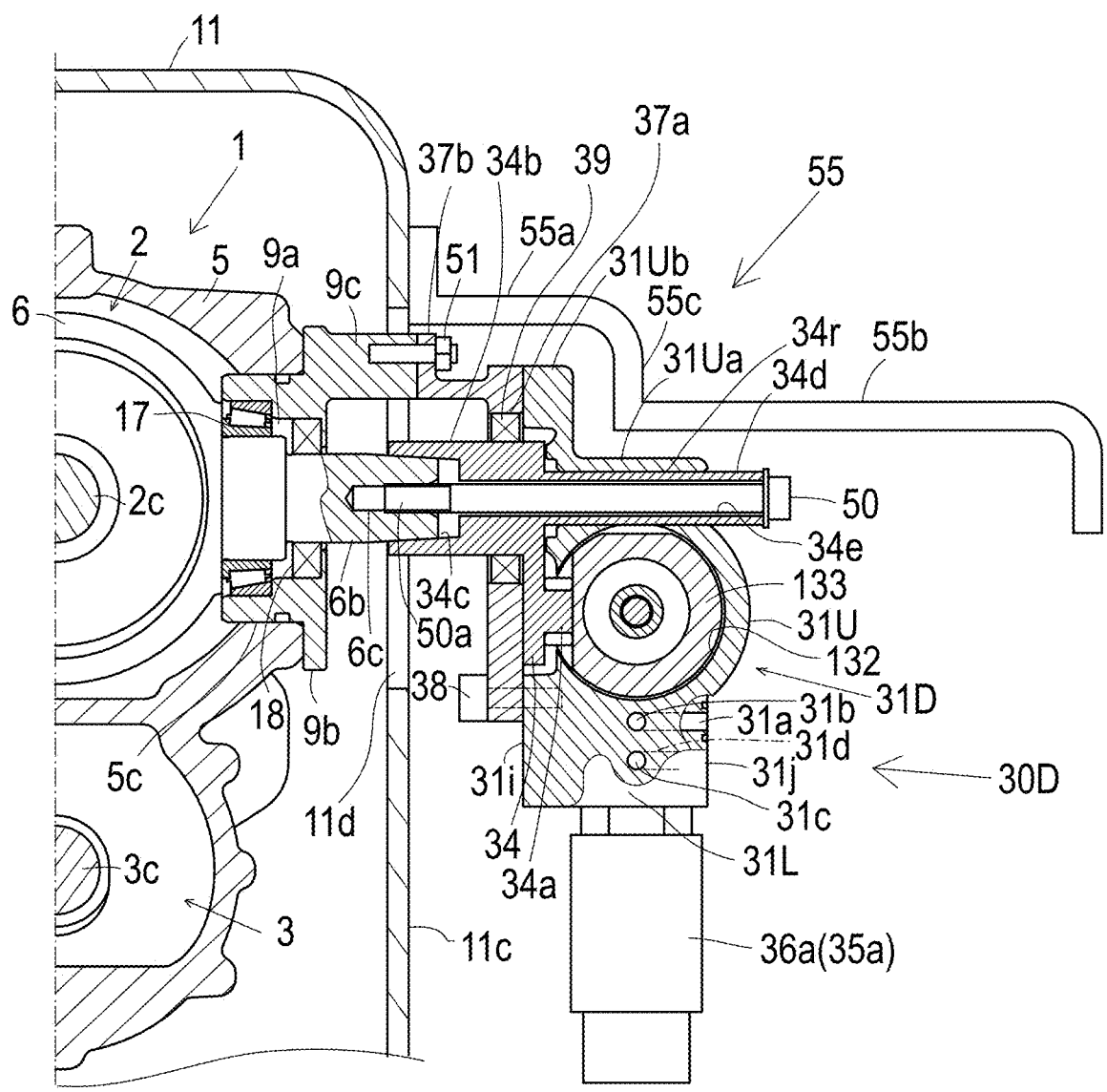
FIG. 21 is a sectional rear view of a servo unit 30D.

Servo unit 30D will be described with reference to FIG. 21. Correspondingly, a step 55, instead of step 14, is fixed to outer side surface 11c of vehicle frame casing 11 at a position lower than step 14. Step 55 is stepped to have an upper step plate 55a, a lower step plate 55b, and a vertical plate portion 55c between upper and lower step plates 55a and 55b. Lower step plate 55b of step 55 is lower than an upper end of hole 11d in comparison with step 14 considerably higher than the upper end of hole 11d. If the axis of trunnion shaft 6b were located between upper housing portion 31U of servo housing 31 or 31A and proportional pressure control valves 35 and 36 in lower housing portion 31L, similar to that for servo units 30, 30A, 30B and 30C, upper housing portion 31U above the axis of trunnion shaft 6b would have interfered with lower step plate 55b of step 55.

Therefore, servo unit 30D disposed below step 55 includes a servo housing 31D. An upper portion of upper housing portion 31U of servo housing 31D above hydraulic cylinder 132 is formed with an upward extended portion 31Ua. Upper extended portion 31Ua of servo housing 31D is formed with through hole 31r through which bolt boss 34d of arm 34 is passed. Further, servo housing 31D is formed with an upward extended portion 31Ub that is extended upward vertically from upward extended portion 31Ua and along proximal housing side surface 31i. Therefore, notch 31g along proximal housing side surface 31i is formed over upward extended portions 31Ua and 31Ub and upper housing portion 31U. Through hole 31r is extended distally from an upper portion of notch 31g so as to be disposed above hydraulic cylinder 132.

In this way, upper housing portion 31U of servo housing 31D formed with hydraulic cylinder 32 is disposed below the axis of trunnion shaft 6b, thereby enabling step 55 to be disposed at the position immediately above upward extended portion 31Ua of servo housing 31D passing bolt boss 33d therethrough, i.e., the position of the axis of trunnion shaft 6b. The step-shape of step 55 corresponds to a step-shape formed by upper extended portions 31Ua and 31Ub of servo housing 31D. In this regard, vertical plate portion 55c faces a distal vertical side surface of upward extended portion 31Ub, upper step 45a is disposed immediately above the top of upward extended portion 31Ub, and lower step 45b immediately above the top of upward extended portion 31Ua.

Arm 34 adapted to servo unit 30D is arranged so as to have trunnion boss 34b and bolt boss 34b at an upper portion thereof, and so as to have engagement potion 34a for engagement with piston 133 at a lower portion thereof. In other words, arm 34 of servo unit 30D corresponds to upside-down reversed arm 34 of each of servo units 30, 30A, 30B and 30C. In this regard, servo unit 30D employs cover member 37 formed with foot portion 37b to journal arm 34, and HST 1 employs bearing bracket 9 formed with foot portion 9c to be joined to foot portion 37b of cover member 37. However, in correspondence to the above-mentioned reverse arrangement of arm 34, cover member 37 of servo unit 30D and bearing bracket 9 used for servo unit 30D correspond to upside-down reversed cover member 37 of servo unit 30 and upside-down reversed bearing bracket 9 for servo unit 30.

Alternatively, servo unit 30D may be provided with cover member 37A having mount boss 37c, and bearing boss 9A having mount boss 9d may be provided for servo unit 30D. However, if fluid drained from proportional pressure control valves 35 and 36 has to be led from servo unit 30D to bearing 17 in bearing bracket 9A, horizontal fluid hole 31k should be replaced with another appropriate fluid guide structure to guide fluid from drain fluid hole 31c to notch 31g, because if servo housing 31D is adapted to servo unit 30D, drain fluid hole 31c in fluid housing 31D becomes considerably lower than notch 31g.

Figure 22:
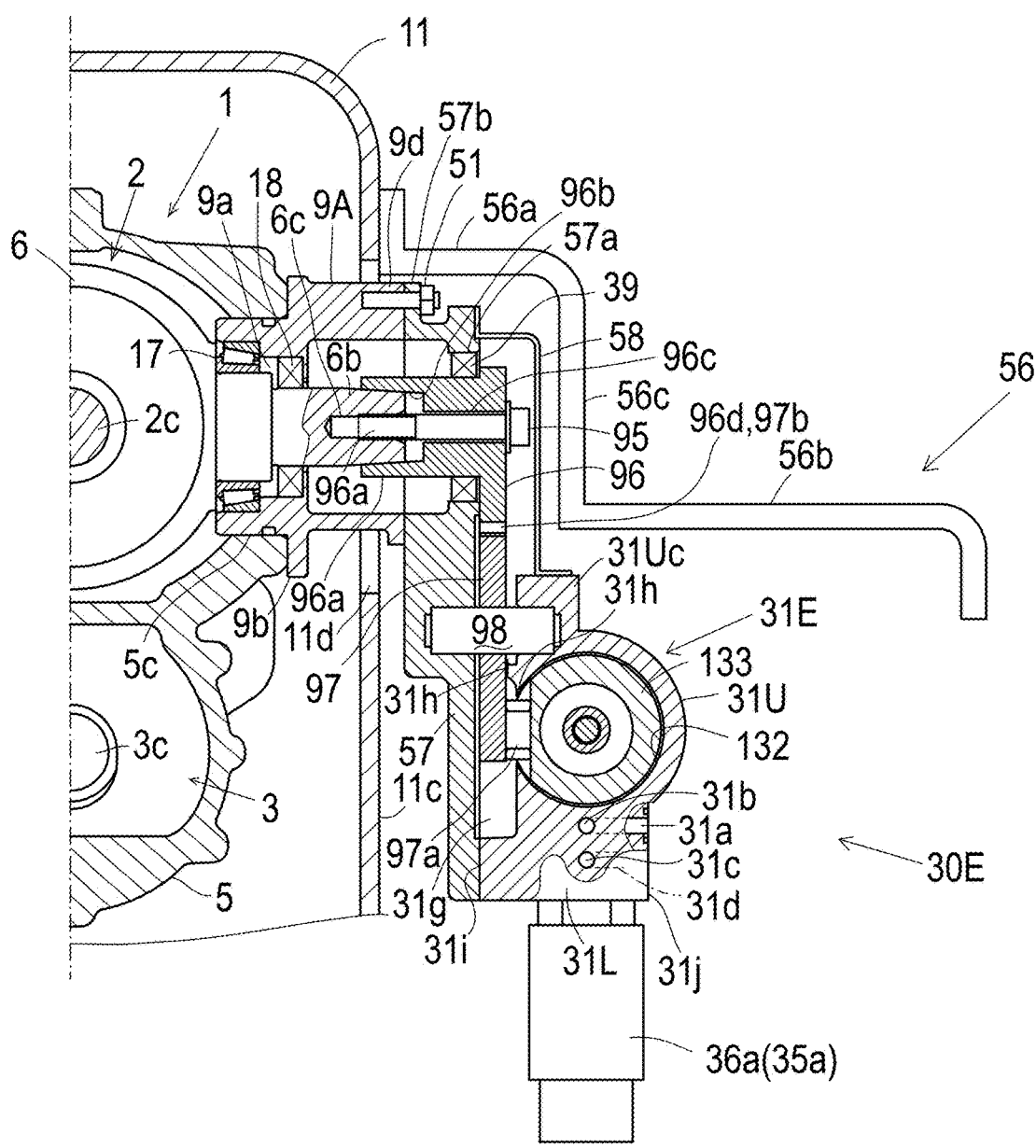
FIG. 22 is a sectional rear view of a servo unit 30E.
Figure 23:
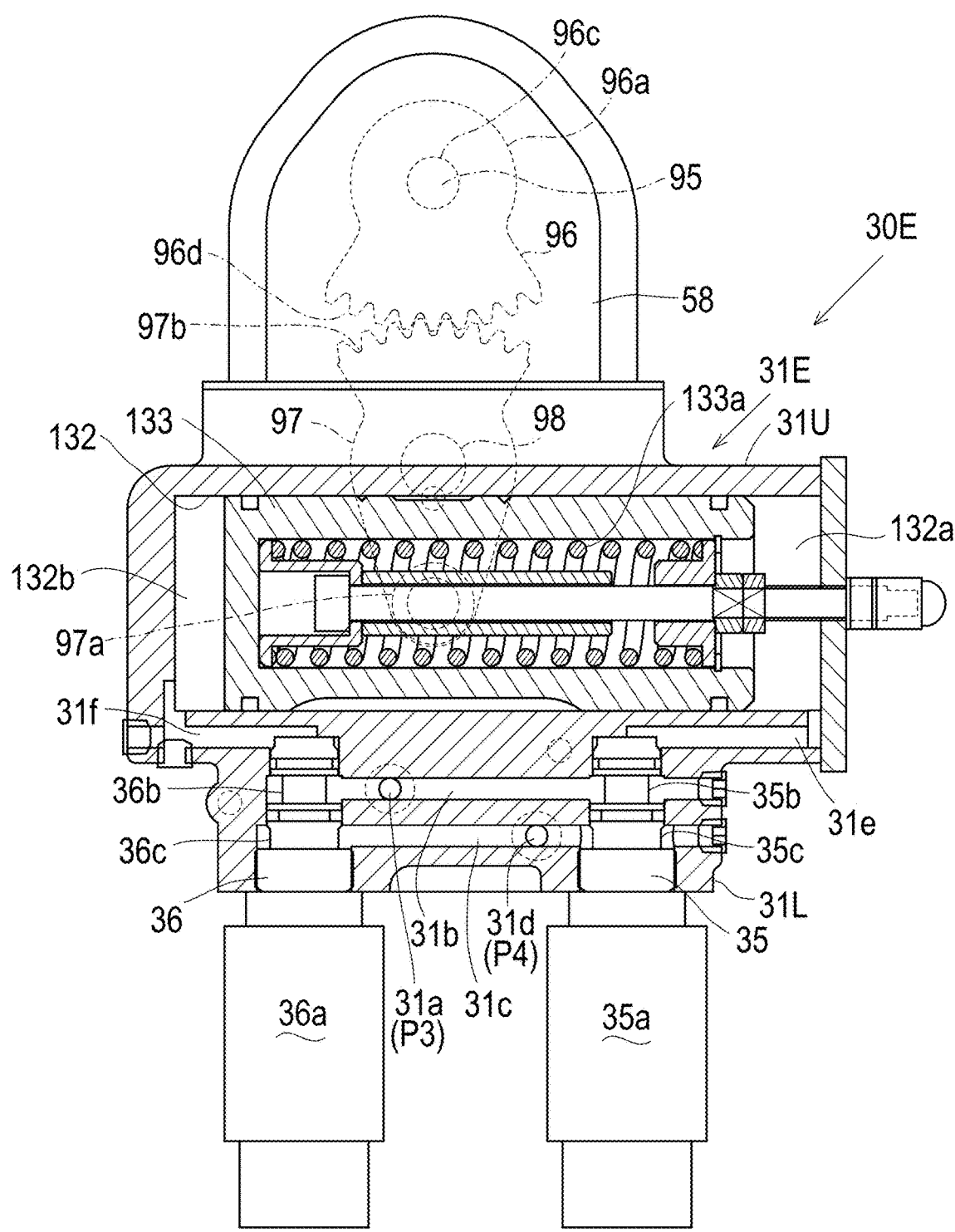
FIG. 23 is a sectional side view of servo unit 30E.

Servo unit 30E will be described with reference to FIGS. 22 and 23. In correspondence to servo unit 30E, a step 56 is fixed to vehicle frame casing 11 at such a low position that is lower than step 55. Step 56 is stepped to have an upper step plate 56a, a lower step plate 56b and a vertical plate portion 56c between upper and lower step plates 56a and 56b, similar to step 55. In comparison with step 55 having lower step plate 55b that is lower than the upper end of hole 11d and higher than the axis of trunnion shaft 6b, step 56 has upper step plate 56a higher than the axis of trunnion shaft 6b, and has lower step plate 56b lower than the axis of trunnion shaft 6b. If servo unit 30D as shown in FIG. 21 were disposed below step 56, bolt boss 34d of arm 34, upward extended portion 31Ua of servo housing 31D incorporating bolt boss 34d, and upper housing portion 31U of servo unit 30D would interfere with lower step plate 56b.

In correspondence to the low position of lower step plate 56b of step 56, servo unit 30E includes a servo housing 31E that is entirely lower than the axis of trunnion shaft 6b. Therefore, a connection member connecting piston 133 to trunnion shaft 6b does not need to have a laterally long portion, like bolt boss 34d, through a servo housing.

On the other hand, since the lowering of servo housing 31E means lowering of hydraulic cylinder 132, the connection member connecting piston 133 to trunnion shaft 6b must be vertically long. If the connection member were an arm, like arm 34, rotatably centered on the axis of trunnion shaft 6b, it would be difficult for the connection member to have a portion, like engagement portion 34a of arm 34, engaging with piston 133, because such a portion would greatly move vertically and in the fore-and-aft direction during the rotation of the connection member arm centered on the axis of trunnion shaft 6b. Further, it might be difficult for piston 133 to ensure the fluidic tightness of fluid chambers 132a and 132b because hole 31h would have to be expanded to allow such a great movement of the portion of the connection member engaging with piston 133.

Therefore, upper and lower sector gears 96 and 97 meshing with each other serve as the connection member for connecting piston 133 of servo unit 30E to trunnion shaft 6b. Upper sector gear 96 is formed with a trunnion boss 96a having a tapered recess 96b, similar to trunnion boss 34b of arm 34. Upper sector gear 96 is bored through between a distal side surface thereof and recess 96b by a bolt hole 96c. A bolt 95 formed with a threaded shaft portion 96a is inserted into bolt hole 96c from the distal side surface of sector gear 96, so that threaded shaft portion 96a is screwed into tapped hole 6c in trunnion shaft 6b fitted in recess 96b, thereby fixing sector gear 96 to trunnion shaft 6b. In this way, sector gear 96 and trunnion shaft 6b are rotatably integral with each other and centered on the axis of trunnion shaft 6b and the axis of bolt 95 coaxial to trunnion shaft 6b.

Gear teeth 96d formed on a lower edge of upper sector gear 96 mesh with gear teeth 97b formed on an upper edge of lower sector gear 97 disposed below upper sector gear 96. Lower sector gear 97 is formed at a bottom end thereof with an engagement portion 97a similar to engagement portion 34a of arm 34. Engagement portion 97a engages with piston 133 in hydraulic cylinder 132. Lower sector gear 97 is provided with a pivot shaft 98 at a vertical middle portion thereof between engagement portion 97a and gear teeth 97b. When piston 133 engaging with engagement portion 97a slides in the fore-and-aft direction, sector gear 97 rotates centered on pivot shaft 98 so as to follow piston 133, thereby rotating sector gear 96 and movable swash plate 6 having trunnion shaft 6b.

Servo housing 31E is configured so as to support lower sector gear 97. In this regard, notch 31g of servo housing 31E formed along proximal housing side surface 31i accommodates a lower portion of sector gear 97. Servo housing 31 has an opening at an upper end of notch 31g so that an upper portion of sector gear 97 projects upward from servo housing 31E via the opening at the upper end of notch 31g. Pivot shaft 98 is disposed on the upper portion of sector gear 97 projecting upward from servo housing 31E, and is disposed immediately above the opening at the upper end of notch 31g. Servo housing 31E is formed with an upward extended portion 31Uc that is extended upward from upper housing portion 31U formed therein with hydraulic cylinder 32 so as to support a distal end portion of pivot shaft 98. Therefore, servo housing 31E does not have a hole like through hole 31r, thereby reducing a gap between hydraulic cylinder 132 and proportional pressure control valves 35 and 36, and thereby being minimized vertically.

To attach servo unit 30E, servo housing 31E is fixed to a bearing bracket 9A of HST 1. Incidentally, bearing bracket 9A includes a circularly cylindrical mount boss 9d that has a sufficient strength for supporting sector gears 96 and 97. Alternatively, bearing bracket 9 including foot portion 9c may be used if there is no problem in the strength.

Servo unit 30E includes a bearing member 57 to be attached to bearing bracket 9A. A lower portion of bearing member 57 is joined to proximal housing side surface 31i of servo housing 31E so as to cover notch 31g. Bolt 38 (not shown) may be used to fasten bearing member 57 to servo housing 31i. Bearing member 57 is vertically extended along proximal side surfaces of sector gears 96 and 97 so as to have the proximal end portion of pivot shaft 98 of sector gear 97 supported by the vertically middle portion of bearing member 57. Bearing member 57 is formed in an upper portion thereof with a bearing hole 57a having fluid seal 39 therein, similar to bearing hole 37a of cover member 37. Trunnion boss 96a of sector gear 96 is passed through bearing hole 57a and is journalled by bearing member 57 via fluid seal 39.

Further, in correspondence to mount boss 9d of bearing bracket 9A, the upper portion of bearing member 57 is formed with a circularly cylindrical mount boss 57b, similar to mount boss 37c of cover member 37A. To attach servo unit 30E, mount boss 57b contacts mount boss 9b of bearing bracket 9A, and bolt 51 fastens mount boss 57b to mount boss 9d of bearing bracket 9A so as to fix servo housing 31E to bearing bracket 9A.

Incidentally, in servo unit 30 or so on, arm 34 is entirely covered with servo housing 31 and/or cover member 37 except that only the outer end portion of bolt boss 34d projects outward from servo housing 31. On the other hand, in servo unit 30E, bearing member 57 is disposed at the proximal side of sector gears 96 and 97, however, entire sector gear 96 and the upper portion of sector gear 97 are extended upward from servo housing 31E so that their distal side surfaces may be exposed. Therefore, a cover 58 is extended from an upper portion of bearing member 57 to a top of upward extended portion 31Uc of servo housing 31E so as to cover the distal side surface of entire sector gear 96 and the distal side surface of the upper portion of sector gear 97.

Incidentally, the head of bolt 95 at the distal side surface of sector gear 96 is also covered with cover 58. Therefore, to enable an operator to access the head of bolt 95, cover 58 may be detachable, or a wrench hole may be provided in cover 58 at a position corresponding to the head of bolt 95 so that an adjustable wrench can be inserted from the outside of cover 58 into the wrench hole so as to engage to the head of bolt 95. Further, cover 58 should be disposed along vertical plate portion 56b of step 56. Therefore, another wrench hole may be provided in vertical plate portion 56b of step 56 so that the adjustable wrench can be engages to the head of bolt 95 via the wrench holes in vertical plate portion 56c of step 56 and cover 58.

All servo units 30, 30A, 30B, 30C, 30D and 30E employ the hydraulic circuit structure shown in FIG. 17, i.e., rely on the assumption that each of them is an assembly as combination of hydraulic cylinder 132 incorporating piston 133 and proportional pressure control valves 35 and 36 for controlling the hydraulic pressures in fluid chambers 132a and 132b of hydraulic cylinder 132. In this regard, in FIG. 17, the reference numeral "30" is used to designate a representative servo unit for all servo units 30, 30A, 30B, 30C, 30D and 30E. Hereinafter, this representative servo unit is referred to as "servo unit 30".

Figure 24:
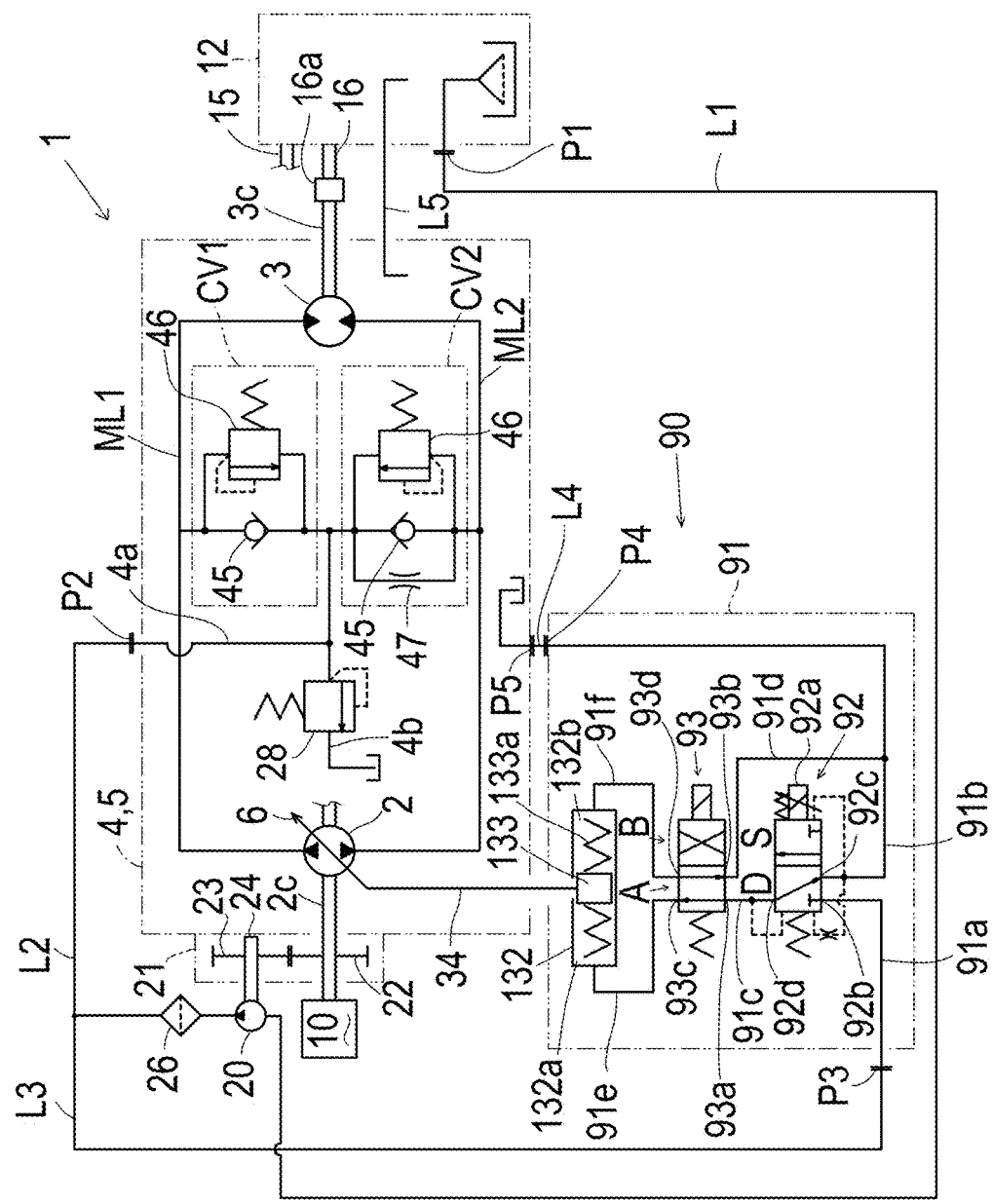
FIG. 24 is a hydraulic circuit diagram for supplying fluid to HST 1 and a servo unit 90.
Figure 25:
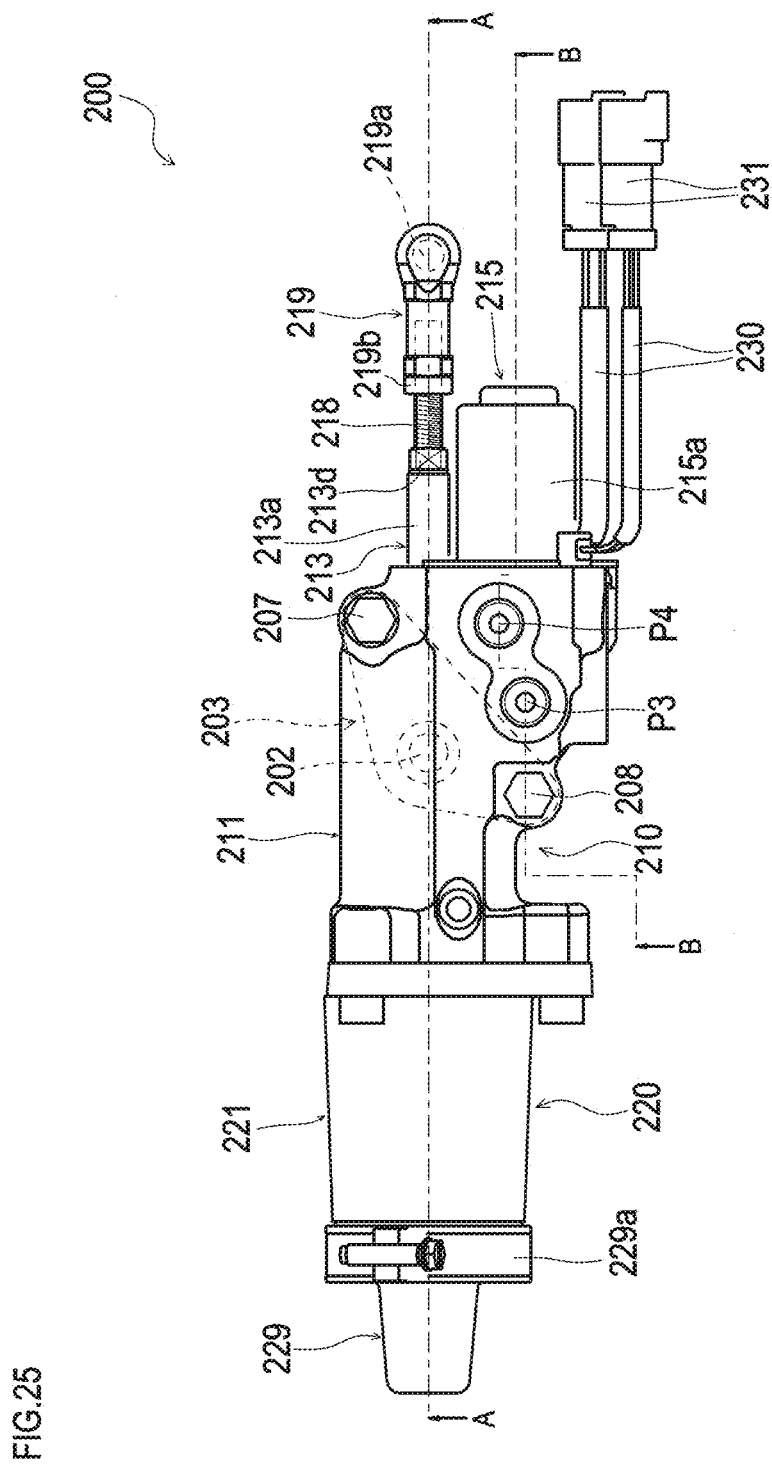
FIG. 25 is a side view of servo set 200.

An alternative servo unit 90 having a hydraulic circuit structure as shown in FIG. 24 will be described. Servo unit 90 includes a servo housing 91 formed therein with hydraulic cylinder 132, similar to servo housing 31. Servo housing 91 is provided with inlet port P3 for receiving fluid from charge pump 20, and with outlet port P4 for discharging fluid therefrom. Solenoid valves 92 and 93 are assembled in servo housing 91. Solenoid valve 92 is a proportional pressure control valve 92 that is expensive, while solenoid valve 93 is a simple directional control valve 93 that is economic.

In this regard, servo unit 30 includes two proportional solenoid valves serving as proportional pressure control valves 35 and 36, so that one is provided for forward traveling of the vehicle, and the other for backward traveling of the vehicle. In other words, one is provided for proportionally controlling the hydraulic pressure of fluid in fluid chamber 132a, and the other for proportionally controlling the hydraulic pressure of fluid in fluid chamber 132b. Therefore, servo unit 30 is expensive due to the two proportional solenoid valves. On the contrary, servo unit 90 includes only one proportional solenoid valve that is proportional pressure control valve 92 provided with a proportional solenoid 92a. Directional control valve 93 is economic because whether its solenoid is excited or not simply depends on whether a reversing (i.e., selecting either the forward or backward traveling direction) manipulator, such as a pedal or a lever, is set at a forward traveling position or a backward traveling position.

Proportional pressure control valve 92 includes three ports, i.e., a suction port 92b, a drain port 92c, a valve port 92d. Directional control valve 93 includes four ports, i.e., a valve port 93a, a drain port 93b, a first fluid chamber connection port 93c, and a second fluid chamber connection port 93d. Suction port 92b of proportional pressure control valve 92 is fluidly connected to inlet port P3 via a fluid passage 91a. Drain port 92b of proportional pressure control valve 92 is fluidly connected to outlet port P4 via a fluid passage 91b. Valve port 92d of proportional pressure control valve 92 is fluidly connected to valve port 93a of directional control valve 93 via a fluid passage 91c. Drain port 93b of directional control valve 93 is fluidly connected via a fluid passage 91d to fluid passage 91b extended from drain port 92c of proportional pressure control valve 92 to outlet port P4. Fluid drained from proportional pressure control valve 92 and fluid from directional control valve 93 are joined to each other via fluid passages 91b and 91d so as to be drained outward from servo housing 91 via outlet port P4. First fluid connection port 93c of directional control valve 93 is fluidly connected to fluid chamber 132a via a fluid passage 91e. Second fluid connection port 93d of directional control valve 93 is fluidly connected to fluid chamber 132b via a fluid passage 91f.

Proportional pressure control valve 92 is vibratorily shifted between supply position S and drain position D due to the control of current applied to proportional solenoid 92a. Proportional pressure control valve 92 set at supply position S fluidly connects valve port 92d to suction port 92b so as to supply fluid from valve port 92d to valve port 93a of directional control valve 93 via fluid passage 91c. Proportional pressure control valve 92 set at drain position D fluidly connects valve port 92d to drain port 92c so as to drain fluid from valve port 93a of directional control valve 93 to fluid passage 91b connected to outlet port P4 via fluid passage 91c. Due to the repeat of vibratory shift of proportional pressure control valve 92 between supply positon S and drain position D, a certain hydraulic pressure is given to valve port 93a.

Directional control valve 93 is shifted between a first position A and a second position B by on-off switching of its solenoid depending on the shift of the reversing manipulator between the forward traveling positon and the backward traveling position. One of first and second positions A and B corresponds to the forward traveling positon, and the other corresponds to the backward traveling position. Hereinafter, description will be based on an assumption that first position A corresponds to the forward traveling position, and second position B corresponds to the backward traveling position.

Directional control valve 93 set at first position A fluidly connects valve port 93a to first fluid chamber connection port 93c, and drain port 93b to second fluid chamber connection port 93d. Therefore, when directional control valve 93 is set at first position A, fluid chamber 132b is fluidly connected via directional control valve 93 to fluid passage 91d connected to drain port P4) bypassing proportional pressure control valve 92, regardless of the set position of proportional pressure control valve 92, and fluid chamber 132a is fluidly connected to valve port 92d of proportional pressure control valve 92 via directional control valve 93.

During the setting of directional control valve 93 at first position A, when proportional pressure control valve 92 is set at supply position S, fluid chamber 132a is fluidly connected to suction port 92b of proportional pressure control valve 92 constantly connected to inlet port P3, so that fluid chamber 132a is supplied with hydraulic fluid from inlet port P3 via proportional pressure control valve 92 so as to be expanded to press piston 133 in the direction to fluid chamber 132b. Due to the pressure of piston 133 by the hydraulic expansion of fluid chamber 132a, fluid is naturally discharged from fluid chamber 132b to outlet port P4 via directional control valve 93 and fluid passage 91d. On the contrary, during the setting of directional control valve 93 at first position A, when proportional pressure control valve 92 is set at drain position D, fluid chamber 132a is fluidly connected to drain port 92c of proportional pressure control valve 92 constantly connected to fluid passage 91b, which is joined to fluid passage 91d and is extended to outlet portion P4. Therefore, both fluid chambers 132a and 132b are fluidly connected not to inlet port P3 but to each other and to outlet port P4, so that the fluid flow between fluid chambers 132a and 132b through valves 92 and 93 and fluid passages 91b and 91d is naturally adjusted freely from the hydraulic pressure of fluid supplied from inlet port P3 so as to locate piston 133 at a position where fluid chambers 132a and 132b are balanced in hydraulic pressure. While directional control valve 93 is set at first position A for forward traveling, finally, piston 133 reaches a target position closer to one end of hydraulic cylinder 132 at fluid chamber 132b side than the other end of hydraulic cylinder 132 at fluid chamber 132a side, so that movable swash plate 6 is located at a corresponding target tilt angle in the tilt direction for forward traveling.

Directional control valve 93 set at first position B fluidly connects valve port 93*a* to second fluid chamber connection port 93*d*, and drain port 93*b* to first fluid chamber connection port 93*c*. Therefore, when directional control valve 93 is set at second position B, fluid chamber 132*a* is fluidly connected via directional control valve 93 to fluid passage 91*d* (connected to outlet port P4) bypassing proportional pressure control valve 92, regardless of the set position of proportional pressure control valve 92, and fluid chamber 132*b* is fluidly connected to valve port 92*d* of proportional pressure control valve 92 via directional control valve 93.

During the setting of directional control valve 93 at first position B, when proportional pressure control valve 92 is set at supply position S, fluid chamber 132*b* is fluidly connected to suction port 92*b* of proportional pressure control valve 92 constantly connected to inlet port P3, so that fluid chamber 132*b* is supplied with hydraulic fluid from inlet port P3 via proportional pressure control valve 92 so as to be expanded to press piston 133 in the direction to fluid chamber 132*a*. Due to the pressure of piston 133 by the hydraulic expansion of fluid chamber 132*b*, fluid is naturally discharged from fluid chamber 132*a* to outlet port P4 via directional control valve 93 and fluid passage 91*d*. On the contrary, during the setting of directional control valve 93 at first position B, when proportional pressure control valve 92 is set at drain position D, fluid chamber 132*b* is fluidly connected to drain port 92*c* of proportional pressure control valve 92 constantly connected to fluid passage 91*b*, which is joined to fluid passage 91*d* and is extended to outlet portion P4. Therefore, both fluid chambers 132*a* and 132*b* are fluidly connected not to inlet port P3 but to each other and to outlet port P4, so that the fluid flow between fluid chambers 132*a* and 132*b* through proportional pressure control valves 92 and 93 and fluid passages 91*b* and 91*d* is naturally adjusted so as to locate piston 133 at a position where fluid chambers 132*a* and 132*b* are balanced in hydraulic pressure. While directional control valve 93 is set at first position B for backward traveling, finally, piston 133 reaches a target position closer to one end of hydraulic cylinder 132 at fluid chamber 132*a* side than the other end of hydraulic cylinder 132 at fluid chamber 132*b* side, so that movable swash plate 6 is located at a corresponding target tilt angle in the tilt direction for backward traveling.

The above-mentioned configuration of servo unit 90 shown in FIG. 24 may adapted to any of servo unit 30 to 30E shown in FIGS. 15, 16, and 18 to 23. In other words, servo unit 90 is provided with a connection means for connecting piston 133 to trunnion shaft 6*b*. This connection means may be either an arm like arm 34 employed by each of servo units 30, 30A, 30B, 30C and 30D or sector gears like sector gears 96 and 97 employed by servo unit 30E.

If servo housing 91 is configured so as to be fixed to bearing bracket 9 or 9A of HST 1, servo unit 90 may be provided with any one of cover members 37, 37A and 37D and bearing member 57. If servo housing 91 is configured so as to be fixed to vehicle frame casing 11, servo unit 90 may have the structure as shown in FIG. 19. If servo housing 91 is configured so as to be fixed to step 14, servo unit 90 may have the structure as shown in FIG. 20. Servo housing 91 may have the structure of any one of servo housings 31, 31A, 31C, 31D and 31E depending on which portion of servo housing 91 should have outlet port P4, which member or portion should have servo housing 91 fixed thereto, or so on.

Next, still another embodiment of a servo set for controlling a movable swash plate of an HST will be described with reference to FIGS. 25 to 35. Further, the members and portions designated by the reference numerals used in the aforementioned description are identical or similar to the respective members and portions designated by the same reference numerals and, therefore, will not be described redundantly.

It is an object of this embodiment to provide an actuator device that is reduced in size, thereby downsizing the HST equipped with the actuator device.

Figure 33:
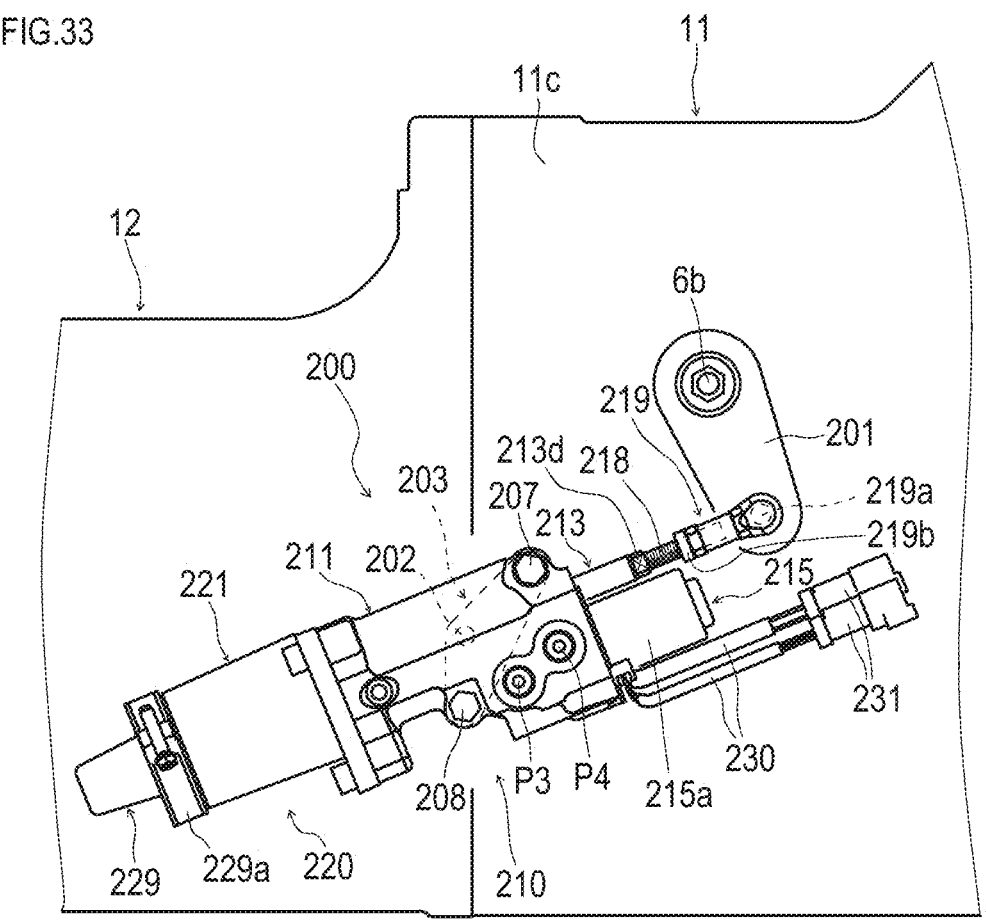
FIG. 33 is a side view illustrating a state of mounting of servo set 200 to vehicle frame casing 11.
Figure 34:
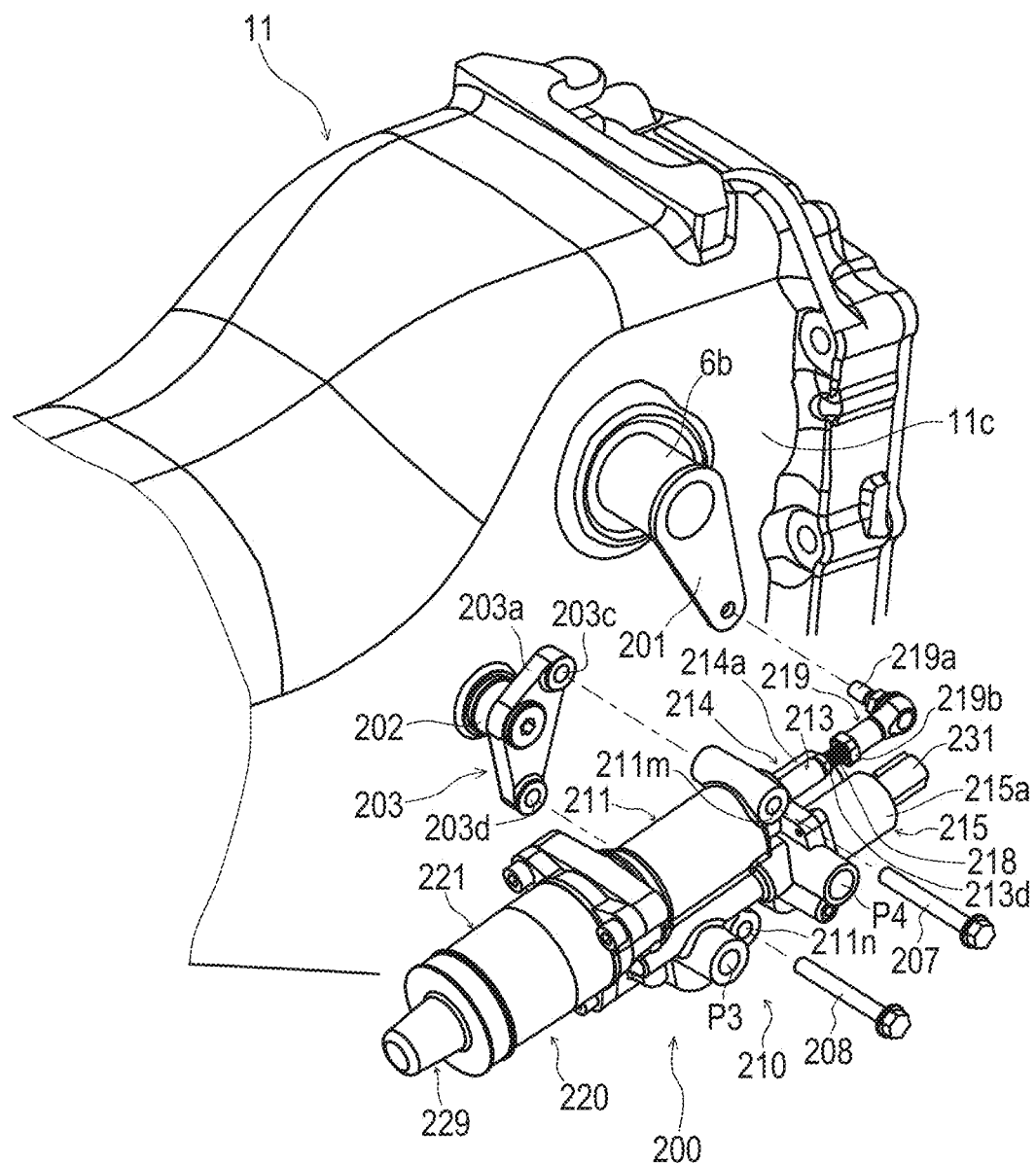
FIG. 34 is a perspective assembly view illustrating the state of mounting of servo set 200 to vehicle frame casing 11.

Similarly to those in the first embodiment described with reference to FIGS. 1 and 2, as illustrated in FIG. 33, axle casing 12 and vehicle frame casing 11 interiorly incorporating HST1 (not illustrated) are provided, and servo set 200 is disposed on the right side portion of vehicle frame casing 11 and axle casing 12.

First, with reference to FIGS. 25 to 33, the structure of servo set 200 will be described. Servo set 200 described in the present embodiment includes servo portion 210 which is a portion having the same functions as those of the aforementioned servo unit 60, and neutral returning portion 220 which is a portion having the same functions as those of the aforementioned neutral returning unit 80, which are integrated with each other.

Figure 29:
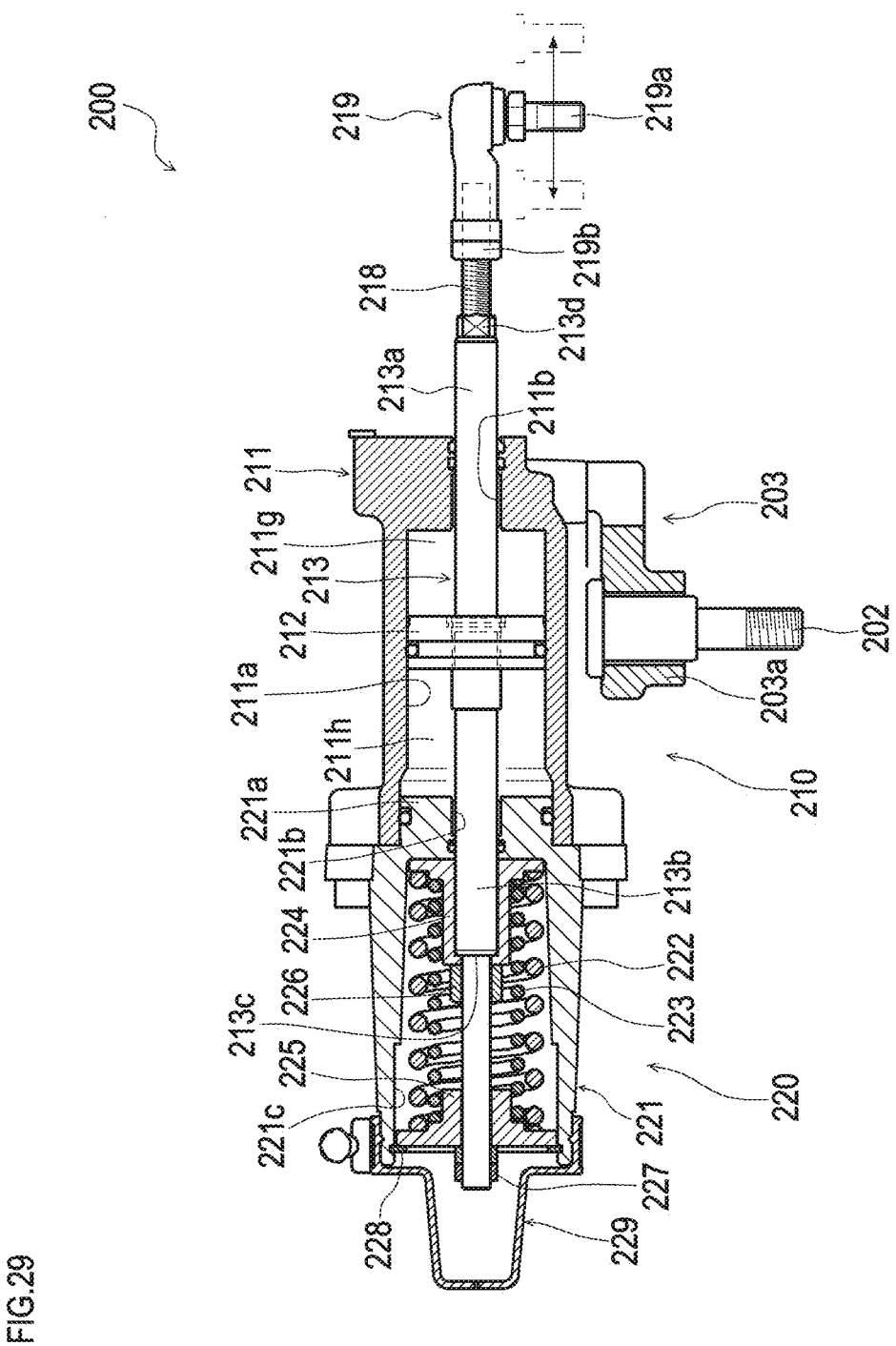
FIG. 29 is a cross-sectional view taken along A-A line of FIG. 25.
Figure 30:
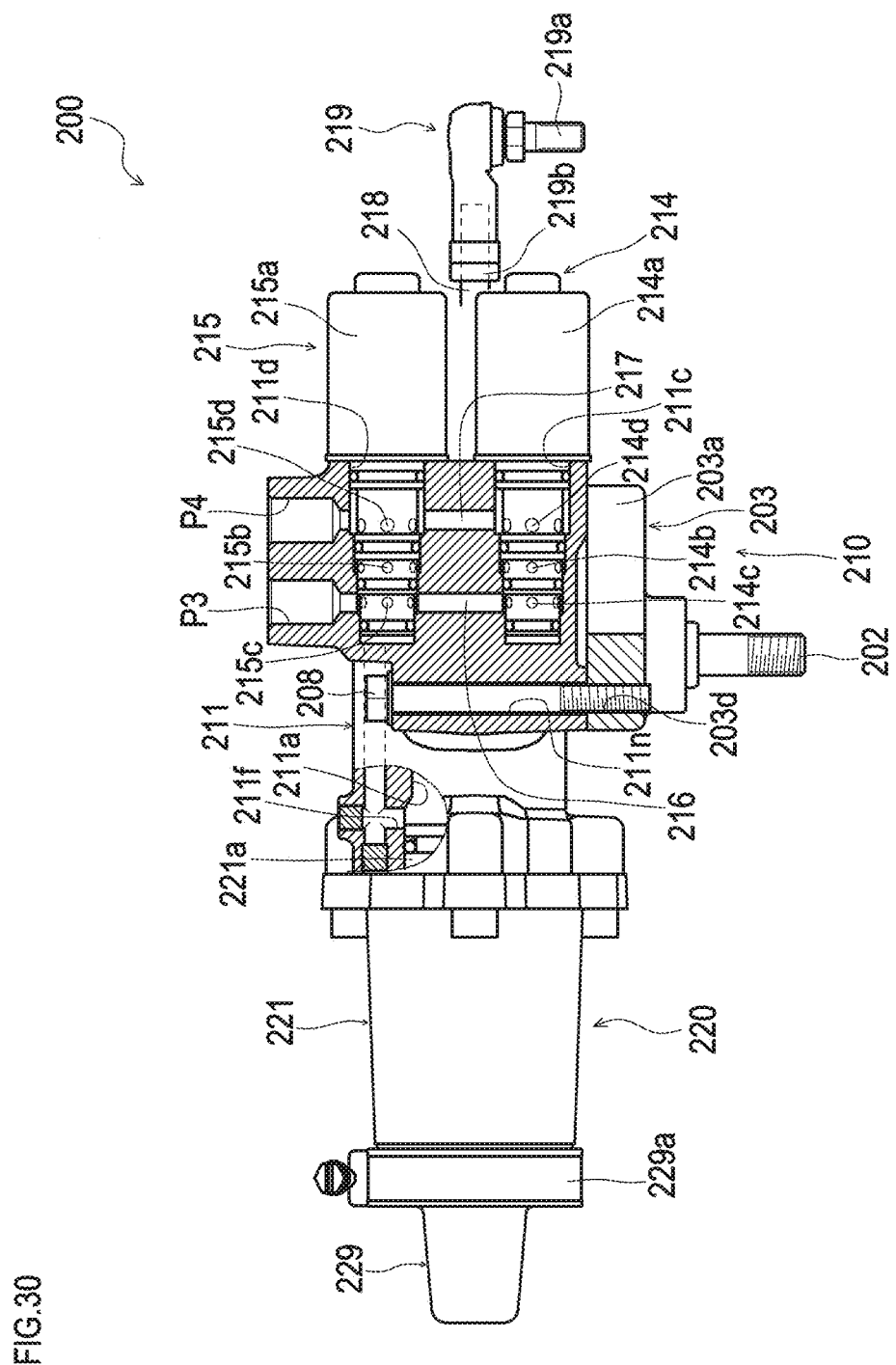
FIG. 30 is a cross-sectional view taken along B-B line of FIGS. 25 and 26.
Figure 31:
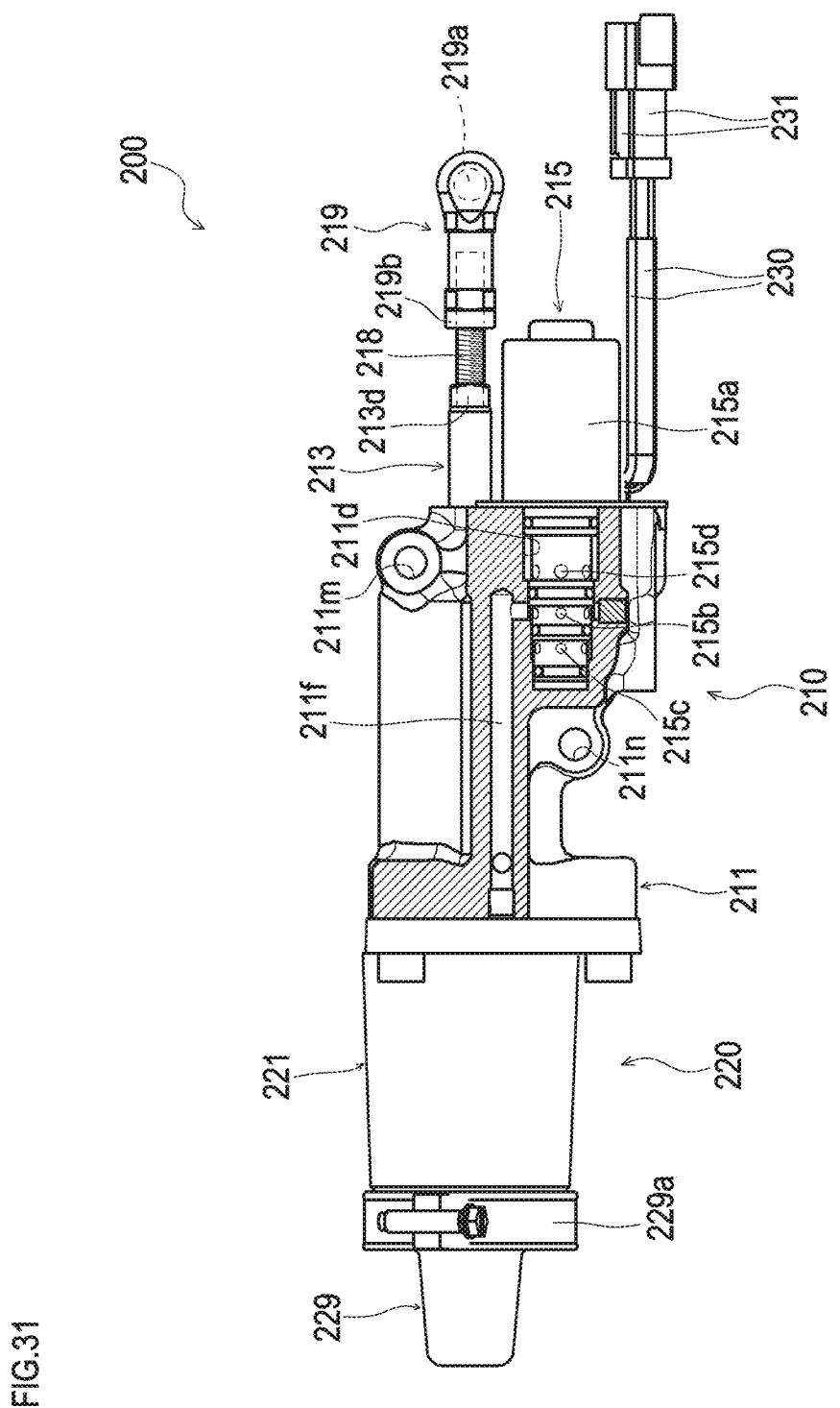
FIG. 31 is a cross-sectional view taken along C-C line of FIG. 26.
Figure 32:
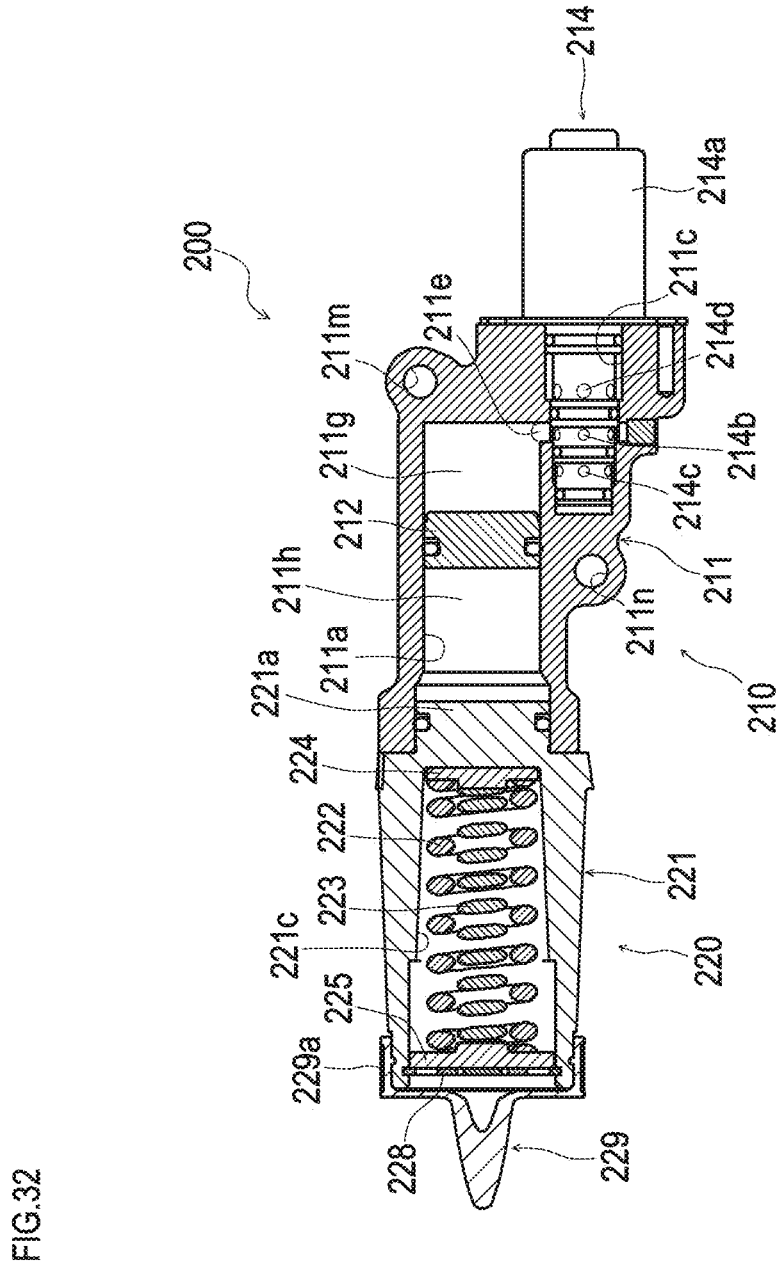
FIG. 32 is a cross-sectional view taken along D-D line of FIG. 26.

Servo portion 210 is constituted by servo main body 211 (which is also the cylinder case), piston 212, piston rod 213, and proportional pressure control valves 214 and 215, as illustrated in FIG. 29.

Servo main body 211 forms a middle portion of servo set 200 in the forward and rearward direction and is a case member corresponding to the integration of hydraulic cylinder 32, valve block 64 and fluid duct block 65 which have been described above. Servo main body 211 is provided with cylinder 211*a*, rod hole 221*b*, valve holes 211*c* and 211*d*, fluid passages 211*e* and 211*f*. Further, servo main body 211 also has the function (role) of a bracket for mounting servo set 200 to vehicle frame casing 11. As illustrated in FIG. 33, servo main body 211 is extended substantially in the forward and rearward direction along outer side surface 11*c* on the right side of vehicle frame casing 11, with plate member 203 interposed therebetween. Servo main body 211 is pivotally supported, at its middle portion in the forward and rearward direction, on vehicle frame casing 11, through pivot shaft 202.

Cylinder 211*a* is a vacant portion with a substantially cylindrical shape for slidably housing piston 212, which is formed in servo main body 211. Cylinder 211*a* is partitioned, by piston 212, into fluid chamber 211*g* on the front side and fluid chamber 211*h* on the rear side.

Piston 212 is slidably provided within cylinder 211*a*, and piston rod 213 is extended forwardly and rearwardly therefrom on the axis center of piston 212. With this structure, if piston 212 is displaced in the forward and rearward direction within cylinder 211*a*, piston rod 213 is displaced along with the displacement of piston 212.

Front half portion 213*a* of piston rod 213, which is the front portion thereof with respect to piston 212, is extended up to the outside of the front side of servo main body 211 through rod hole 211*b*, which enables increasing and decreasing the length of the protrusion of front half portion 213*a* from servo main body 211 to the outside. Further, rear half portion 213*b* of piston rod 213, which is the rear portion thereof with respect to piston 212, is extended rearwardly toward neutral returning portion 220, which enables increasing and decreasing the length of the protrusion of rear half portion 213*b* from servo main body 211 toward neutral returning portion 220.

The portion of servo main body 211 which closes the front-end side opening portion of cylinder 211*a* forms a supporting base portion for proportional pressure control valves 214 and 215. Proportional pressure control valves 214 and 215 are screwed into valve holes 211c and 211d which are formed in the supporting base portion.

Fluid passage 211e is formed within the wall of servo main body 211, in such a way as to cause cylinder 211a and valve hole 211c to communicate with each other. Fluid passage 211e is connected to the front end portion of cylinder 211a, thereby communicating with fluid chamber 211g. Fluid passage 211f is formed within the wall of servo main body 211, in such a way as to cause cylinder 211a and valve hole 211d to communicate with each other. Fluid passage 211f is connected to the rear end portion of cylinder 211a, thereby communicating with fluid chamber 211h.

Proportional pressure control valve 214 is adapted to supply or discharge a pressurized fluid to or from fluid chamber 211g formed on the front side with respect to piston 212 within cylinder 211a. Proportional pressure control valve 215 is adapted to supply or discharge the pressurized fluid to or from fluid chamber 211h formed on the rear side with respect to piston 212 within cylinder 211a. Proportional pressure control valves 214 and 215 are proportional solenoid valves provided with proportional solenoids 214a and 215a, respectively. Proportional pressure control valves 214 and 215 are electrically connected, through wirings 230 and 230 and couplers 231 and 231, to a control device, which is not illustrated, for controlling the operations of respective proportional pressure control valves 214 and 215.

Proportional pressure control valve 214 includes supply/discharge port 214b adapted to communicate with fluid chamber 211g through fluid passage 211e. Proportional pressure control valve 215 includes supply/discharge port 215b adapted to communicate with fluid chamber 211h through fluid passage 211f. One of proportional pressure control valves 214 and 215 is designated as a proportional pressure control valve to be excited in determining the forward travelling speed, while the other is designated as a proportional pressure control valve to be excited in determining the rearward travelling speed. Through supply/discharge port 214b or 215b in the proportional pressure control valve being excited, the pressurized fluid is supplied out of proportional pressure control valves 214 and 215 to the corresponding fluid chamber 211g or 211h via the corresponding fluid passage 211e or 211f.

Further, servo main body 211 includes inlet port P3 and outlet port P4. Inlet port P3 communicates with fluid supply port 214c of proportional pressure control valve 214 and with fluid supply port 215c of proportional pressure control valve 215, through fluid passage 216. Outlet port P4 communicates with fluid discharge port 214d of proportional pressure control valve 214 and with fluid discharge port 215d of proportional pressure control valve 215, through fluid passage 217.

With this structure, proportional pressure control valve 214 is adapted to move a spool (not illustrated), through excitation of proportional solenoid 214a, for bringing fluid supply port 214c into an "opened" state while bringing fluid discharge port 214d into a "closed" state, thereby supplying the pressurized fluid supplied through inlet port P3 to fluid chamber 211g via fluid passage 211e, through fluid supply port 214c and supply/discharge port 214b. Further, in demagnetization states, fluid supply port 214c is in a "closed" state while fluid discharge port 214d is in an "opened" state, so that the pressurized fluid accumulated in fluid chamber 211g is discharged from outlet port P4, through supply/discharge port 214b and fluid discharge port 214d, via fluid passage 211e.

Further, proportional pressure control valve 215 is adapted to move a spool (not illustrated) through excitation of proportional solenoid 215a, for bringing fluid supply port 215c into an "opened" state while bringing fluid discharge port 215d into a "closed" state, thereby supplying a hydraulic fluid supplied through inlet port P3 to fluid chamber 211h via fluid passage 211f, through fluid supply port 215c and supply/discharge port 215b. Further, in demagnetization states, fluid supply port 215c is in a "closed" state while fluid discharge port 215d is in an "opened" state, so that the pressurized fluid accumulated in fluid chamber 211h is discharged from outlet port P4, through supply/discharge port 215b and fluid discharge port 215d, via fluid passage 211f.

Figure 26:
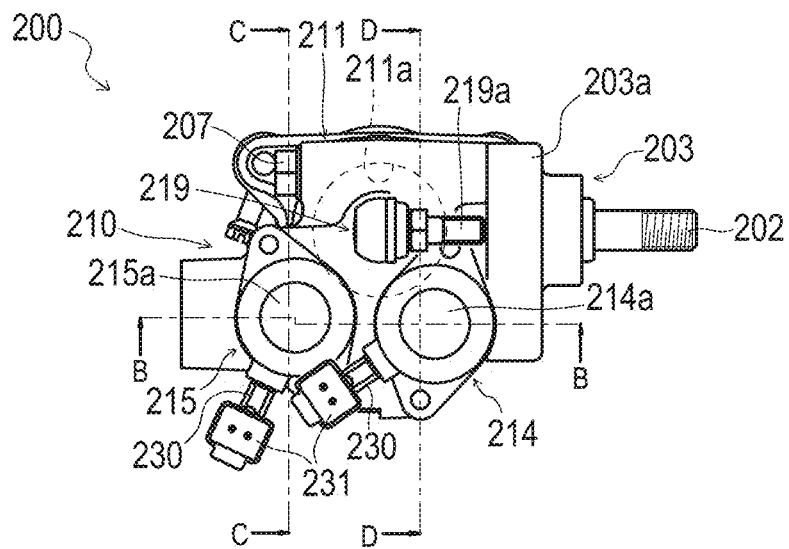
FIG. 26 is a rear view of servo set 200.
Figure 27:
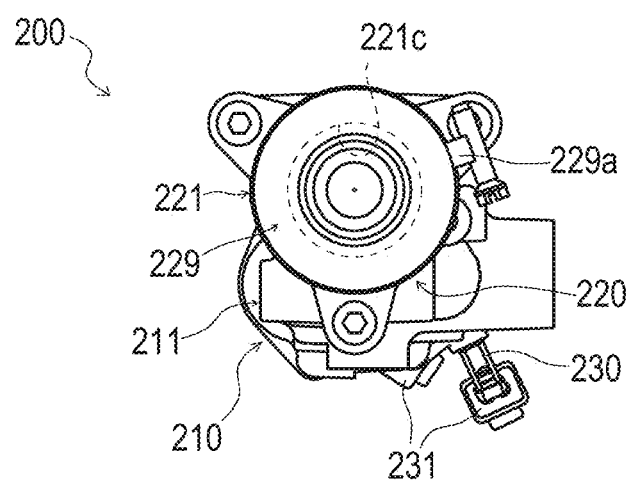
FIG. 27 is a front view of servo set 200.
Figure 28:
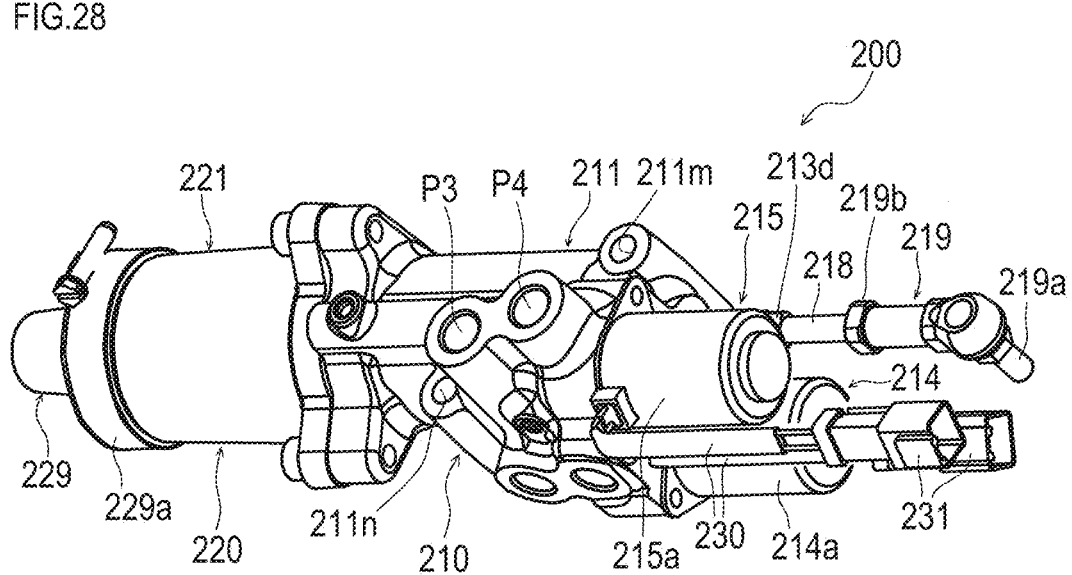
FIG. 28 is a perspective view of servo set 200.

As illustrated in FIG. 26, the positional relationship between cylinder 211a and proportional pressure control valves 214 and 215 in servo set 200 is such that the axis center of piston rod 213 and the axis centers of the displacements of the valve bodies in respective proportional pressure control valves 214 and 215 are placed at positions forming a triangle shape, when viewed in the axial direction of cylinder 211a. With this placement, it is possible to reduce the size of servo set 200 in the radial direction (in the direction orthogonal to the axial direction of piston rod 213).

Servo portion 210 includes thread portion 218 at the front end of front half portion 213a of piston rod 213, and connection member 219 with a cap shape is screwed around this thread portion 218. Connection member 219 is adapted such that the depth of screwing thereof around thread portion 218 can be adjusted. Connection member 219 includes thread portion 219a protruded in the direction orthogonal to the axis line of piston rod 213 in the state of being screwed around thread portion 218. Further, the position of connection member 219 relative to thread portion 218 can be fixed by nut 219b screwed around thread portion 218.

Servo portion 210 includes flat portion 213d at the front end of front half portion 213a of piston rod 213. Flat portion 213d can be made engageable with a tool such as a wrench, in order that piston rod 213 can be easily rotated about the axis center thereof.

Thread portion 219a at the front end of piston rod 213 is pivotally coupled to arm member 201 (which is the manipulation lever) secured to trunnion shaft 6b, so that servo portion 210 is connected to movable swash plate 6 (not illustrated) in HST 1. Further, in servo portion 210, by rotating piston rod 213 about its axis center with a tool such as a wrench using flat portion 213d, in the state where thread portion 219a at the front end of piston rod 213 is pivotally coupled to arm member 201, it is possible to adjust the depth of screwing of connection member 219 around thread portion 218, thereby easily setting the neutral position of piston rod 213.

Namely, as illustrated in FIG. 29, in servo set 200, piston rod 213 is provided with thread portion 219a at the tip end portion of front half portion 213a, and piston rod 213 is secured, through screwing, to arm member 201 through thread portion 219a. Piston rod 213 is also provided with flat portion 213d in at least a portion of the outer peripheral surface of piston rod 213. With this structure, it is possible to easily adjust the neutral position of servo set 200.

Further, servo portion 210 is secured, through pivot shaft 202, to plate member 203, which acts as a mounting part and is rotatably and pivotally supported with respect to shaft hole 11f, which is a concave portion formed in vehicle frame casing 11. Plate member 203 is provided with shaft hole 203b adapted to allow pivot shaft 202 to be inserted therethrough, and bolt holes 203c and 203d for use in securing servo portion 210, in plate portion 203a for supporting servo portion 210. Plate member 203 is provided on the side portion of vehicle frame casing 11, by inserting a bolt as pivot shaft 202 into shaft hole 203b and shaft hole 11f formed in vehicle frame casing 11 and, further, by screwing nut 204 around pivot shaft 202. At this time, collar 205 is interposed between pivot shaft 202 and shaft hole 203b, and washer 206 is interposed between vehicle frame casing 11 and plate portion 203a, so that plate member 203 is smoothly rotated about pivot shaft 202.

Servo portion 210 is secured to plate member 203 by inserting respective bolts 207 and 208 into through holes 211m and 211n formed in servo main body 211 and, further, by screwing respective bolts 207 and 208 into bolt holes 203c and 203d in plate member 203. As plate member 203 oscillates about pivot shaft 202, servo portion 210 can also oscillate.

Neutral returning portion 220 is constituted by cylindrical member 221, neutral biasing springs 222 and 223, spring retainers 224 and 225, nuts 226 and 227, retaining ring 228, and cover 229.

Cylindrical member 221 is provided with boss portion 221a with a substantially-cylindrical shape which protrudes forwardly, and rod hole 221b penetrated through boss portion 221a on its axis center. Boss portion 221a is fitted into a rear-end opening in servo main body 211, so that the cylindrical member 221 is provided coaxially with cylinder 211a on the rear end portion of servo main body 211 in servo portion 210. Cylindrical member 221 is extended along outer side surface 11c on the right side of vehicle frame casing 11.

Cylindrical member 221 is sealed at its front end by boss portion 221a and is opened at its rear end. Rear half portion 213b of piston rod 213 is inserted through rod hole 221b in the forward and rearward direction, in such a way as to penetrate through cylindrical member 221. Rear half portion 213b of piston rod 213 can be extended rearwardly from the rear end of cylindrical member 221. Piston rod 213 can slide in the axial direction of rod hole 221b (in the forward and rearward direction). When piston rod 213 slides forwardly, the rear end of rear half portion 213b of piston rod 213 can protrude rearwardly from the rear end of boss portion 221a.

Within cylindrical member 221, a pair of front and rear spring retainers 224 and 225 are fitted to rear half portion 213b of piston rod 213, in such a way as to be slidable in the axial direction with respect to cylindrical member 221. Further, between the pair of spring retainers 224 and 225 within cylindrical member 221, two neutral biasing springs 222 and 223 with a coil spring shape and with different spring diameters are interposed in such a way as to surround piston rod 213. Neutral biasing spring 223 with a smaller spring diameter is arranged inside neutral biasing spring 222 with a larger spring diameter, coaxially with piston rod 213. Further, retaining ring 228 is secured to the inner peripheral portion of the rear end portion of cylindrical member 221. The rear end surface of boss portion 221a in cylindrical member 221 restricts the forward sliding of front spring retainer 224, and retaining ring 228 restricts the rearward sliding of rear spring retainer 225. Further, cover 229 is provided on the rear portion of cylindrical member 221, in order to protect the rear portion of piston rod 213 protruding rearwardly, during rearward sliding of piston 212. Cover 229 is made of a rubber with elasticity, and is secured to cylindrical member 221 by fastening band 229a fitted to the outer side of cover 229.

Namely, as illustrated in FIG. 29, plural neutral biasing springs 222 and 223 which constitute neutral returning portion 220 in servo set 200 are arranged in the axial direction, such that the coil axis centers of respective neutral biasing springs 222 and 223 and the axis center of piston rod 213 are substantially coincident with each other. With this placement, it is possible to reduce the size of servo set 200 in the radial direction (in the direction orthogonal to the axial direction of piston rod 213).

With regard to the arrangement of servo portion 210 and neutral returning portion 220 in servo set 200, piston rod 213 and respective proportional pressure control valves 214 and 215 are placed such that the axial direction of piston rod 213 and the directions of displacements of the valve bodies of respective proportional pressure control valves 214 and 215 are parallel with each other. Further, respective proportional pressure control valves 214 and 215 are placed on the end portion of one side of servo main body 211 constituting servo portion 210 and, also, respective neutral biasing springs 222 and 223 are placed on the end portion of the other side (the opposite side to the side provided with respective proportional pressure control valves 214 and 215) of servo main body 211. With this placement, it is possible to reduce the size of servo set 200 in the radial direction (in the direction orthogonal to the axial direction of piston rod 213).

In neutral returning portion 220, neutral biasing springs 222 and 223 are in an initial compressed state, and the spring forces of neutral biasing springs 222 and 223 in the forward and rearward and outward directions bring both front and rear spring retainers 224 and 225 into press contact with the rear end surface of boss portion 221a and with retaining ring 228, respectively. Further, piston rod 213 is provided with stepped portion 213c halfway through its rear half portion 213b in the axial direction, and stepped portion 213c is in contact with front spring retainer 224 at its front side, while front spring retainer 224 is in contact with the rear end surface of boss portion 221a. Nut 226 is screwed around rear half portion 213b of piston rod 213, and is in contact with spring retainer 224 at its rear side. Thus, stepped portion 213c and nut 226 sandwich front spring retainer 224 therebetween, so that spring retainer 224 is secured with respect to piston rod 213. Further, nut 227 is screwed around rear half portion 213b of piston rod 213, and nut 227 is in contact with rear spring retainer 225 at its rear side. Thus, nut 227 restricts the position to which rear spring retainer 225 can slide rearwardly. Further, nut 227 is constituted by a double nut.

Neutral position of the piston rod 213 is set to the position in the initial state determined by neutral biasing springs 222 and 223 as illustrated in FIG. 29, in the direction of sliding of piston rod 213, when proportional solenoids 214a and 215a are both demagnetized. The structure for connecting movable swash plate 6 and piston rod 213 to each other is set such that movable swash plate 6 is at a neutral position when piston rod 213 is at the neutral position.

If the hydraulic pressure in fluid chamber 211g exceeds the biasing force of neutral biasing springs 222 and 223 as a result of excitation of proportional solenoid 214a, the tip end of piston rod 213 slides leftwardly in the paper plane of FIG. 29 from the neutral position thereof, which causes trunnion shaft 6b to rotate in the forward-travelling direction, through front half portion 213a of piston rod 213, thread portion 218, connection member 219 and arm member 201. At this time, servo main body 211 of servo portion 210 oscillates about pivot shaft 202 to absorb the difference between the circumferential movement of arm member 201 as the rotary member and the linear movement of piston rod 213 as a telescopic member.

Further, during the leftward sliding of piston rod 213, rear spring retainer 225 is kept in contact with rear retaining ring 228, while front spring retainer 224 is pushed to move rearwardly by stepped portion 213c of piston rod 213. Thus, neutral biasing springs 222 and 223 are further compressed from the initial compressed state to apply a forward biasing force to piston rod 213. This biasing force forms a forward biasing force for restoring piston rod 213 (and, therefore, piston 212 and movable swash plate 6) to the neutral position.

On the other hand, if the hydraulic pressure in fluid chamber 211h exceeds the biasing force of neutral biasing springs 222 and 223 as a result of excitation of aforementioned proportional solenoid 215a, the tip end of piston rod 213 slides rightwardly in the paper plane of FIG. 29 from the neutral position thereof, which causes trunnion shaft 6b to rotate in the rearward-travelling direction, through front half portion 213a of piston rod 213, thread portion 218, connection member 219 and arm member 201. At this time, servo main body 211 of servo portion 210 oscillates about pivot shaft 202 similarly to the aforementioned description, to absorb the difference between the rotation of arm member 201 and the linear movement of piston rod 213.

During the rightward sliding of piston rod 213, front spring retainer 224 is kept in contact with the rear end surface of boss portion 221a, while rear spring retainer 225 is pushed to move forwardly by nut 227 provided on the rear end portion of piston rod 213. Thus, neutral biasing springs 222 and 223 are further compressed from the initial compressed state to apply, to piston rod 213, a rearward biasing force for restoring piston rod 213 (and, therefore, piston 212 and movable swash plate 6) to the neutral position.

As described above, the neutral position of piston rod 213 defines the neutral position of piston 212 (in the state where proportional solenoids 214a and 215a are demagnetized) and, also, defines the neutral position of movable swash plate 6 through arm member 201. Namely, neutral returning portion 220 restores piston rod 213 to the neutral position through the biasing force of neutral biasing springs 222 and 223, thereby restoring piston 212 of servo portion 210 to the neutral position thereof.

Figure 35:
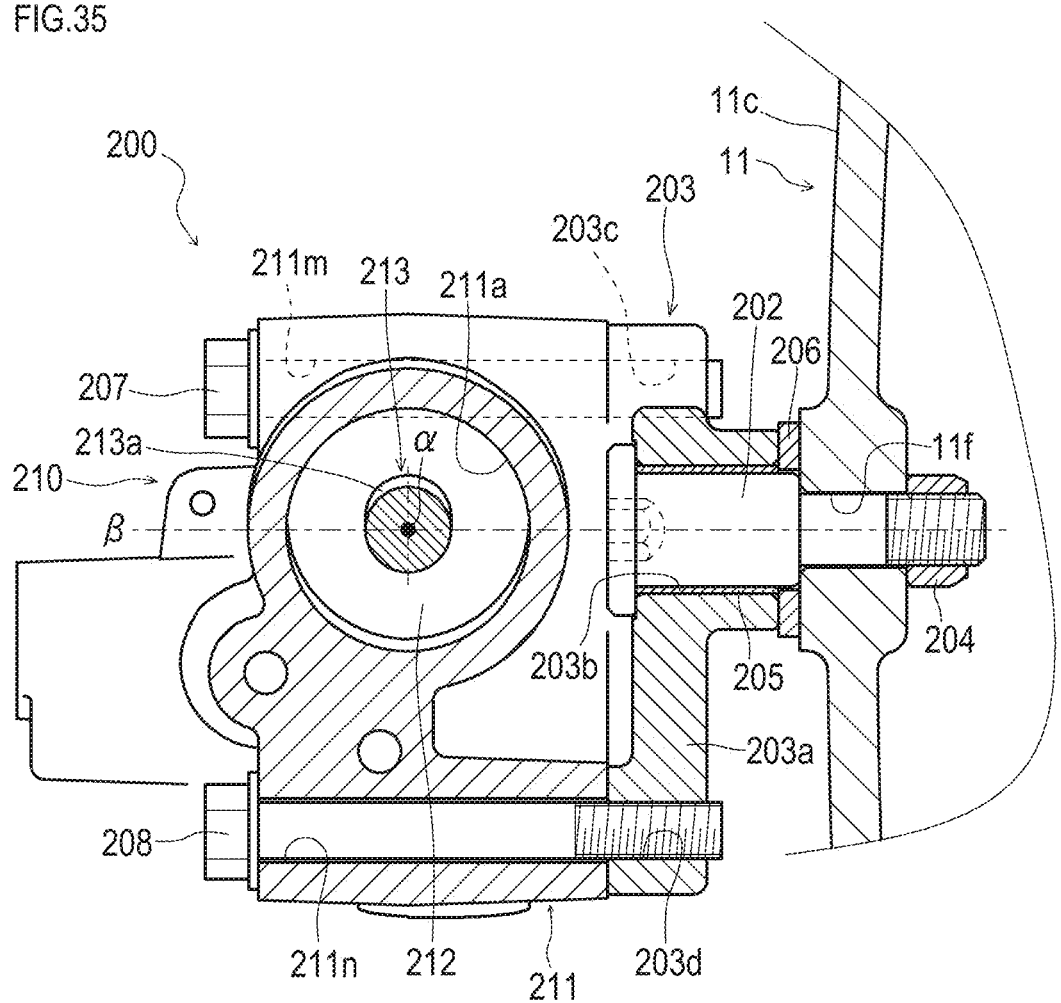
FIG. 35 is a front-portion cross-sectional view illustrating a portion for pivotally supporting servo set 200 on vehicle frame casing 11.
Figure 36:
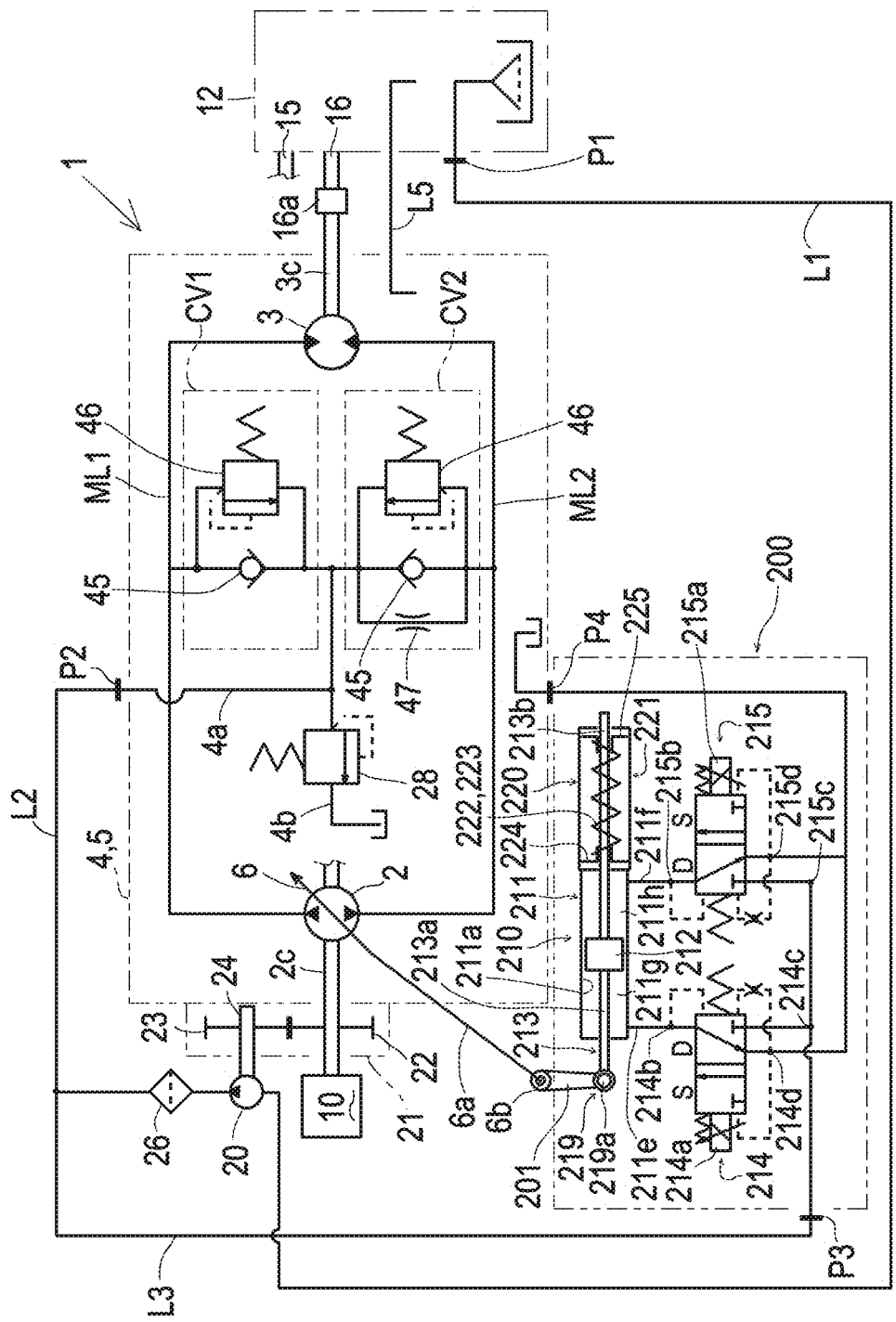
FIG. 36 is a hydraulic circuit diagram for supplying fluid to HST1 and servo set 200.
Figure 37:
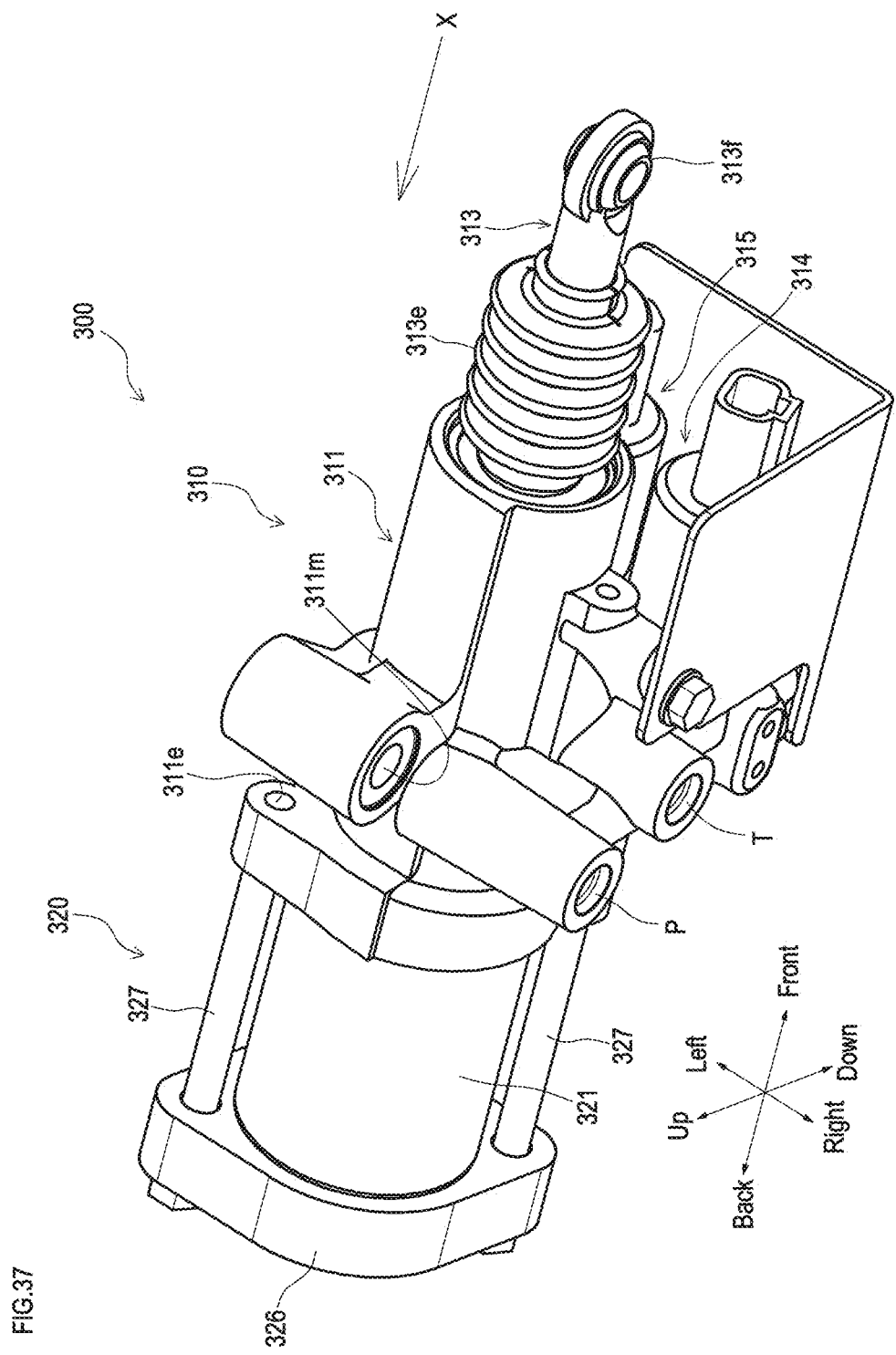
FIG. 37 is a perspective view of a servo set 300.

Further, as illustrated in FIG. 35, in servo set 200, servo portion 210 constituting servo main body 211 is mounted to plate member 203, such that the longitudinal axis line a of piston rod 213 and the axis line β of pivot shaft 202 (the rotational center of plate member 203) are overlapped with each other, when viewed in a cross section. With this structure, it is possible to efficiently transmit the forward and rearward strokes of piston rod 213 to arm member 201, while further smoothening the oscillation of servo set 200, during speed-changing manipulations.

As illustrated in FIG. 35, pivot shaft 202 is inserted at its laterally distal portion through shaft hole 203b. Pivot shaft 202 is inserted at a laterally proximal end portion into vehicle frame casing 11 through outer side surface 11c and, further, is prevented from being disengaged therefrom. Namely, plate member 203 is rotatably and pivotally supported through pivot shaft 202 protruding rightwardly and leftwardly in the horizontal direction from outer side surface 11c of vehicle frame casing 11. Servo main body 211 of servo portion 210 is secured, at its middle portion in the forward and rearward direction, to plate member 203. Thus, the entire servo set 200 (namely, servo portion 210 and neutral returning portion 220) can vertically oscillate at its rear end portion and its front end portion, about pivot shaft 202.

In other words, servo set 200 includes plate member 203 having pivot shaft 202 to be inserted through shaft hole 11f formed in vehicle frame casing 11, such that plate member 203 is prevented from being disengaged from vehicle frame casing 11, and servo main body 211 of servo portion 210 is detachably mounted to plate member 203. With this structure, it is possible to easily cope with changes of the specifications of servo set 200, through replacement of plate member 203.

Next, still another embodiment of the servo set for controlling the manipulation lever of HST will be described with reference to FIGS. 37 to 48. Further, the members and portions designated by the reference numerals used in the aforementioned description are identical or similar to the respective members and portions designated by the same reference numerals and, therefore, will not be described redundantly.

An object of this embodiment is to provide a stepless transmission whose manipulation lever can freely move when the stepless transmission receives a reverse driving force from the wheel (ground) without leaking hydraulic fluid to the outside from the cylinder when the proportional pressure control valve or the electrical system fails.

First, the structure of a servo set 300 will be described with reference to FIGS. 37 to 45. As in the embodiments described above, servo set 300 shown in this embodiment is provided on the right side of vehicle frame casing 11 and axle casing 12 (see FIGS. 33 and 34) incorporating HST1 (not shown).

Servo set 300 is configured by integrating a servo portion 310 having a function similar to that of servo unit 60 described above and a neutral returning portion 320 having a function similar to that of neutral returning unit 80 described above.

As shown in FIGS. 38 to 43, servo portion 310 includes a servo main body 311, a piston 312, a piston rod 313, and proportional pressure control valves 314 and 315.

Servo main body 311 forms a middle portion of servo set 300 in the forward and rearward direction and is a case member corresponding to the integration of hydraulic cylinder 32, valve block 64 and fluid duct block 65 which have been described above, and is provided with a cylinder 311a, an opening portion 311b, valve holes 311c and 311d, fluid passages C1 and C2, and fluid passages C3 and C4.

Figure 44:
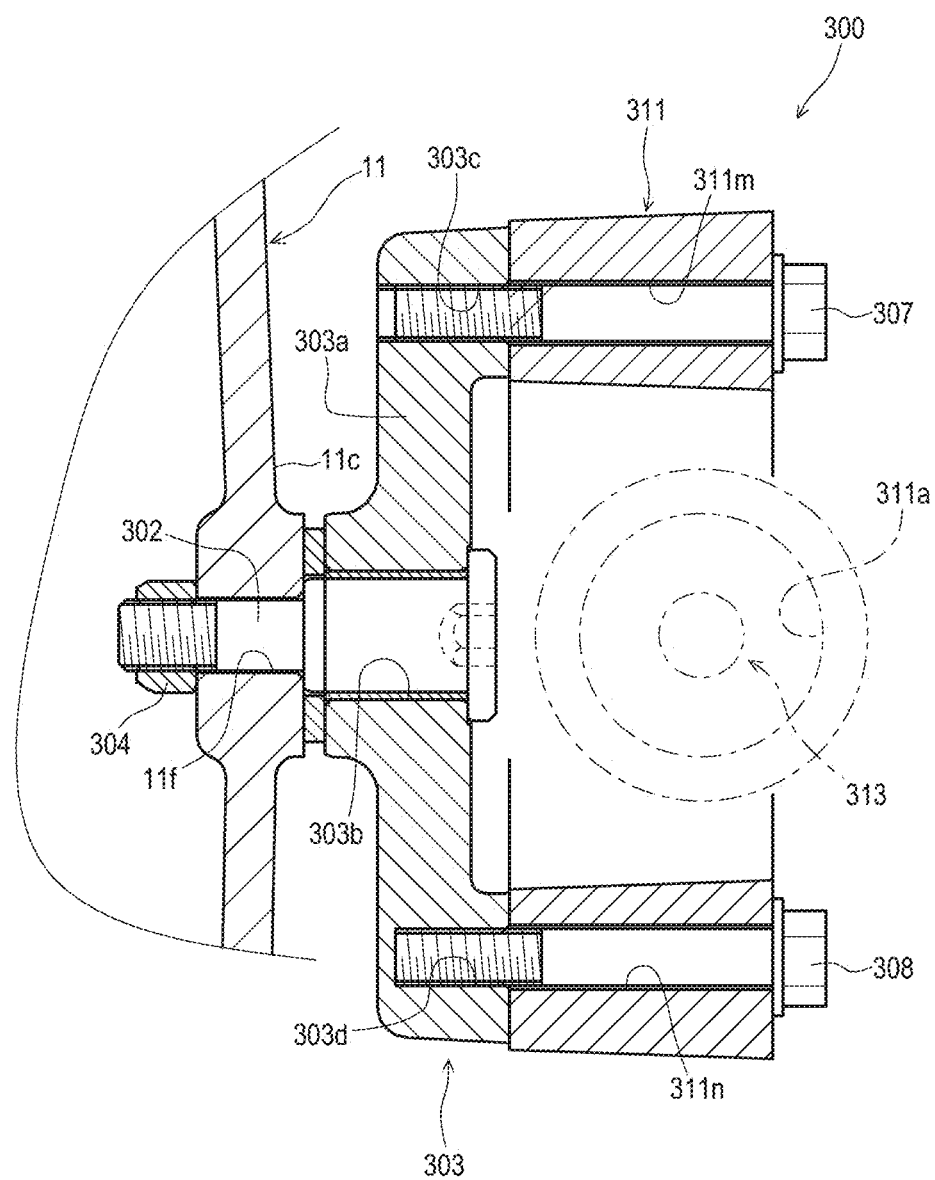
FIG. 44 is a cross-sectional view of servo set 300 taken along E-E line of FIG. 40.

Further, servo main body 311 also has the function (role) of a bracket for mounting servo set 300 to vehicle frame casing 11. As illustrated in FIG. 44, servo main body 311 extends substantially in the forward and rearward direction along an outer side surface 11c on the right side of vehicle frame casing 11, with a plate member 303 interposed therebetween. Servo main body 311 is pivotally supported, at the fore-and-aft middle portion thereof, on vehicle frame casing 11, through a pivot shaft 302.

Further, as shown in FIGS. 38 to 43, cylinder 311a is hollow with a substantially cylindrical shape for slidably housing piston 312, which is formed in servo main body 311. Cylinder 311a is partitioned, by piston 312, into a fluid chamber (first chamber) 311g on the front side and a fluid chamber (second chamber) 311h on the rear side. In addition, a sealing member 319 for sealing opening portion 311b is fitted in the front end of cylinder 311a, and a front portion 313a of piston rod 313 protrudes forward from servo main body 311 through a rod hole 319a formed in sealing member 319.

That is, servo main body 311 serves as a cylinder case provided with cylinder 311a configured to house piston rod 313 and piston 12 such that the piston rod and the piston are displaceable in an axial direction of cylinder 311a, and piston 312 and cylinder 311a forms fluid chamber (second fluid chamber 311h) to be supplied with the hydraulic fluid for withdrawing piston rod 313 from cylinder 311a and fluid chamber (first fluid chamber 311g) to be supplied with the hydraulic fluid for introducing piston rod 313 into cylinder 311a.

Figure 42:
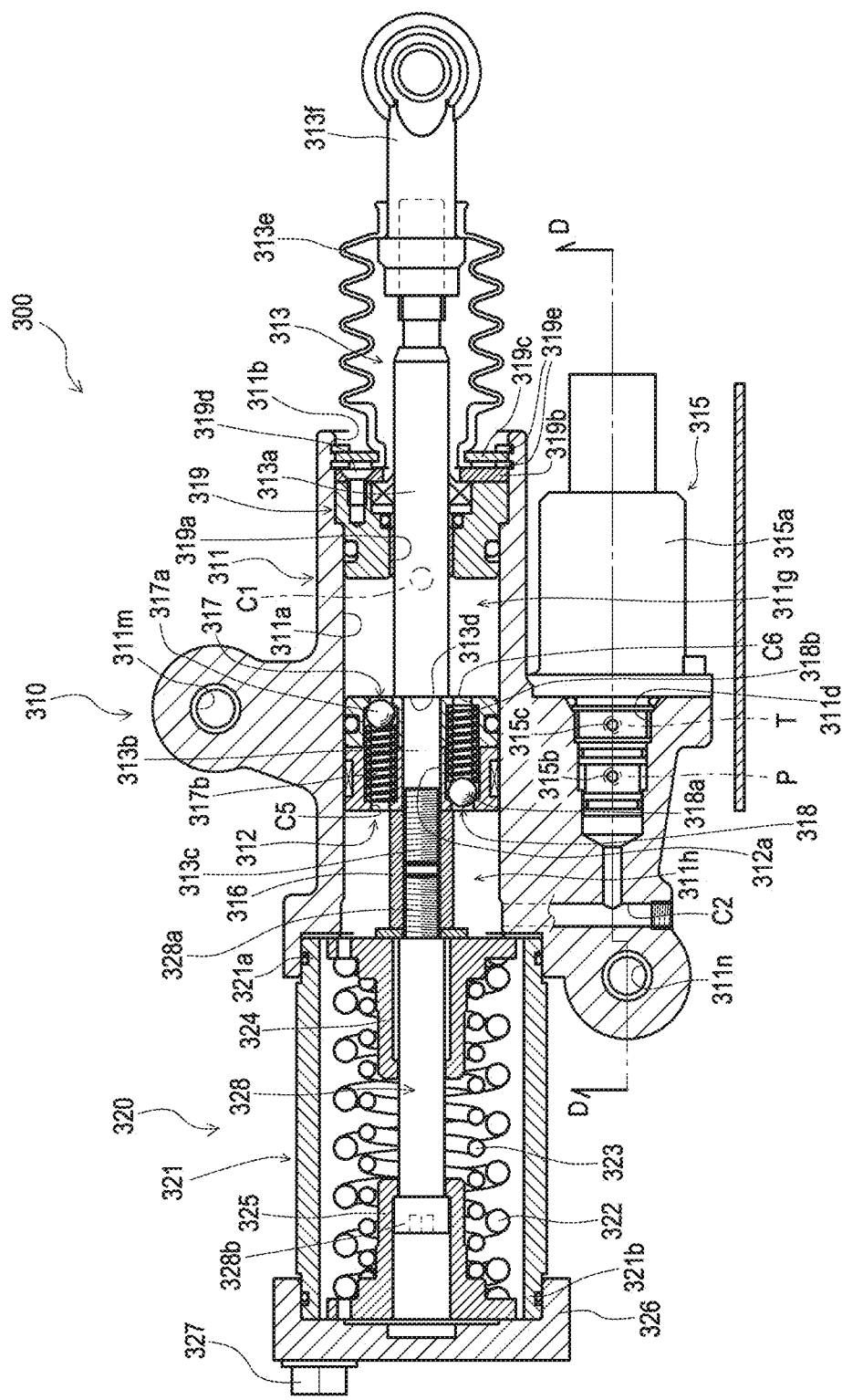
FIG. 42 is a cross-sectional view of servo set 300 taken along C-C line of FIG. 39.
Figure 43:
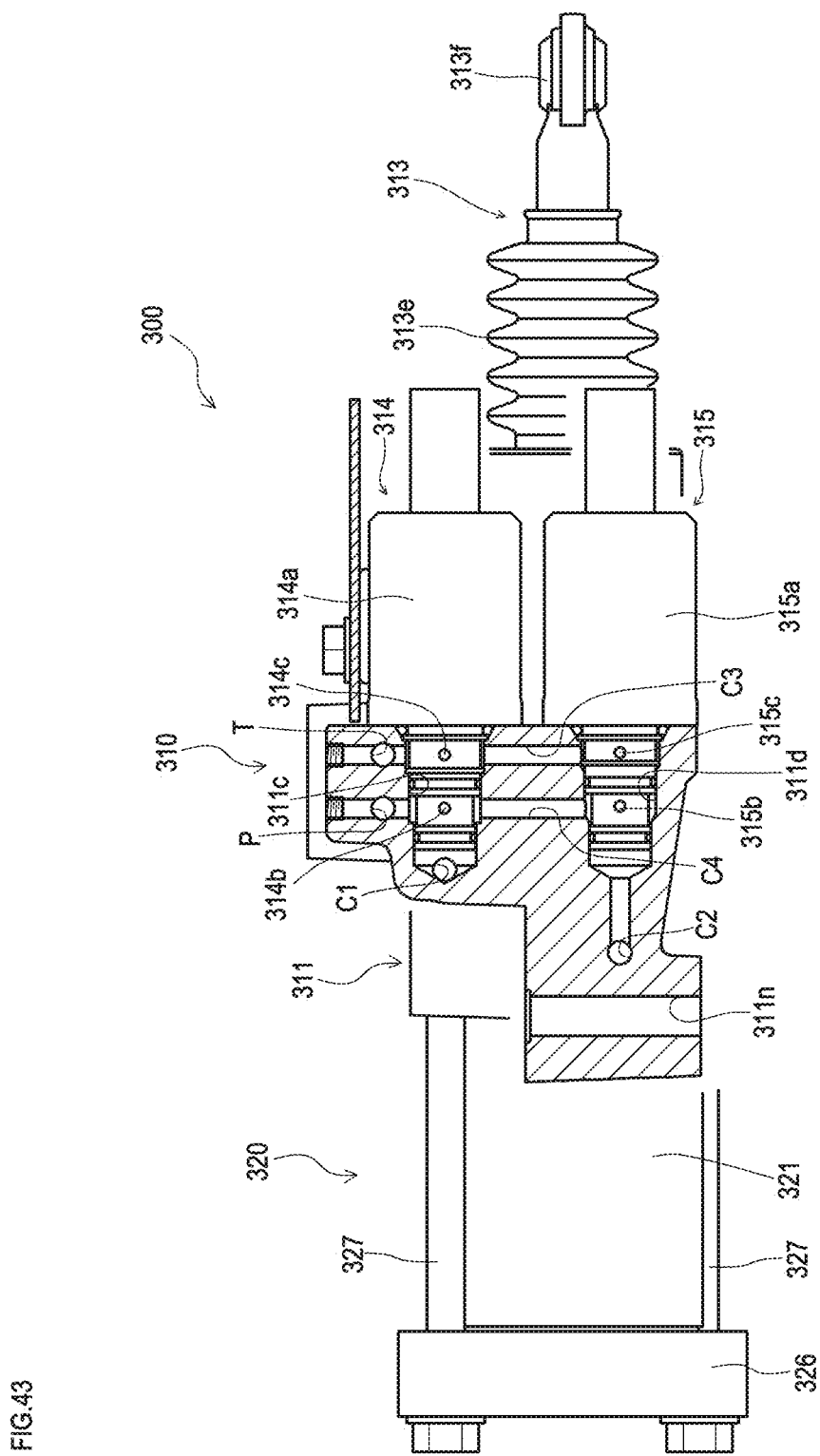
FIG. 43 is a cross-sectional view of servo set 300 taken along D-D line of FIG. 42 (when the relief valve is incorporated in the piston)

Further, as shown in FIG. 42, two holding plates 319b and 319c are disposed on the front end face side of sealing member 319. Holding plate 319b holds the sealing body constituting sealing member 319, and is fixed to the front end surface of sealing member 319 with a screw 319d. Holding plate 319c holds a rod cover 313e for protecting piston rod 313, and is fixed by retaining rings 319e and 319e in a state where a predetermined gap is provided between holding plate 319c and holding plate 319b. Rod cover 313e is fixed to servo main body 311 with one end thereof held by holding plates 319b and 319c.

As shown in FIGS. 38 to 43, piston 312 is slidably provided in cylinder 311a, and piston rod 313 extends forwardly and rearwardly on the axis center of piston 312. That is, piston 312 is provided on piston rod 313 coaxially with piston rod 313. With this structure, if piston 312 is displaced in the forward and rearward direction within cylinder 311a, piston rod 313 is displaced along with the displacement of piston 312.

Piston rod 313 has front portion 313a extending forward of piston 312 and a rear portion 313b extending rearward of front portion 313a. A shaft 328 for supporting neutral biasing springs 322 and 323 further extends rearward of rear portion 313b of piston rod 313.

Rear portion 313b is a portion through which a shaft hole 312a formed in piston 312 passes, and the shaft diameter is smaller than that of front portion 313a, and a stepped portion 313d is formed at the boundary between front portion 313a and rear portion 313b. A threaded portion 313c is formed at the rear end of rear portion 313b, and a threaded portion 328a is formed at the front end of shaft 328. Shaft 328 is connected to rear portion 313b by screwing respective threaded portions 313c and 328a into a connection member 316 which is a long nut. Shaft 328 protrudes rearward of servo main body 311.

Front portion 313a of piston rod 313, which is the front portion thereof with respect to piston 312, extends up to the outside of the front side of servo main body 311 through opening portion 311b, which enables increasing and decreasing the length of the protrusion of front portion 313a from servo main body 311 to the outside according to the movement of piston 312. Further, shaft 328 connected to rear portion 313b of piston rod 313, which is the rear portion thereof with respect to piston 312, extends rearwardly toward neutral returning portion 320, which enables increasing and decreasing the length of the protrusion of shaft 328 from servo main body 311 toward neutral returning portion 320.

The servo main body 311 constitutes a support base of proportional pressure control valves 314 and 315 below cylinder 311a, and cartridge type proportional pressure control valves 314 and 315 are mounted in valve holes 311c and 311d formed in the support base.

Fluid passage C1 is bored in the support base of servo main body 311 so as to connect cylinder 311a and valve hole 311c. Fluid passage C1 is connected to the front end of cylinder 311a, and as a result, communicates with first fluid chamber 311g. Fluid passage C2 is formed in the wall of servo main body 311 so as to connect cylinder 311a and the valve hole 311d. Fluid passage C2 is connected to the rear end portion of cylinder 311a, and as a result, communicates with second fluid chamber 311h.

Proportional pressure control valve 314 is adapted to supply or discharge a pressurized fluid to or from first fluid chamber 311g formed on the front side of piston 312 in cylinder 311a. Proportional pressure control valve 315 is adapted to supply or discharge a pressurized fluid to or from second fluid chamber 311h formed on the rear side of piston 312 in cylinder 311a. Proportional pressure control valves 314 and 315 are electromagnetic type provided with proportional solenoids 314a and 315a, respectively, and are electrically connected to a control device (not shown) for controlling the hydraulic pressure outputted from respective proportional pressure control valves 314 and 315.

Servo main body 311 also has an inlet port P and an outlet port T. Inlet port P communicates with a fluid supply port 314b of proportional pressure control valve 314 and a fluid supply port 315b of proportional pressure control valve 315 through fluid passage C3. Outlet port T communicates with a fluid discharge port 314c of proportional pressure control valve 314 and a fluid discharge port 315c of proportional pressure control valve 315 through fluid passage C4.

One of proportional pressure control valves 314 and 315 is designated as a proportional pressure control valve to be excited when determining the vehicle forward speed, and the other is designated as a proportional pressure control valve to be excited when determining the reverse speed. Pressurized fluid is supplied from fluid supply port 314b or fluid supply port 315b of a proportional pressure control valve which is excited of proportional pressure control valves 314 and 315 to corresponding fluid chamber 311g or fluid chamber 311h via corresponding fluid passage C1 or fluid passage C2. Fluid in second fluid chamber 311h or first fluid chamber 311g to which the pressurized fluid is not supplied is discharged from outlet port T by fluid discharge port 315c or fluid discharge port 314c of the non-excited control valve communicating with corresponding fluid passage C2 or fluid passage C1.

Servo portion 310 has a threaded portion at the front end of front portion 313a of piston rod 313, and a connection member 313f with a cap shape is screwed around this threaded portion. Connection member 313f is adapted such that the depth of screwing thereof around threaded portion can be adjusted, and can adjust a manipulation lever 301 to an appropriate neutral position.

Connection member 313f at the front end of piston rod 313 is pivotally coupled to manipulation lever 301 secured to trunnion shaft 6b (see FIGS. 34 and 38), so that servo portion 310 is connected to movable swash plate 6 (see FIG. 38) in HST1.

Figure 46:
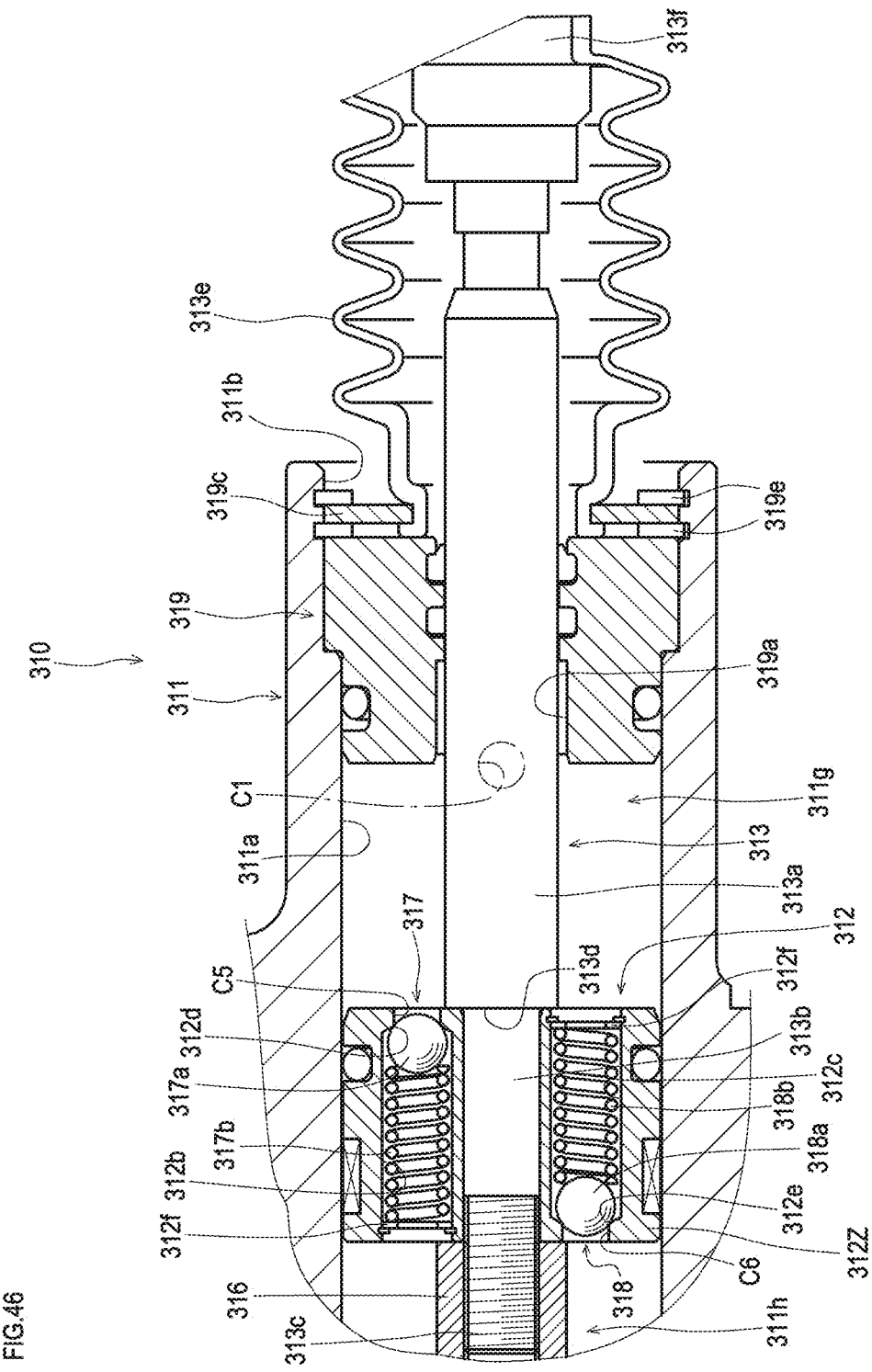
FIG. 46 is a partial enlarged cross-sectional view showing the mounting portion of a rod cover 313e.

Further, as shown in FIG. 46, servo portion 310 is secured, through pivot shaft 302, to plate member 303, which acts as a mounting part and is rotatably and pivotally supported with respect to shaft hole 11f, which is a concave portion formed in vehicle frame casing 11. Plate member 303 is provided with a shaft hole 303b adapted to allow pivot shaft 302 to be inserted therethrough, and bolt holes 303c and 303d for use in securing servo portion 310, in a plate portion 303a for supporting servo portion 310. Plate member 303 is provided on the side portion of vehicle frame casing 11, by inserting a bolt as pivot shaft 302 into shaft hole 303b and shaft hole 1 if formed in vehicle frame casing 11 as a housing and, further, by screwing a nut 304 around pivot shaft 302.

Servo portion 310 is secured to plate member 303 by inserting respective bolts 307 and 308 into through holes 311m and 311n formed in servo main body 311 and, further, by screwing respective bolts 307 and 308 into bolt holes 303c and 303d in plate member 303. As plate member 303 oscillates about pivot shaft 302, servo portion 310 can also oscillate. That is, pivot shaft 302 supports servo main body 311 oscillatably with respect to vehicle frame casing 11.

In servo set 300, servo portion 310 includes a pair of fluid passages C5 and C6 that communicate fluid chambers 311g and 311h. Servo set 300 is provided with a relief valve 317 in one fluid passage C5, and a relief valve 318 in the other fluid passage C6.

Relief valve 317 is configured to open when first fluid chamber 311g reaches a predetermined set pressure, and to flow the hydraulic fluid from first fluid chamber 311g to second fluid chamber 311h through fluid passage C5.

Relief valve 318 is configured to open when second fluid chamber 311h reaches a predetermined set pressure, and to flow the hydraulic fluid from second fluid chamber 311h to first fluid chamber 311g through fluid passage C6.

Figure 45:
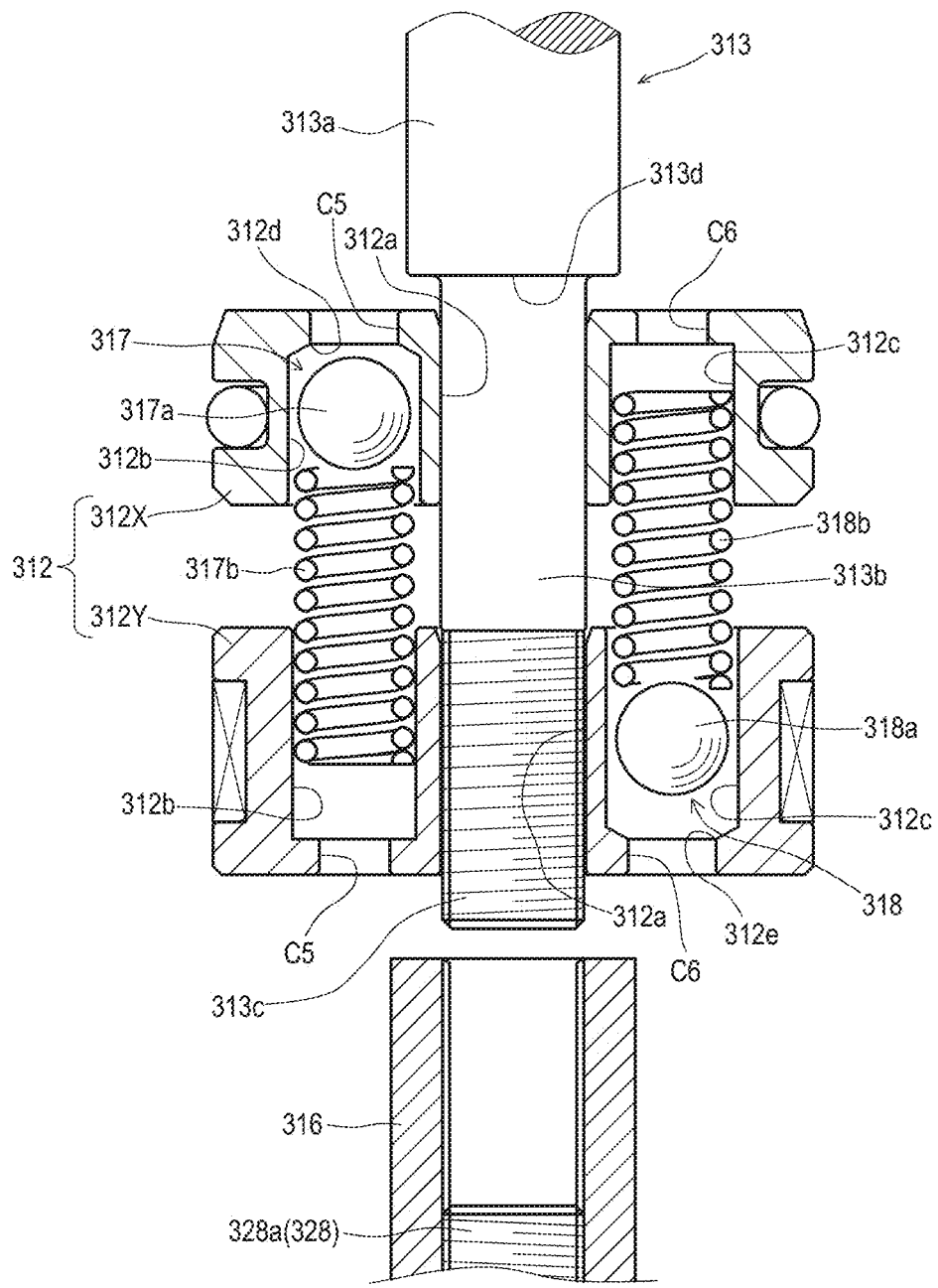
FIG. 45 is a cross-sectional view of a piston 312 incorporating relief valves 317 and 318.

In servo set 300, as shown in FIGS. 42 and 45, a pair of fluid passages C5 and C6 is formed inside piston 312, and relief valves 317 and 318 are built in piston 312. With such a configuration, servo set 300 can be made compact.

As shown in FIG. 45, piston 312 is composed of two members, a first piston main body 312X and a second piston main body 312Y. Each of piston main bodies 312X and 312Y has a valve hole 312b for accommodating relief valve 317 in direct communication with fluid passage C5, and a valve hole 312c for accommodating relief valve 318 in direct communication with fluid passage C6. A seat surface 312d, which will be described later, is formed on first piston main body 312X, and a seat surface 312e is formed on second piston main body 312Y.

Piston main bodies 312X and 312Y are integrated so that the end face of first piston main body 312X is engaged by stepped portion 313d of piston rod 313, and the end face of second piston main body 312Y is tightened by connection member 316 into which threaded portion 313c of rear portion 313b is screwed.

Relief valves 317 and 318 are composed of, for example, steel balls 317a and 318a and springs 317b and 318b, and are accommodated in valve holes 312b and 312c. One end of each of springs 317b and 318b is in contact with ball 317a and ball 318a, respectively, and the other end is engaged with the stepped portions of valve hole 312b and valve hole 312c, respectively. Balls 317a and 318a are biased by the spring force of spring 317b and spring 318b, pressed to seat surface 312d and seat surface 312e, and arranged at positions blocking fluid passage C5 and fluid passage C6, respectively.

As described above, when piston main bodies 312X and 312Y are joined, springs 317b and 318b are compressed, and a common predetermined working pressure (relief pressure) for relief valves 317 and 318 is set. When the pressure in first fluid chamber 311g increases and exceeds the working pressure, ball 317a is away from seat surface 312d, which flows the fluid in second fluid chamber 311h. At this time, ball 318a is in close contact with seat surface 312e. When the pressure in second fluid chamber 311h increases and exceeds the working pressure, ball 318a is away from seat surface 312e, which flows the fluid in first fluid chamber 311g. At this time, ball 317a is in close contact with seat surface 312d.

In FIGS. 42 and 45, piston 312 is configured to be divisible by first piston main body 312X and second piston main body 312Y, and pistons 312 capable of accommodating relief valves 317 and 318 therein is illustrated. Single piston 312 as shown FIG. 46 may be employed.

Piston 312 shown in FIG. 46 is a single piston main body 312Z, and relief valves 317 and 318 are accommodated in respective valve holes 312b and 312c formed in piston main body 312Z. Each of valve holes 312b and 312c is drilled from the respective directions of one end surface and the other end surface of piston main body 312Z, and forms seat surface 312d and seat surface 312e on the machining end. A common predetermined working pressure (relief pressure) is set by providing a retaining ring 312f at the opening on the machining start end and compressing spring 317b, and relief valves 317 and 318 are held in valve holes 312b and 312c.

Neutral returning portion 320 includes a cylindrical member 321 connected to the rear end of cylinder 311a, neutral biasing springs 322 and 323 disposed on the outer periphery of shaft 328, spring retainers 324 and 325, a lid 326, and bolts 327 and 327. When the fluid is drained from first fluid chamber 311g and second fluid chamber 311h, neutral returning portion 320 biases manipulation lever 301 in the neutral direction by the spring force of neutral biasing springs 322 and 323.

Cylindrical member 321 is a cylindrical member having a simple shape and easy to manufacture, and has a stepped front end portion 321a fitted in the rear end concave portion of servo main body 311 and a stepped rear end portion 321b on which lid 326 is externally fitted. Cylindrical member 321 is provided coaxially with cylinder 311a by fitting front end portion 321a into the rear end concave portion of servo main body 311.

Inside cylindrical member 321, a pair of front and rear spring retainers 324 and 325 is slidably fitted in the axial direction relative to cylindrical member 321 at rear portion 313b of piston rod 313. The outer diameter of each spring retainers 324 and 325 is smaller than the inner diameter of cylindrical member 321 and larger than the inner diameter of cylinder 311a. Front spring retainer 324 is received by the rear end surface of servo main body 311, and rear spring retainer 325 is received by lid 326.

Further, between the pair of spring retainers 324 and 325 within cylindrical member 321, two neutral biasing springs 322 and 323 with a coil spring shape and with different spring diameters are interposed in such a way as to surround piston rod 313. Neutral biasing spring 323 with a smaller spring diameter is arranged inside neutral biasing spring 322 with a larger spring diameter, coaxially with piston rod 313.

Further, the arrangement of servo portion 310 and neutral returning portion 320 in servo set 300 is such that piston rod 313 and proportional pressure control valves 314 and 315 are disposed so that the axial direction of piston rod 313 and the displacement direction of the valve members of proportional pressure control valves 314 and 315 are parallel to each other, and proportional pressure control valves 314 and 315 are disposed at one end of servo main body 311 constituting servo portion 310, and neutral biasing springs 322 and 323 are disposed at the other end of servo main body 311 (opposite to the side on which the proportional pressure control valves 314 and 315 are disposed).

In neutral returning portion 320 at the time of neutrality, both front and rear spring retainers 324 and 325 are pressed against the rear end face of servo main body 311 and lid 326 by the front and rear outward spring force of neutral biasing springs 322 and 323.

Further, connection member 316 of piston rod 213 is in contact with front spring retainer 324 at its front side, while front spring retainer 324 is in contact with the rear end surface of servo main body 311 via a washer. As a result, connection member 316 and neutral biasing springs 322 and 323 sandwich front spring retainer 324, and when shaft 328 moves backward, spring retainer 324 compresses neutral biasing springs 322 and 323 via connection member 316.

An enlarged diameter portion 328b is formed at the rear end portion of shaft 328, and enlarged diameter portion 328b is in contact with the spring retainer 324 at its rear side. As a result, enlarged diameter portion 328b and neutral biasing springs 322 and 323 sandwich rear spring retainer 325, and when shaft 328 moves forward, spring retainer 325 compresses neutral biasing springs 322 and 323 via enlarged diameter portion 328b.

Lid 326 for closing the rear opening of cylindrical member 321 has a circular concave portion equal to the diameter of cylindrical member 321 and through holes 326a and 326a through which bolts 327 and 327 are inserted. Cylindrical member 321 is inserted into through hole 326a of lid 326 and is sandwiched between servo main body 311 and lid 326 by fastening force of bolts 327 and 327 screwed into bolt holes 311e and 311f of servo main body 311.

In addition, as a structure which sandwiches rod cover 313e, as shown in FIG. 46, the configuration may be provided in which holding plate 319b for holding a sticker is omitted, and only holding plate 319c is provided.

Figure 38:
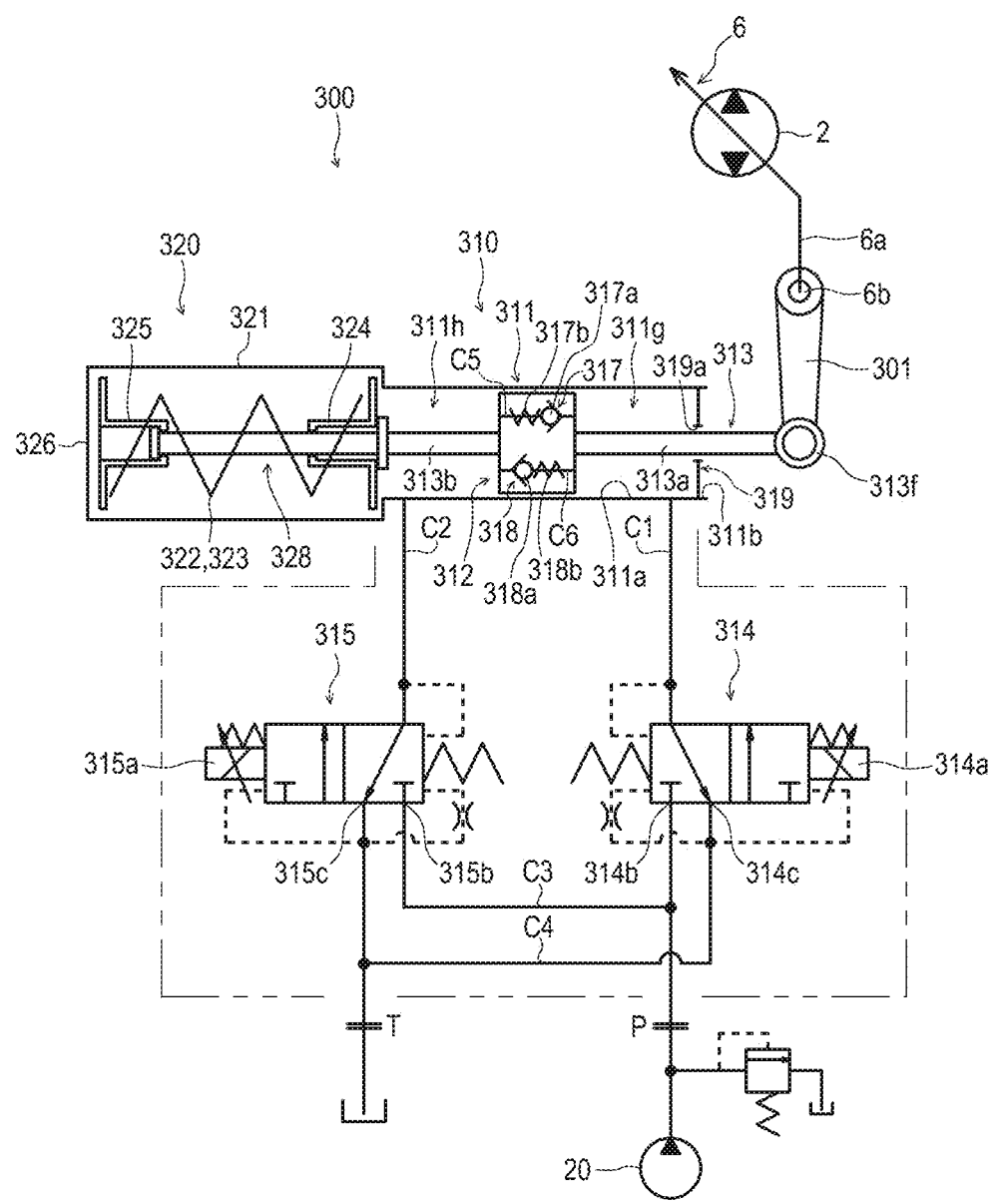
FIG. 38 is a hydraulic circuit diagram for supplying fluid to servo set 300 (when a relief valve is incorporated in the piston)
Figure 39:
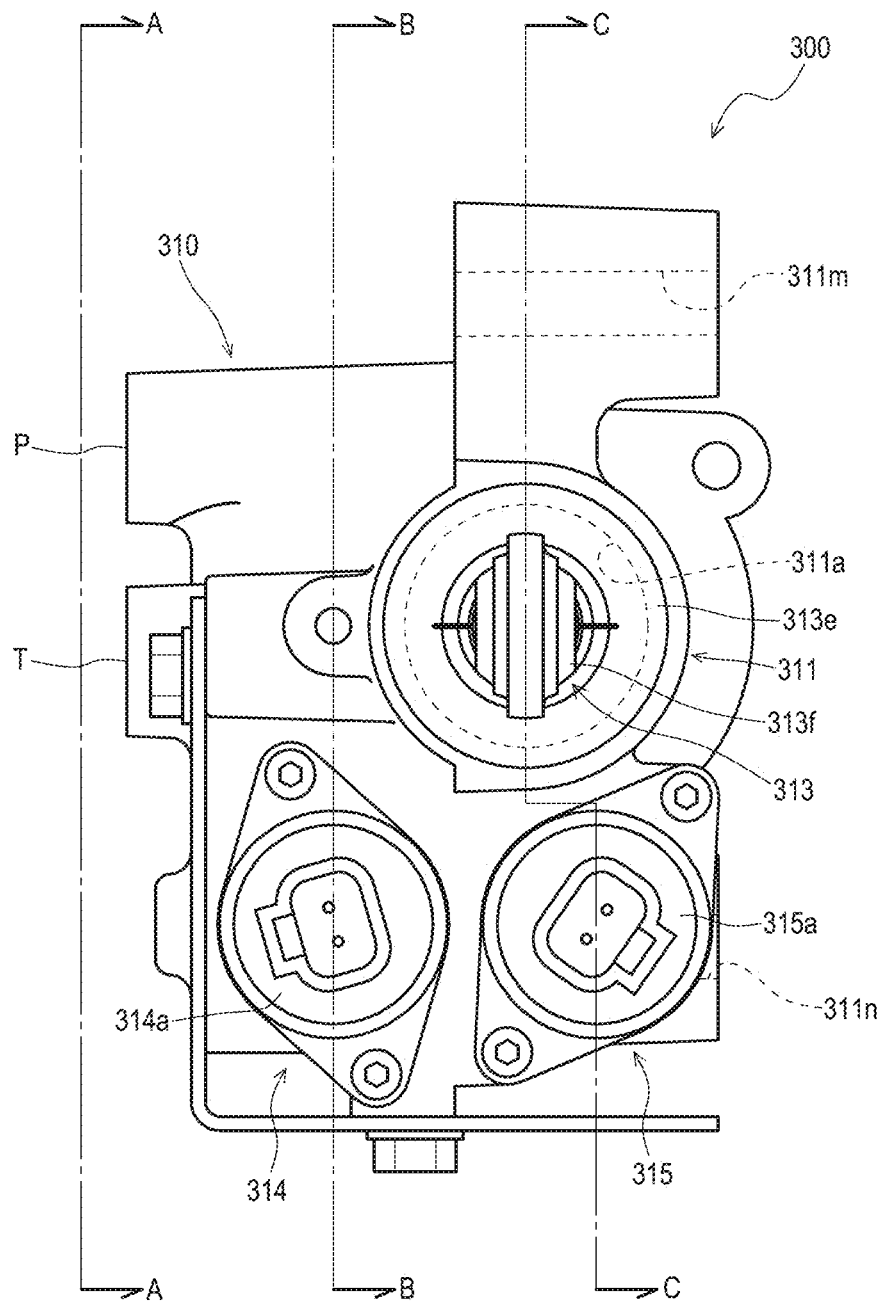
FIG. 39 is a front view of servo set 300 (viewed in the X direction of FIG. 37)
Figure 40:
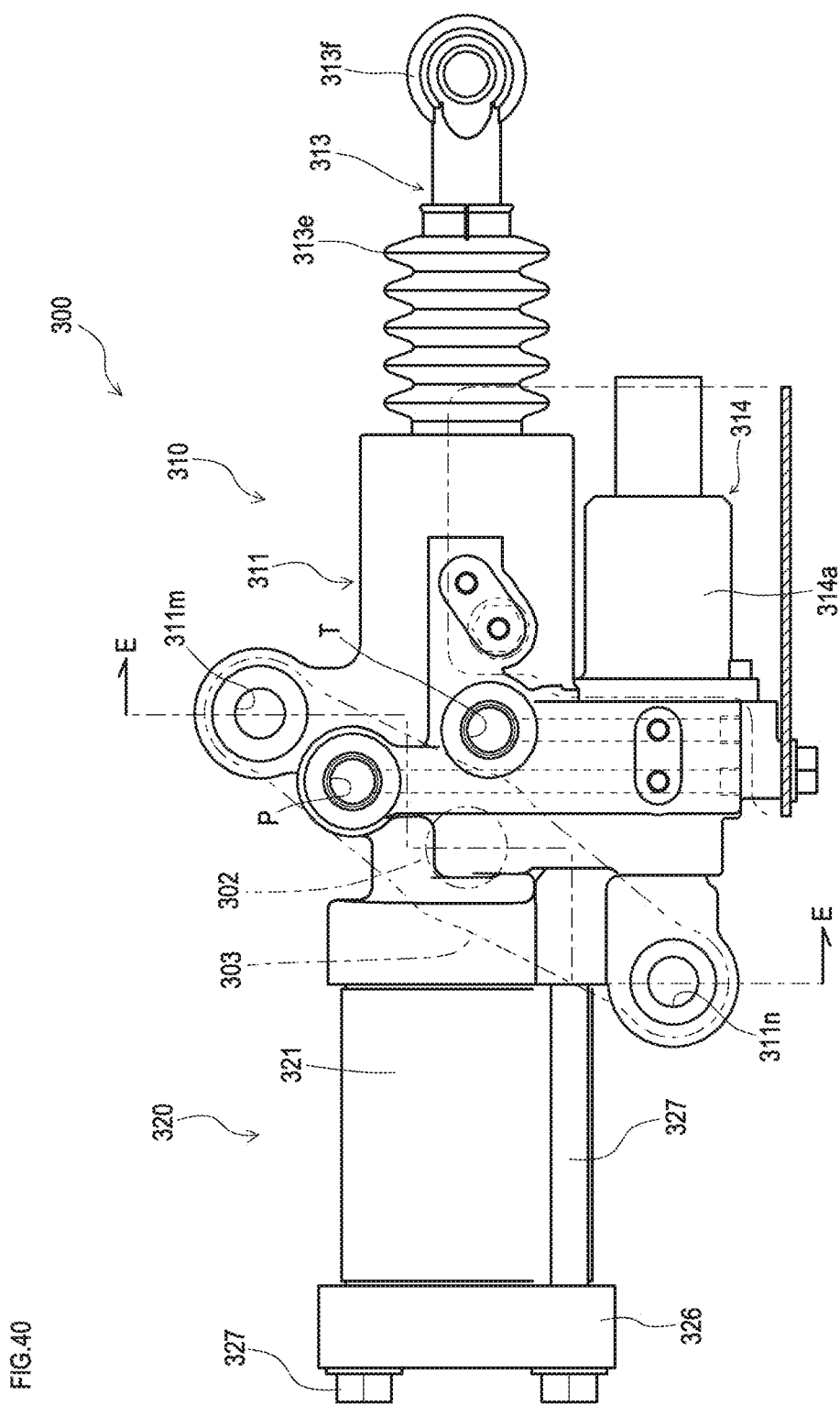
FIG. 40 is a view of servo set 300 taken along A-A line of FIG. 39.
Figure 41:
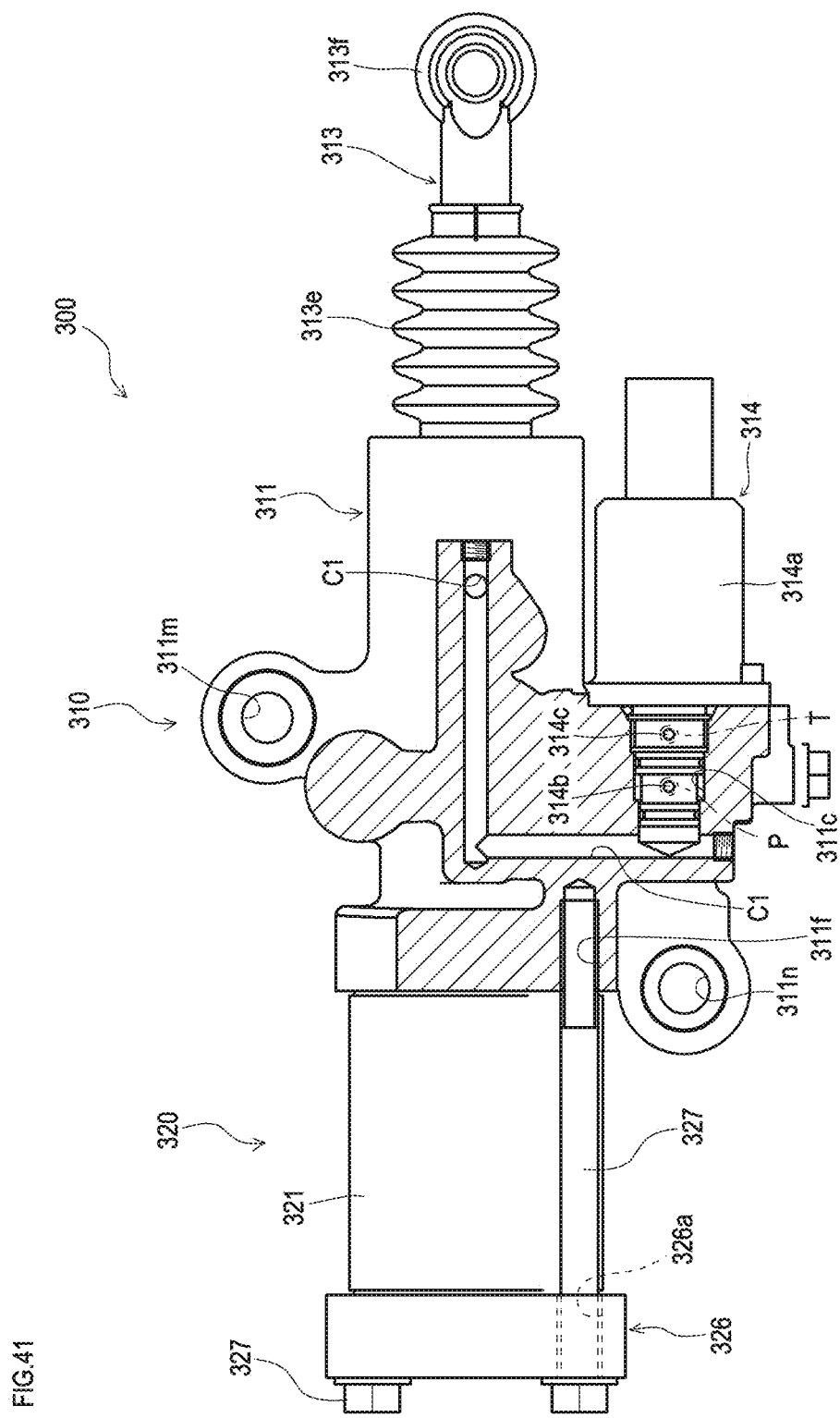
FIG. 41 is a cross-sectional view of servo set 300 taken along B-B line of FIG. 39.

In the configuration as shown in FIG. 38, when for example, during traveling, one of proportional pressure control valves 314 and 315 fails, and the hydraulic fluid in first fluid chamber 311g and second fluid chamber 311h is confined in fluid passage C1 or fluid passage C2, manipulation lever 301 will be fixed in the operation position at this time. If the operator can turn manipulation lever 301 manually while turning off the engine, HST1 can be returned to the neutral state.

In the configuration as shown in FIG. 38, when the operator manually turns manipulation lever 301 clockwise, piston 312 is pressed to neutral returning portion 320 via piston rod 313, increasing the hydraulic pressure in second fluid chamber 311h. Then, when the hydraulic pressure in second fluid chamber 311h exceeds the set pressure, relief valve 317 operates, and the hydraulic fluid in second fluid chamber 311h flows out to first fluid chamber 311g through fluid passage C5. Thereby, piston 312 is displaced toward neutral returning portion 320, and manipulation lever 301 can be rotated clockwise.

Further, in the configuration as shown in FIG. 38, when the operator manually turns manipulation lever 301 counterclockwise, piston 312 is pulled to be away from neutral returning portion 320 via piston rod 313, increasing the hydraulic pressure in first fluid chamber 311g. Then, when the hydraulic pressure in first fluid chamber 311g exceeds the set pressure, relief valve 318 operates, and the hydraulic fluid in first fluid chamber 311g flows out to second fluid chamber 311h through fluid passage C6. As a result, piston 312 is displaced in the direction away from neutral returning portion 320, and manipulation lever 301 can be turned counterclockwise.

In servo set 300 shown in FIGS. 37 to 46, respective relief valves 317 and 318 are built in piston 312 inside cylinder 311a, but respective relief valves 317 and 318 may be provided outside cylinder 311a.

Figure 47:
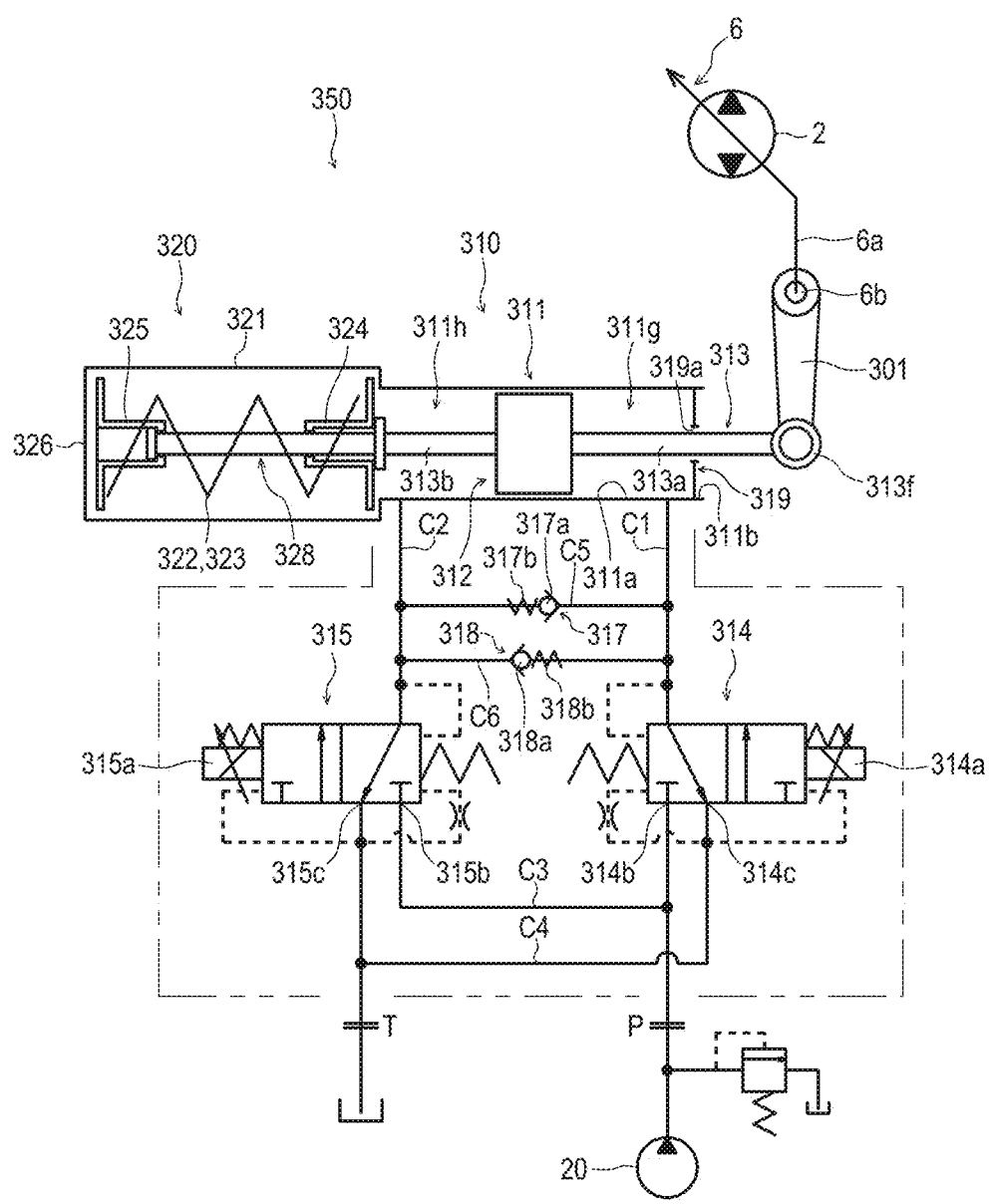
FIG. 47 is a hydraulic circuit diagram for supplying fluid to servo set 300 (when the relief valve is provided outside the cylinder)
Figure 48:
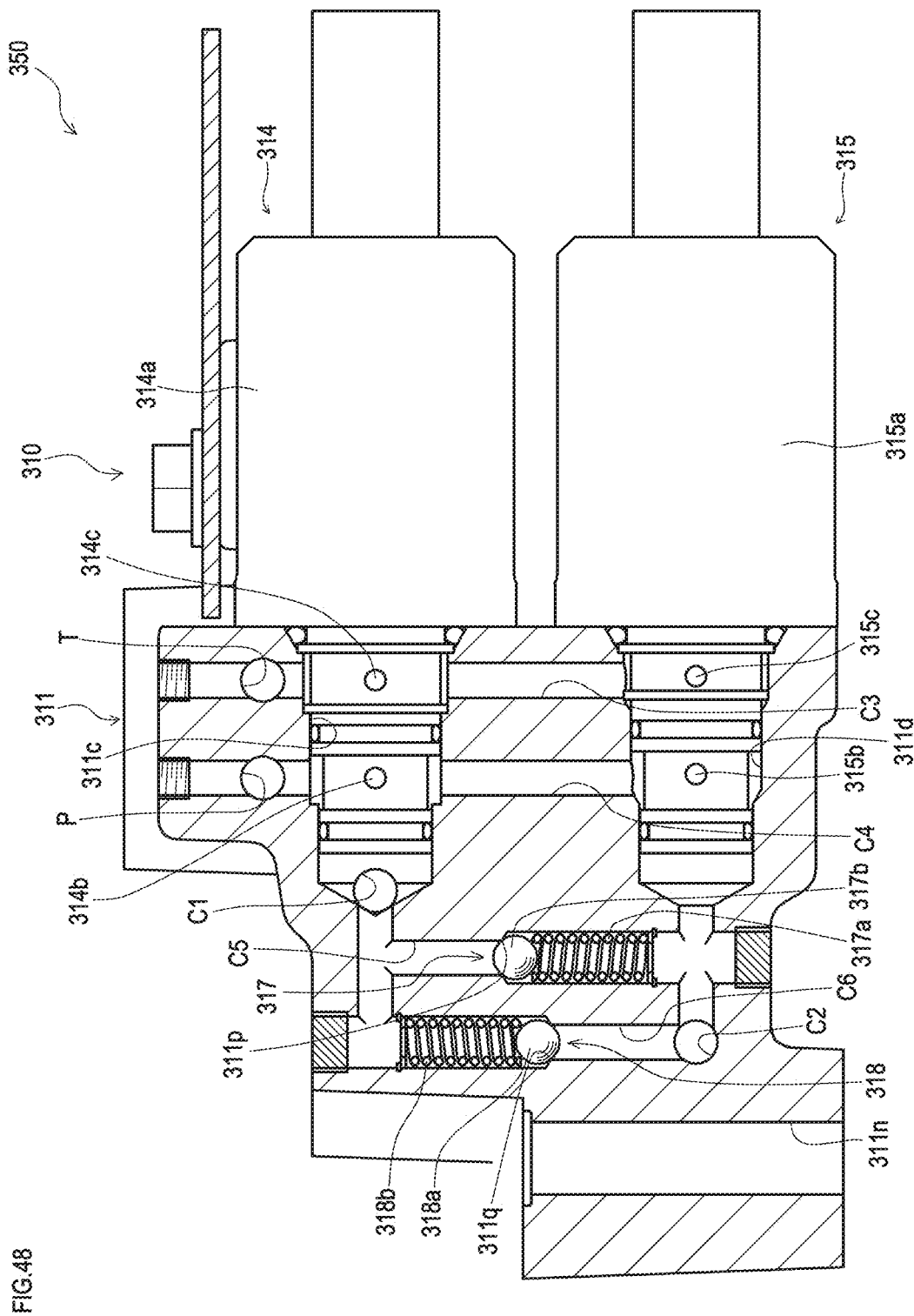
FIG. 48 is a cross-sectional view of servo set 300 taken along line D-D of FIG. 42 (when the relief valve is provided outside the cylinder).

In a servo set 350 according to another embodiment shown in FIGS. 47 and 48, a pair of fluid passages C5 and C6 is formed outside cylinder 311a, and relief valves 317 and 318 are provided in fluid passages C5 and C6, respectively.

Servo set 350 is provided with a pair of fluid passages C5 and C6 which communicate first fluid chamber 311g and second fluid chamber 311h is formed in servo main body 311, and one fluid passage C5 is provided with a first seat surface 311p is provided, and first ball 317a in contact with seat surface 311p and first spring 317b for pressing ball 317a against seat surface 311p with a predetermined biasing force are arranged. Further, a second seat surface 311q is provided in the other fluid passage C6, and second ball 318a in contact with seat surface 311q and second spring 318b for pressing ball 318a against seat surface 311q with a predetermined biasing force are arranged.

In such a configuration, as compared with the configuration in which respective relief valves 317 and 318 are built in piston 312, the degree of freedom of selecting the diameters of respective fluid passages C5 and C6 and the sizes of respective relief valves 317 and 318, etc., and the degree of freedom of the arrangement are high, so that servo set 350 can be designed flexibly according to the required specification of the vehicle. In the embodiment shown in FIG. 48, fluid passages C5 and C6 are bored inside servo main body 311, but fluid passages C5 and C6 may be configured by external piping taken out from servo main body 311, and relief valves 317 and 318 may be provided outside servo main body 311.

As in servo set 350 shown in FIGS. 47 and 48, manipulation lever 301 itself can move freely when HST receives a reverse driving force from the wheel (ground) without leaking the hydraulic fluid to the outside from the cylinder when the proportional pressure control valve or the electrical system fails.

It is further understood by those skilled in the art that the foregoing description is a preferred embodiment of the disclosed device and that various changes and modifications may be made in the invention without departing from the scope thereof defined by the following claims.

What is claimed is:

1. A control mechanism for a stepless transmission connected to a manipulation lever in the stepless transmission and disposed outside a housing of the stepless transmission, the control mechanism for the stepless transmission comprising:
   a piston rod connected to the manipulation lever;
   a neutral biasing spring configured to bias the manipulation lever in a neutral direction;
   a piston provided on the piston rod wherein the piston is coaxial with the piston rod;
   a cylinder case provided with a cylinder configured to house the piston rod and the piston such that the piston rod and the piston are displaceable in an axial direction of the cylinder,
   a first fluid chamber configured to be supplied with a hydraulic fluid for withdrawing the piston rod from the cylinder;
   a second fluid chamber configured to be supplied with the hydraulic fluid for introducing the piston rod into the cylinder;
   a solenoid valve capable of selectively supplying pressurized fluid to the first fluid chamber and the second fluid chamber and supported by the cylinder case;
   a pivot shaft configured to swingably support the cylinder case with respect to the housing;
   a first relief valve configured to flow the hydraulic fluid from the first fluid chamber to the second fluid chamber when a hydraulic pressure in the first fluid chamber exceeds a set pressure; and a second relief valve configured to flow the hydraulic fluid from the second fluid chamber to the first fluid chamber when a hydraulic pressure in the second fluid chamber exceeds a set pressure.

2. The control mechanism for the stepless transmission according to claim 1, wherein the piston rod includes a first rod portion protruding into the first fluid chamber and a second rod portion protruding into the second fluid chamber, wherein an axial diameter of the second rod portion of the piston rod is larger than an axial diameter of the first rod portion, and a stepped portion is formed at a boundary between the first rod portion and the second rod portion, wherein a first threaded portion is formed at least at a tip portion of the first rod portion, wherein the neutral biasing spring is supported by a shaft and a pair of spring retainers configured to be slidable on the shaft, wherein the neutral biasing spring is supported on the shaft between the pair of spring retainers, wherein a second threaded portion is formed at one end of the shaft that protrudes into the first fluid chamber, wherein the first rod portion with the first threaded portion is inserted into a shaft hole of the piston and the first threaded portion is screwed into a nut, wherein the first threaded portion and the second threaded portion are fixed together by a nut, and wherein the piston is sandwiched by the stepped portion and the nut with respect to the piston rod.

3. The control mechanism for the stepless transmission according to claim 1, wherein the piston is provided with a first fluid passage and a second fluid passage in fluid communication with the first fluid chamber and the second fluid chamber, the piston is configured to be dividable into two portions in an axial center direction of the shaft hole, the first fluid passage of the piston is provided with a first seat surface, a first ball in contact with the first seat surface, and a first spring configured to press the first ball to the first seat surface with a predetermined biasing force are arranged, and the second fluid passage of the piston is provided with a second seat surface, a second ball in contact with the second seat surface, and a second spring configured to press the second ball to the second seat surface with a predetermined biasing force are arranged.

4. The control mechanism for the stepless transmission according to claim 1, wherein the piston is provided with a first fluid passage and a second fluid passage in fluid communication with the first fluid chamber and the second fluid chamber, the first fluid passage is provided with a first seat surface, a first ball in contact with the first seat surface, and a first spring configured to press the first ball to the first seat surface with a predetermined biasing force are arranged, and the second fluid passage is provided with a second seat surface, a second ball in contact with the second seat surface, and a second spring configured to press the second ball to the second seat surface with a predetermined biasing force are arranged.

5. The control mechanism for the stepless transmission according to claim 1, further comprising:

a case configured to accommodate the neutral biasing spring, comprising:

a cylindrical member accommodating the neutral biasing spring; and a plate closing one end of the cylindrical member, wherein the plate is fixed to the cylinder case by a plurality of bolts, and wherein the cylindrical member is sandwiched by the cylinder case and the plate.

* * * * *